(12) United States Patent  (10) Patent No.: US 8,397,102 B2
Yamamoto et al.  (45) Date of Patent: *Mar. 12, 2013

(54) VOLUME AND FAILURE MANAGEMENT METHOD ON A NETWORK HAVING A STORAGE DEVICE

(75) Inventors: Masayuki Yamamoto, Sagamihara (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 13/072,947

(22) Filed: Mar. 28, 2011

(65) Prior Publication Data

US 2011/0179317 A1  Jul. 21, 2011

Related U.S. Application Data

(63) Continuation of application No. 12/687,367, filed on Jan. 14, 2010, now Pat. No. 7,937,614, which is a continuation of application No. 12/216,472, filed on Jul. 7, 2008, now Pat. No. 7,669,077, which is a continuation of application No. 11/288,205, filed on (Continued)

(30) Foreign Application Priority Data

Oct. 7, 2002 (JP) .................. 2002-293150
Jul. 2, 2003 (JP) .................. 2003-189954

(51) Int. Cl.
*G06F 11/00* (2006.01)

(52) U.S. Cl. .......... 714/6.1; 714/4.1; 714/5.1; 714/6.32; 714/42; 711/111; 711/112; 711/114

(58) Field of Classification Search ................ 714/4.1, 714/5.1, 6.2, 6.21, 6.22, 6.32, 42, 43, 44, 714/48; 711/111, 112, 114
See application file for complete search history.

(56) References Cited

U.S. PATENT DOCUMENTS 5,905,995 A  5/1999  Tabuchi et al.
6,253,240 B1  6/2001  Axberg et al.
6,457,139 B1  9/2002  D'Errico et al.

(Continued)

FOREIGN PATENT DOCUMENTS

EP  1115225  7/2001
GB  2351375  12/2000

(Continued)

OTHER PUBLICATIONS

Barker, Richard, et al., "Managing SANs", Storage Area Network Essentials, John Wiley & Sons, Inc., Chapt. 12, pp. 331-335.

(Continued)

*Primary Examiner* — Joseph D Manoskey
(74) *Attorney, Agent, or Firm* — Mattingly & Malur, P.C.

(57) ABSTRACT

A SAN manager acquires configuration information from devices constituting a SAN and produces a corresponding relationship between a host computer and a virtual volume (virtual volume mapping) and a corresponding relationship between the host computer and a real volume (real volume mapping). Based on those pieces of mapping information, the SAN manager outputs a corresponding relationship between virtual and real volumes. Meanwhile, the failure notification messages received from the in-SAN devices are construed to detect and output an influence of the failure upon the access to a real or virtual volume. Furthermore, when receiving a plurality of failure notifications from the devices connected to the SAN, the plurality of failure notifications are outputted with an association based on the corresponding relationship between real and virtual volumes.

8 Claims, 48 Drawing Sheets

Related U.S. Application Data

Nov. 29, 2005, now Pat. No. 7,409,583, which is a continuation-in-part of application No. 10/659,362, filed on Sep. 11, 2003, now Pat. No. 7,076,688, and a continuation-in-part of application No. 10/355,899, filed on Jan. 31, 2003, now Pat. No. 7,428,584.

(56) References Cited

U.S. PATENT DOCUMENTS

| | | |
|---|---|---|
| 6,671,776 B1 | 12/2003 | DeKonig |
| 6,697,924 B2 | 2/2004 | Swank |
| 6,854,035 B2 | 2/2005 | Dunham et al. |
| 6,880,052 B2 | 4/2005 | Lubbers et al. |
| 6,889,345 B2 | 5/2005 | Sicola et al. |
| 6,892,264 B2 | 5/2005 | Lamb |
| 6,898,670 B2 | 5/2005 | Nahum |
| 6,912,643 B2 | 6/2005 | Horn |
| 6,920,494 B2 | 7/2005 | Heitman et al. |
| 6,944,785 B2 | 9/2005 | Gadir et al. |
| 6,952,698 B2 | 10/2005 | Delaire et al. |
| 7,076,690 B1 | 7/2006 | Todd et al. |
| 7,162,575 B2 | 1/2007 | Dalal et al. |
| 7,770,059 B1 | 8/2010 | Glade et al. |
| 2001/0047482 A1 | 11/2001 | Harris et al. |
| 2001/0054093 A1 | 12/2001 | Iwatani |
| 2002/0103889 A1 | 8/2002 | Markson et al. |
| 2003/0093439 A1 | 5/2003 | Mogi et al. |
| 2003/0093509 A1 | 5/2003 | Li et al. |
| 2003/0093567 A1 | 5/2003 | Lolayekar et al. |
| 2003/0126518 A1 | 7/2003 | Binger |
| 2003/0145041 A1 | 7/2003 | Dunham et al. |
| 2003/0146929 A1 | 8/2003 | Baldwin et al. |
| 2003/0149695 A1 | 8/2003 | Delaire et al. |
| 2003/0149752 A1 | 8/2003 | Baldwin et al. |
| 2003/0149753 A1 | 8/2003 | Lamb |
| 2003/0149761 A1 | 8/2003 | Baldwin et al. |
| 2003/0149762 A1 | 8/2003 | Knight et al. |
| 2003/0149763 A1 | 8/2003 | Heitman et al. |
| 2003/0149769 A1 | 8/2003 | Axberg et al. |
| 2003/0149770 A1 | 8/2003 | Delaire et al. |
| 2003/0149795 A1 | 8/2003 | Lamb et al. |
| 2003/0154267 A1 | 8/2003 | Camacho et al. |
| 2003/0154271 A1 | 8/2003 | Baldwin et al. |
| 2003/0167327 A1 | 9/2003 | Baldwin et al. |
| 2003/0172239 A1 | 9/2003 | Swank |
| 2003/0177168 A1 | 9/2003 | Heitman et al. |
| 2003/0179227 A1 | 9/2003 | Ahmad et al. |
| 2003/0182422 A1 | 9/2003 | Bradshaw et al. |
| 2003/0191904 A1 | 10/2003 | Iwami et al. |
| 2003/0204597 A1 | 10/2003 | Arakawa et al. |
| 2003/0208589 A1 | 11/2003 | Yamamoto |
| 2003/0229645 A1 | 12/2003 | Mogi et al. |
| 2004/0028043 A1* | 2/2004 | Maveli et al. ............. 370/392 |
| 2004/0049572 A1 | 3/2004 | Yamamoto et al. |
| 2004/0054648 A1 | 3/2004 | Mogi et al. |
| 2004/0061701 A1 | 4/2004 | Arquie et al. |
| 2004/0078639 A1 | 4/2004 | Anna et al. |
| 2004/0103244 A1 | 5/2004 | Fujimoto et al. |
| 2004/0221105 A1 | 11/2004 | Fujimoto et al. |
| 2005/0055428 A1 | 3/2005 | Terai et al. |
| 2005/0138184 A1 | 6/2005 | Amir |
| 2006/0031270 A1* | 2/2006 | Nemoto et al. ............ 707/205 |
| 2006/0095706 A1 | 5/2006 | Aoyama |
| 2008/0072000 A1 | 3/2008 | Osaki et al. |
| 2008/0104347 A1 | 5/2008 | Iwamura et al. |
| 2009/0235046 A1 | 9/2009 | Asano et al. |
| 2009/0265577 A1* | 10/2009 | Haramai et al. ............ 714/3 |
| 2010/0169575 A1 | 7/2010 | Masaki et al. |

FOREIGN PATENT DOCUMENTS

| | | |
|---|---|---|
| JP | 2001/143367 | 5/2001 |
| JP | 2001/249856 | 9/2001 |
| JP | 2002/63063 | 2/2002 |
| WO | 02/065298 | 8/2002 |

OTHER PUBLICATIONS

"Scalar i2000", <http://www.trisys.co.uk/downloads/adic/Scalar_i2000_Data_Sheet.pdf>.

Vanel, L. et al, "AIX Logical Volume Manager, from A to Z: Introduction and Concepts", IBM, International Technical Support Organization, SG24-5432-00, pp. i-ii, 39, 40-42, 74, 124.

Hirao, T. et al., "Resource Management", FUJITSU Sci. Tech. J., vol. 40, Jun. 2004, pp. 123-132.

Murakami, M. et al., "'Storeplaza' Storage Solutions to Support a Digital Economy", Hitachi-Hyoron, No. 83, May 1, 2001, pp. 15-18. (with English translation).

* cited by examiner

| REAL MAPPING ID | HOST COMPUTER | | | | | | STORAGE | | | | | CORRESPONDING VIRTUAL MAPPING ID |
|---|---|---|---|---|---|---|---|---|---|---|---|---|
| | HOST COMPUTER NAME | LU ID | HOST COMPUTER DATA I/F ID | SWITCH NAME | SWITCH DATA I/F ID | SWITCH NAME | SWITCH DATA I/F ID | STORAGE NAME | STORAGE DATA I/F ID | VOLUME ID | | |
| pm1 | H1 | LU1 | a1 | SW1 | s1 | SW1 | s3 | S1 | c1 | va1 | vm1 |
| pm2 | H1 | LU2 | a1 | SW1 | s1 | SW1 | s4 | S1 | c2 | va2 | vm2 |
| pm3 | H1 | LU2 | a1 | SW1 | s1 | SW1 | s5 | S2 | d1 | vb1 | vm2 |
| pm4 | H2 | LU1 | b1 | SW1 | s2 | SW1 | s6 | S2 | d2 | vb2 | vm3 |

HOST COMPUTER / STORAGE table (13300)

| VIRTUAL MAPPING ID | HOST COMPUTER NAME | LU ID | HOST COMPUTER DATA I/F ID | SWITCH NAME | SWITCH DATA I/F ID | SWITCH NAME | SWITCH DATA I/F ID | STORAGE NAME | STORAGE DATA I/F ID | VOLUME ID |
|---|---|---|---|---|---|---|---|---|---|---|
| vm1 | H1 | LU1 | a1 | SW1 | s1 | SW1 | s3 | S1 | c1 | va1 |
| vm2 | H1 | LU2 | a1 | SW1 | s1 | SW1 | s1 | SW1 | vs1 | vv1 |
| vm3 | H2 | LU1 | b1 | SW1 | s2 | SW1 | s2 | SW1 | vs2 | vv2 |

13301, 13302, 13303, 13304, 13305, 13306, 13307, 13308, 13309, 13310, 13311

| SUBJECT-OF-DETECTION ID | DEVICE TYPE | DEVICE INFORMATION | IP ADDRESS | VIRTUALIZATION FUNCTION |
|---|---|---|---|---|
| 1 | HOST COMPUTER | VENDOR A, HOST COMPUTER H1 | 100.100.100.100 | NONE |
| 2 | HOST COMPUTER | VENDOR B, HOST COMPUTER H2 | 100.100.100.101 | NONE |
| 3 | SWITCH | VENDOR C, SWITCH SW1 | 100.100.100.102 | PRESENT |
| 4 | STORAGE | VENDOR D, STORAGE DEVICE S1 | 100.100.100.103 | NONE |
| 5 | STORAGE | VENDOR E, STORAGE DEVICE S2 | 100.100.100.104 | NONE |

| DATA I/F ID | SWITCH-SIDE WWN | DESTINATION-OF-CONNECTION WWN |
|---|---|---|
| s1 | WWNs1 | WWNa1 |
| s2 | WWNs2 | WWNb1 |
| s3 | WWNs3 | WWNc1 |
| s4 | WWNs4 | WWNc2 |
| s5 | WWNs5 | WWNd1 |
| s6 | WWNs6 | WWNd2 |

| DATA I/F ID | VIRTUAL DATA I/F ID | SCSI ID |
|---|---|---|
| s1 | vs1 | 2 |
| s2 | vs2 | 3 |

| DATA I/F ID | WWN |
|---|---|
| c1 | WWNc1 |
| c2 | WWNc2 |

| DATA I/F ID | WWN |
|---|---|
| d1 | WWNd1 |
| d2 | WWNd2 |

| REAL VOLUME ID | PATH PRESENCE/ABSENCE | DATA I/F ID | SCSI ID | SCSI LUN |
|---|---|---|---|---|
| va1 | PRESENCE | c1 | 2 | 1 |
| va2 | PRESENCE | c2 | 3 | 1 |
| va3 | PRESENCE | c2 | 3 | 2 |
| va4 | PRESENCE | c2 | 3 | 3 |

| REAL VOLUME ID | PATH PRESENCE/ABSENCE | DATA I/F ID | SCSI ID | SCSI LUN |
|---|---|---|---|---|
| vb1 | PRESENCE | d1 | 4 | 1 |
| vb2 | PRESENCE | d2 | 5 | 1 |
| vb3 | PRESENCE | d2 | 5 | 2 |
| vb4 | ABSENCE | N/A | N/A | N/A |

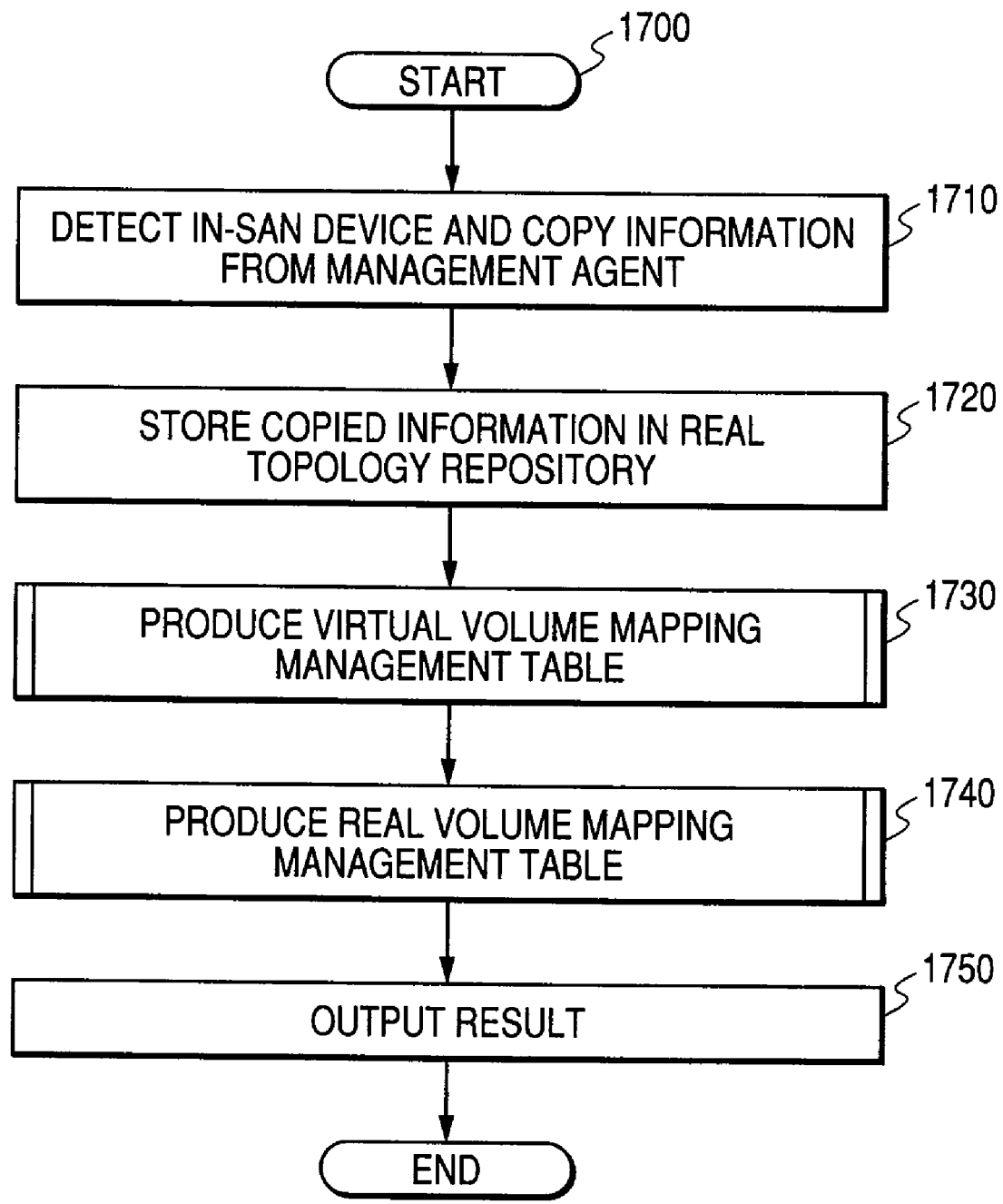

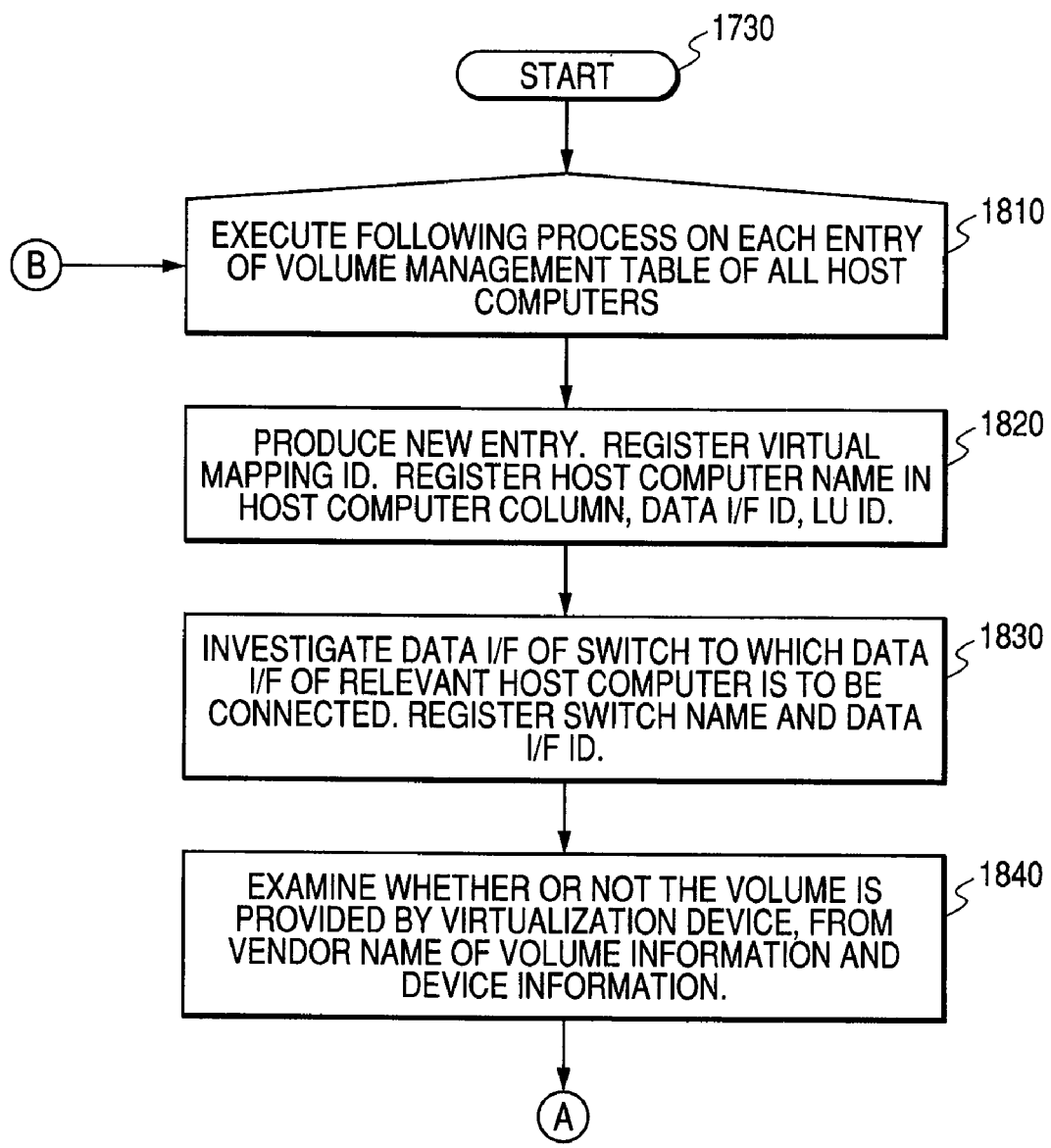

SNMP Trap MESSAGE FORMAT

SNMP Trap MESSAGE EXAMPLE TO BE SENT BY STORAGE DEVICE S1

FIG. 32

| | HOST COMPUTER | | | | | | STORAGE | | | | |
|---|---|---|---|---|---|---|---|---|---|---|---|
| REAL MAPPING ID | HOST COMPUTER NAME | LU ID | HOST COMPUTER DATA I/F ID | SWITCH NAME | SWITCH DATA I/F ID | SWITCH NAME | SWITCH DATA I/F ID | STORAGE NAME | STORAGE DATA I/F ID | VOLUME ID | CORRESPONDING VIRTUAL MAPPING ID |
| pm1 | H1 | LU1 | a1 | SW2 | s1 | SW2 | s4 | S3 | c1 | va1 | vm1 |
| pm2 | H1 | LU2 | a1 | SW2 | s1 | SW2 | s6 | S2 | c1 | va2 | vm2 |
| pm3 | H1 | LU2 | a1 | SW2 | s1 | SW2 | s6 | S2 | d1 | vb1 | vm2 |
| pm4 | H1 | LU2 | a1 | SW2 | s1 | SW2 | s53 | S2 | d2 | vb3 | vm3 |

FIG. 33

| VIRTUAL MAPPING ID | HOST COMPUTER ||||| STORAGE ||||
|---|---|---|---|---|---|---|---|---|---|
| | HOST COMPUTER NAME | LU ID | HOST COMPUTER DATA I/F ID | SWITCH NAME | SWITCH DATA I/F ID | SWITCH NAME | SWITCH DATA I/F ID | STORAGE NAME | STORAGE DATA I/F ID | VOLUME ID |
| vm1 | H1 | LU1 | a1 | SW1 | s1 | SW1 | s3 | S3 | c1 | va1 |
| vm2 | H1 | LU2 | a1 | SW1 | s1 | SW1 | s1 | S3 | c1 | vv1 |
| vm3 | H2 | LU1 | b1 | SW1 | s2 | SW1 | s2 | S2 | d2 | vb3 |

FIG. 34

| SUBJECT-OF DETECTION ID | DEVICE TYPE | DEVICE INFORMATION | IP ADDRESS | VIRTUALIZATION FUNCTION |
|---|---|---|---|---|
| 1 | HOST COMPUTER | VENDOR A, HOST COMPUTER H1 | 100.100.100.100 | NONE |
| 2 | HOST COMPUTER | VENDOR B, HOST COMPUTER H2 | 100.100.100.101 | NONE |
| 3 | SWITCH | VENDOR C, SWITCH SW2 | 100.100.100.112 | NONE |
| 4 | STORAGE | VENDOR D, STORAGE DEVICE S3 | 100.100.100.113 | PRESENT |
| 5 | STORAGE | VENDOR E, STORAGE DEVICE S2 | 100.100.100.104 | NONE |

| DATA I/F ID | SWITCH-SIDE WWN | DESTINATION-OF-CONNECTION WWN |
|---|---|---|
| s1 | WWNs1 | WWNa1 |
| s2 | WWNs2 | WWNb1 |
| s3 | WWNs3 | WWNc1 |
| s4 | WWNs4 | WWNc2 |
| s5 | WWNs5 | WWNd1 |
| s6 | WWNs6 | WWNd2 |

FIG. 38A

| DATA I/F ID | WWN |
|---|---|
| c1 | WWNc1 |
| c2 | WWNc2 |

FIG. 38B

| DATA I/F ID | WWN |
|---|---|
| d1 | WWNd1 |
| d2 | WWNd2 |

| FAILURE CODE | FAILURE POINT | IDENTIFIER | CAUSE | SEVERITY |
|---|---|---|---|---|
| 30c1 | DATA I/F | c1 | DATA I/F FAILURE | 1 |
| 30c2 | DATA I/F | c2 | DATA I/F FAILURE | 1 |
| 31c1 | DATA I/F | c1 | ERRONEOUS ACCESS TO DESTINATION-OF-CONNECTION | 4 |
| 31c2 | DATA I/F | c2 | ERRONEOUS ACCESS TO DESTINATION-OF-CONNECTION | 4 |
| 40vv1 | VOLUME | vv1 | ERRONEOUS ACCESS TO VOLUME | 2 |
| 40vv2 | VOLUME | vv2 | ERRONEOUS ACCESS TO VOLUME | 2 |
| ... | ... | ... | ... | ... |

| FAILURE CODE | FAILURE POINT | IDENTIFIER | CAUSE | SEVERITY |
|---|---|---|---|---|
| DATAIFd1 | DATA I/F | d1 | DATA I/F FAILURE | 1 |
| Battery1 | BATTERY | BATTERY 1 | BATTERY FAILURE | 4 |
| ... | ... | ... | ... | ... |

| FAILURE CODE | FAILURE POINT | IDENTIFIER | CAUSE | SEVERITY |
|---|---|---|---|---|
| Volvv1 | VOLUME | vv1 | ERRONEOUS ACCESS TO VOLUME | 1 |
| Volvv2 | VOLUME | vv1 | ERRONEOUS ACCESS TO VOLUME | 1 |
| ... | ... | ... | ... | ... |

| FAILURE CODE | FAILURE POINT | IDENTIFIER | CAUSE | SEVERITY |
|---|---|---|---|---|
| Port-s6-Link | DATA I/F | s6 | ERRONEOUS ACCESS TO DESTINATION-OF-CONNECTION | 8 |
| Port-s5-Hard | DATA I/F | s5 | DATA I/F FAILURE | 1 |
| ... | ... | ... | ... | ... |

FIG. 48

| EVENT ID | TIME OF DAY | FAILURE DEVICE | FAILURE CODE | REAL VOLUME | VIRTUAL VOLUME | EVENT RELATIONSHIP |
|---|---|---|---|---|---|---|
| ... | ... | ... | ... | ... | ... | ... |
| 1000 | 2003/01/01 13:10:10 | S2 | DATAIFd1 | pm2 | vm2 | PARENT EVENT |
| 1001 | 2003/01/01 13:10:20 | S3 | 40vv2 | pm2 | vm2 | CHILD EVENT |
| 1002 | 2003/01/01 13:10:30 | H1 | Volvv2 | pm2 | vm2 | CHILD EVENT |
| 1003 | 2003/01/01 13:10:35 | SW2 | Port-s6-Link | pm2 | vm2 | CHILD EVENT |
| ... | ... | ... | ... | ... | ... | ... |
| 2000 | 2003/01/02 02:00:00 | S2 | Battery1 | pm2 | vm2 | PARENT EVENT |
| ... | ... | ... | ... | ... | ... | ... |
| 3000 | 2003/01/03 00:10:10 | S3 | 31c2 | pm2 | vm2 | CHILD EVENT |
| 3001 | 2003/01/03 00:10:20 | S3 | 40vv2 | pm2 | vm2 | CHILD EVENT |
| 3002 | 2003/01/03 00:10:30 | H1 | Volvv2 | pm2 | vm2 | CHILD EVENT |
| 3003 | 2003/01/03 00:10:35 | SW2 | Port-s5-Hard | pm2 | vm2 | PARENT EVENT |
| ... | ... | ... | ... | ... | ... | ... |

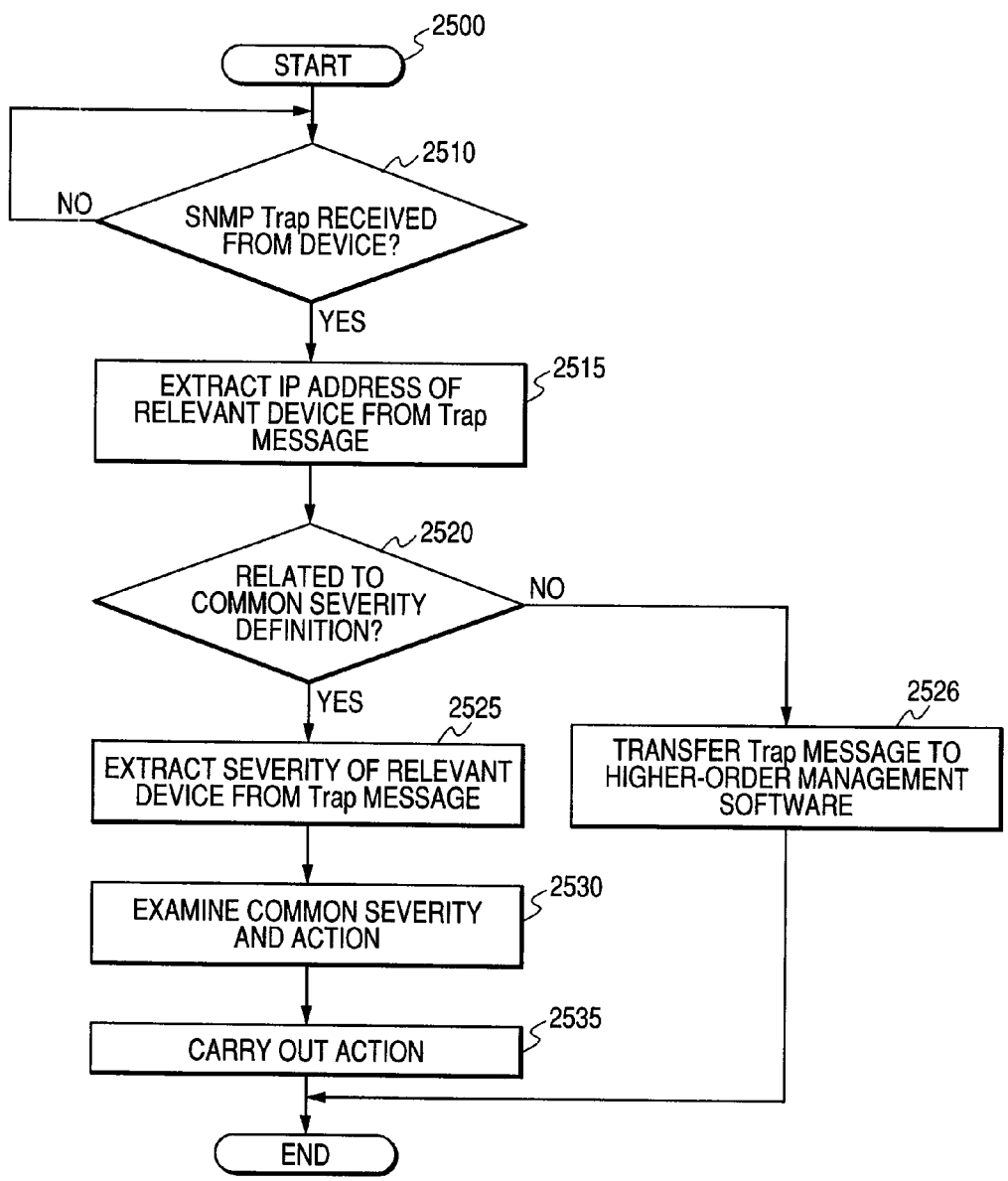

VOLUME AND FAILURE MANAGEMENT METHOD ON A NETWORK HAVING A STORAGE DEVICE

CROSS-REFERENCES

This application is a continuation application of U.S. Ser. No. 12/687,367, filed Jan. 14, 2010, which is a continuation application of U.S. Ser. No. 12/216,472, filed Jul. 7, 2008 (now U.S. Pat. No. 7,669,077), which is a continuation application of U.S. Ser. No. 11/288,205, filed Nov. 29, 2005 (now U.S. Pat. No. 7,409,583), which is a continuation-in-part (CIP) application of U.S. application Ser. No. 10/659,362, filed Sep. 11, 2003 (now U.S. Pat. No. 7,076,688), and U.S. application Ser. No. 10/355,899, filed Jan. 31, 2003 (now U.S. Pat. No. 7,428,584) and is related to U.S. Ser. No. 11/437,700, filed May 22, 2006 (now U.S. Pat. No. 7,406,622). This application in turn claims priority from Japanese Patent Application No. 2003-189954, filed on Jul. 2, 2003, and Japanese Patent Application No. 2002-293150, filed Oct. 7, 2002. The entire disclosures of all of these applications are incorporated herein by reference.

BACKGROUND

The present invention relates to a storage system for use in a computer system. More particularly, the invention relates to a method and apparatus for managing a volume configuration and failure, on a storage area network (hereinafter, referred to as SAN) such that the real volume provided from a storage system is to be provided as a virtual volume to a host computer through a volume virtualization function of a virtualization device.

(1) SAN

Recently, there is a growing spread of SANs, the networks exclusive for storage inputs/outputs integrated by separating the storage devices from the host computers. By introducing the SAN, it is possible to realize high-speed data transfer, high extensibility and usability for the storage system, and effective utilization of storage resources.

(2) SAN Management

The SAN-based high extensibility of a storage system allows a plurality of vendor devices (host computers, switches, storage devices) to coexist on the SAN. SAN management is required in order to operate such a SAN without shutdown. With respect to SAN management, particularly important is operation status monitoring of the devices to be connected to the SAN, that forms a basis of routine operations. The software, for monitoring the status of SAN operation, is hereinafter referred to as a SAN manager.

The SAN manager possesses two major functions, namely a configuration management function and a failure monitoring function. The configuration management function is a function to acquire information at regular intervals from the management agents existing in the devices connected to the SAN, detect a physical connection relationship (topology) over the SAN from the acquired information, and visualize at all times the newest topology to be supplied to the user of the SAN manager, i.e. to the SAN administrator.

The failure monitoring function is a function to grasp an event occurrence, such as a failure or a performance decrease, depending upon the event notification as to hardware malfunction and performance decrease issued from the devices connected to the SAN or the device information periodically acquired from the management agents existing in the devices. The occurrence of such an event is notified to the SAN administrator.

By virtue of these two functions, the SAN administrator can manage the device operation status in a centralized fashion by use of the SAN manager. This can reduce the operation cost, including personnel reduction for the SAN administrator.

(3) Virtualization Device

There is a virtual volume technology as an art to manage the storage over the SAN. The virtual volume technology is disclosed in GB-A-2351375, which discloses that the device called a storage host computer possesses the following two functions:

1) The function of managing a volume (hereinafter, real volume) as a storage domain in a storage medium being included in each storage device connected to the storage host computer and producing a volume pool; and 2) The function of producing a virtual volume based on one or more real volumes of the volume pool and converting sequentially the I/O access from the host computer to the virtual volume into an I/O request for real volume thereby making a response to the I/O from the host computer.

The device having these two functions is hereinafter referred to as a virtualization device. By introducing the virtualization device onto the SAN, the volume allocation onto the host computer is centralized by means of the virtual volume thus eliminating the necessity of being conscious of the physical configuration of the storage devices connected to the virtualization device. Namely, the SAN administrator is allowed to allocate volumes in a centralized manner.

SUMMARY OF THE INVENTION

Providing a virtual volume using the virtualization device enhances the freedom of a volume configuration to be provided to the host computer. However, the SAN administrator is required to operate the SAN while always grasping both relationships, i.e. the relationship between a host computer and a virtual volume and the relationship between a virtual volume and a real volume. The SAN's configuration becomes difficult to grasp as the scale of the SAN increases, i.e. as the connection relationship is complicated by the increase in the number of virtualization and storage devices.

Meanwhile, owing to the failure monitoring function possessed by the SAN manager, the SAN administrator is allowed to conduct the operation for segmenting in what point of what device the cause of a failure is constituted, on the basis of the event issued from a plurality of devices. Hereinafter, this is referred to as "failure segmentation". Providing a virtual volume by the virtualization device enhances the freedom in a volume configuration to be supplied to the host computer. However, in segmenting a failure depending upon a failure message (SNMP Trap, etc.) issued from a plurality of vendor devices, it is the current practice to rely upon the manual operation of the SAN administrator having a high level of knowledge on the individual devices. Thus, there is a problem of high management cost.

Meanwhile, the SAN manager has a failure notification function including to notify the event to a management software (hereinafter, referred to as the higher-order system management software) administrating the business system overall in accordance with the seriousness (hereinafter, referred to as severity) of a failure, and to send a mail to the SAN administrator. However, because the definition of failure severity relies upon the devices connected to the SAN, the SAN administrator, each time, is required to decide what event of what device has high severity, thus raising a problem that time is required in taking a measure against failures.

A first object of the present invention is to provide a way for easily grasping the corresponding relationship between a real volume and a virtual volume over a SAN.

A second object of the invention is to assist a SAN administrator to segment a failure in the case a failure message is issued from a device connected to the SAN.

A third object of the invention is to enable, on the SAN, the SAN administrator or the higher-order system management software to receive required failure information among the failure messages issued from the devices connected to the SAN.

In the invention, the volume configuration on the SAN is to be managed by use of management agents provided in the devices constituting the SAN and a SAN manager provided in the management computer the SAN administrator is to use.

For the first object, the SAN manager acquires the information about a data interface (I/F) and volume from the management agents provided in host computers, the information about a data I/F connection status from the management agents provided in switches, the information about a data I/F and volume from the management agents provided in storage devices, and the information about a virtual volume from the management agents provided in virtualization devices. Based on the acquired information, the SAN manager detects a corresponding relationship on the SAN between the host computer and the virtual volume (hereinafter, referred to as a virtual volume mapping), and manages the corresponding relationship as virtual-volume mapping information. Furthermore, based on the virtual volume mapping and virtual-volume configuration information, the SAN manager detects a corresponding relationship between the host computer and the real volume (hereinafter, referred to as a real volume mapping), and manages the corresponding relationship as real-volume mapping information. On the basis of those pieces of configuration information, the SAN manager provides the following three functions. First, virtual volume mapping information and real volume mapping information are outputted, to present a corresponding relationship between both (virtual volume configuration managing function) to the SAN administrator. Secondly, by holding an event dictionary for construing the content of the failure notification message received from the device of the SAN, a failure notification issued from the device is received to detect an influence of the failure upon I/O accesses to a real volume and a virtual volume depending upon the SAN configuration information acquired from the event dictionary and management agents and stored in a real topology repository (failure influential range detecting function). Thirdly, when the storage administrator produces a virtual volume by utilization of the SAN manager, related pieces of virtual and real volume mapping information are provided to thereby assist the SAN administrator in performing a virtual-volume production operation (volume allocating function).

For the second object, the SAN manager, receiving a plurality of failure notifications from the devices connected to the SAN, is to output the plurality of failure notifications by an association on the basis of the corresponding relationship between real and virtual volumes being managed by the virtualization device (failure associating function).

For the third object, the SAN manager, receiving a plurality of failure notifications from the devices connected to the SAN, is to change the information representative of a significance-degree of failure information based on different criterions respectively contained in the failure notifications into information representative of a significance-degree of failure information based on a common criterion, to thereby process the failure notifications depending upon the changed significance degree (failure significance-degree change function).

BRIEF DESCRIPTION OF DRAWINGS

FIG. 6 is a figure showing an example of a real-volume mapping management table held by the management computer;

FIG. 7 is a figure showing an example of a virtual-volume mapping management table held by the management computer;

FIG. 11 is a figure showing an example of an FC-connection management table held by the switch;

FIG. 12 is a figure showing an example of a data I/F management table held by the switch;

FIGS. 14A and 14B are figures showing an example of a data I/F management table held by the storage device;

FIGS. 15A and 15B are figures showing an example of a real-volume management table held by the storage device;

FIG. 16 is a flowchart showing an example of real-topology and virtual-topology display process over the storage network to be executed by the management computer;

FIGS. 17A and 17B are flowcharts showing a detailed process content example of a virtual-volume mapping management table producing step to be executed by the management computer;

FIG. 32 is a figure showing an example of a real-volume mapping management table held by the management computer;

FIG. 33 is a figure showing an example of a virtual-volume mapping management table held by the management computer;

FIG. 34 is a figure showing an example of a device detecting list held by the management computer;

FIG. 37 is a figure showing an example of an FC-connection management table held by the switch;

FIGS. 38A and 38B are figures showing an example of a data I/F management table held by the switch;

FIGS. 47A to 47D are figures showing an example of an event dictionary concerning storage held by the management computer;

FIG. 48 is a figure showing a failure log held by the management computer;

FIG. 52 is a flowchart of a failure-significant-degree-change process.

DESCRIPTION OF THE PREFERRED EMBODIMENTS

Embodiments of the present invention will now be described with reference to the drawings. It should be noted that the disclosed embodiments are not to limit the invention. The present embodiment illustrates a configuration management function as to the virtual volume that the SAN manager is allowed to easily manage the corresponding relationship between a virtual volume and a real volume by producing a virtual volume mapping and real volume mapping from the configuration information of the devices connected to the SAN by the SAN manager, in a SAN having switches and virtualization devices.

SAN Configuration

Description is now made on a SAN configuration in the present embodiment. FIGS. 1 to 5 show a configuration example of the SAN and the devices connected to the SAN while FIGS. 8 to 15 show the respective pieces of management information provided in the devices.

Figure 1:
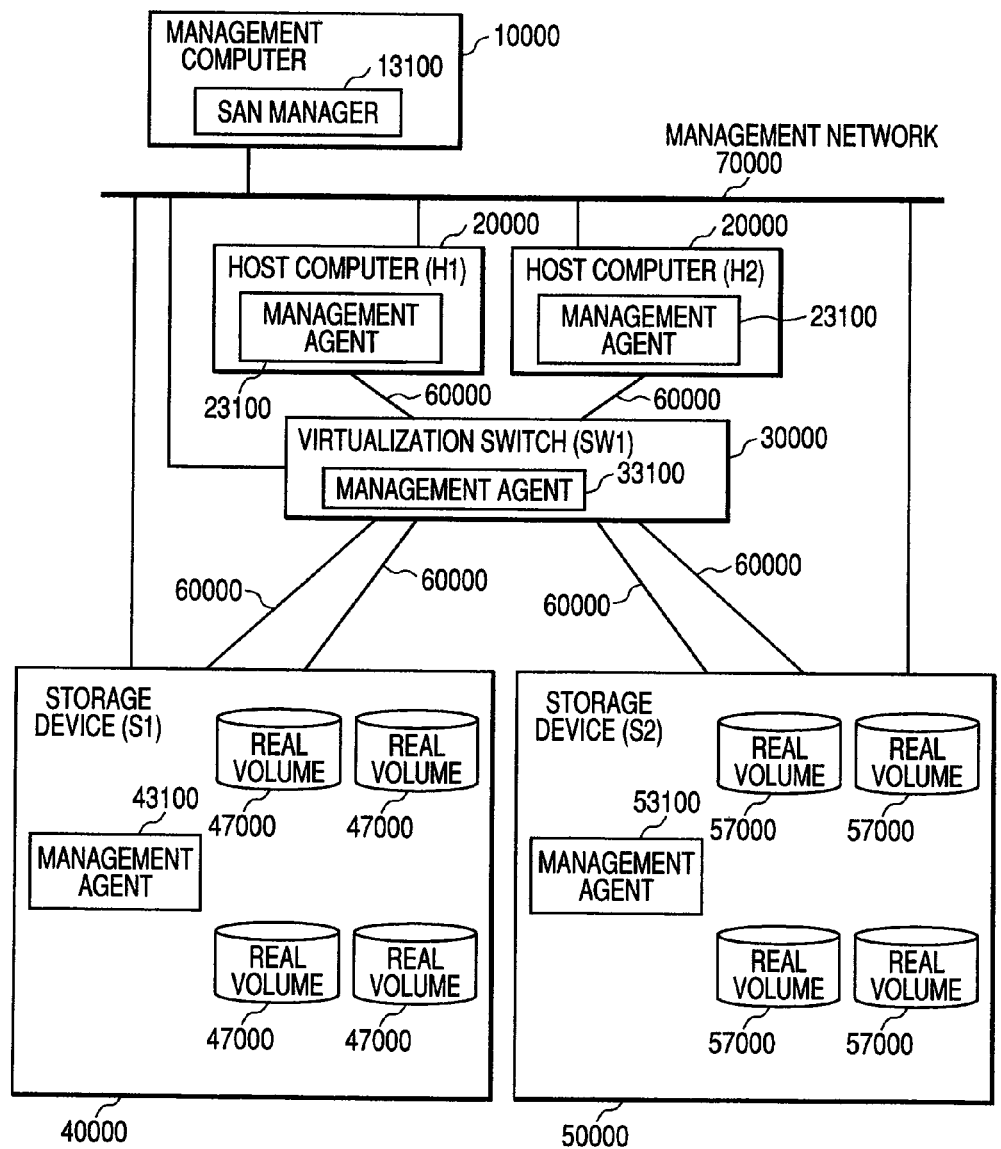
FIG. 1 is a diagram showing a configuration example of a storage network system having a virtualization switch.

FIG. 1 illustrates a configuration example of the SAN. The SAN, in the invention, includes one or more host computers each having a management agent, one or more switches each having a management agent, one or more virtualization devices each having a management agent, one or more storage devices having a management agent, and one management computer having a SAN manager. On the SAN in embodiment 1, connection is assumed to be provided between two host computers (H1, H2) 20000, a virtualization switch (SW1) 30000 for playing a role as one switch-and-virtualization device, and two storage devices (S1, S2), through a fiber channel 60000, for the sake of convenience of the following explanations. Meanwhile, the management computer 10000 is connected to the host computers, the virtualization switches and the storage devices through a management network 70000 so that communication is possible between the management agent of each device and the SAN manager 13100 of the management computer 10000 through the management network. The SAN manager 13100 is to manage the configuration of virtual and real volumes on the SAN by the processing referred to later.

Figure 2:
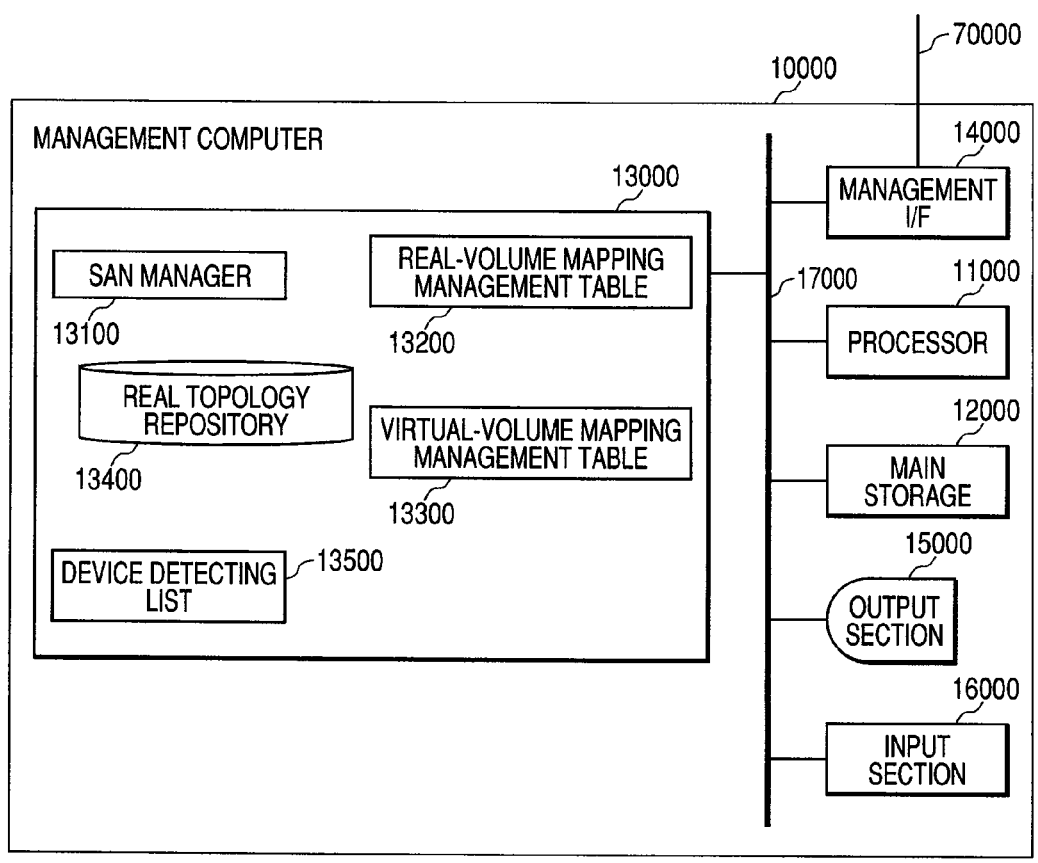
FIG. 2 is a diagram showing a configuration example of a management computer.

FIG. 2 shows a configuration example of the management computer 10000. The management computer 10000 has a processor 11000, a main memory 12000, a nonvolatile storage domain 13000 such as a hard disk, a management I/F 14000 connected to the management network 70000, an output section such as a display device for outputting an execution result of the processing, referred later, when the process, referred later, is executed by the SAN manager 1300, and an input section 16000 such as a keyboard or a mouse. Those are to be mutually connected through a communication line 17000 such as an internal bus. The storage domain 13000 is stored with a SAN manager 13100 as a program to be executed by the management computer, a real-volume mapping management table 13200 holding the real-volume mapping information over the SAN, a virtual-volume mapping management table 13300 holding the virtual-volume mapping information over the SAN, a real topology repository 13400 as a domain for storing the information collected from the management agents provided in the devices on the SAN, and a device detecting list 13500 for holding a listing of the devices the SAN manager 13100 is to manage over the SAN. Note that an OS (operating system) is stored in the storage domain 13000 though not shown. The processor 11000 is to load the OS, SAN manager 13100 and table of in the storage domain 13000 onto the main memory and execute the processing for the management computer.

Figure 3:
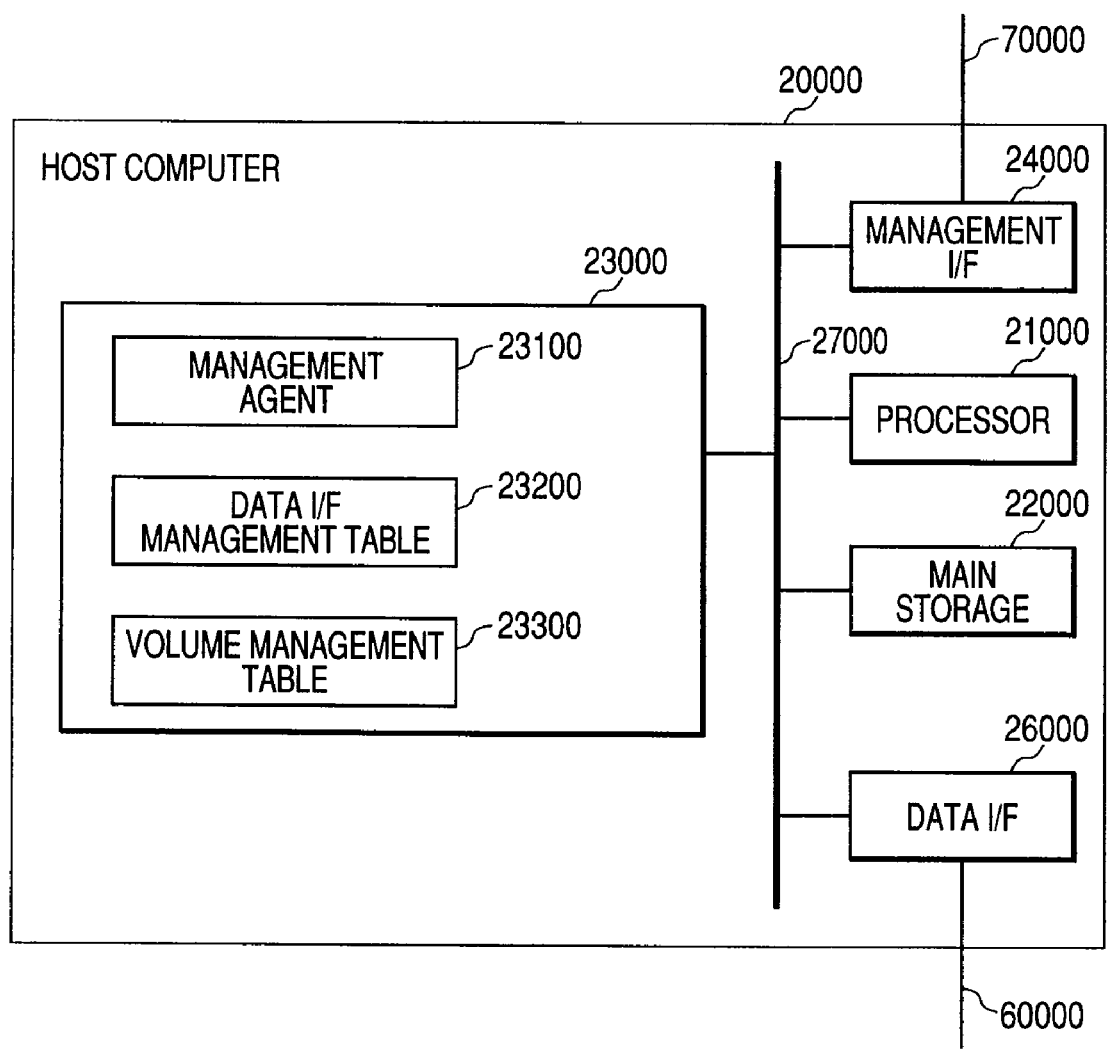
FIG. 3 is a diagram showing a configuration example of a host computer.

FIG. 3 shows a configuration diagram of the host computer 20000. The host computer 20000 has a processor 21000, a main memory 22000, a nonvolatile storage domain 23000 such as a hard disk, a management I/F 24000 to be connected to the management network 70000, and one or more data IF 26000 to be connected to a fiber channel 60000. Those are to be mutually connected through a communication line 27000 such as an internal bus. The storage domain 23000 is stored with a management agent 23100 as a program to communicate with the SAN manager 13100 and exchange the management information of the host computer therewith, a data I/F management table 23200 for holding the management information about the data I/F of the relevant host computer, and a volume management table 23300 for holding the management information about a volume the relevant host computer is to access. Note that, although the embodiment had one data I/F in each of the host computers H1, H2, the data I/F may be provided in plurality. Meanwhile, the data I/F of the host computer is assigned with an identifier (data I/F ID) unique in the host computer. In this embodiment, the data I/F ID of the host computer H1 is assumed having a value al while the data I/F ID of the host computer 1-12 having a value b1. Note that an OS (operating system) and an application program are stored in the storage domain 2300 though not shown. The processor 21000 is to load the OS, application program, management agent 23100 and table within the storage domain 23000 onto the main memory and execute the processing for the host computer.

Figure 4:
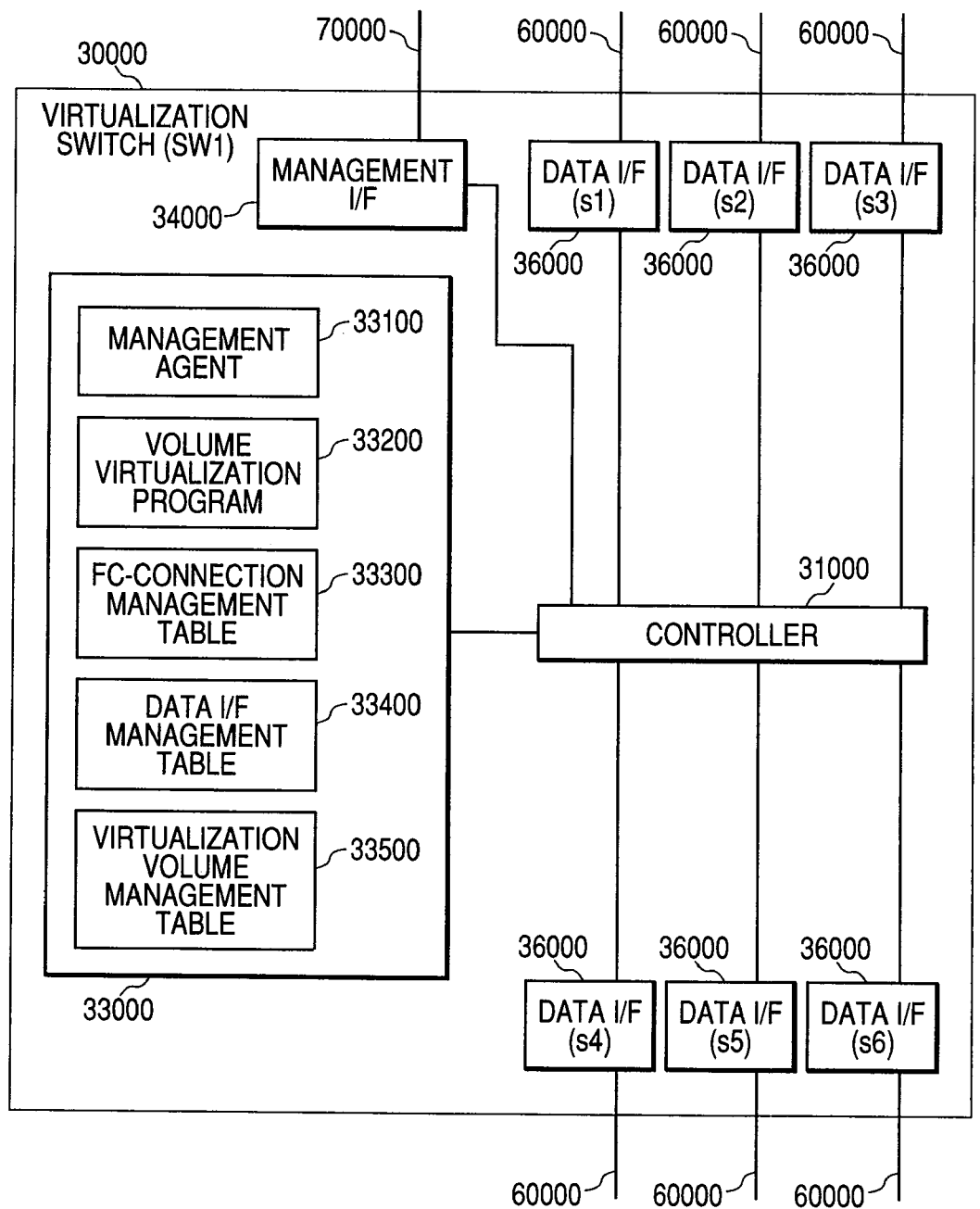
FIG. 4 is a diagram showing a configuration example of a virtualization switch.

FIG. 4 shows a configuration example of the virtualization switch 30000. The virtualization switch 30000 has a controller 31000 realizing a switching and virtual storage function of the data to be exchanged through the fiber channel 60000, a nonvolatile storage domain 33000 such as a hard disk, a management I/F 34000 to be connected to the management network 70000, and one or more data I/Fs 36000 to be connected to the fiber channel 60000. Those are to be mutually connected through the controller 31000. The storage domain 33000 is stored with a management agent 33100 as a program to communicate with the SAN manager 13100 and exchange the management information of the relevant virtualization switch therewith, a volume virtualization program 33200 for realizing a volume virtualization function, an FC connection management table 33300 of the information representative of a connection relationship between the virtualization switch and the host computers and storage devices through the fiber channel 60000, a data I/F management table 33400 for holding the management information about the data I/F of the virtualization switch, and a virtual-volume management table 33500 for holding the management information about the virtual volume which the relevant virtualization switch is providing to the host computers. Note that, although the virtualization switch this embodiment structurally has six data I/Fs, the data I/Fs may be any in the number. Each of the data I/F has an identifier (data I/F ID) unique in the device, whose value is assumed s1, s2, s3, s4, s5 and s6 in this embodiment. Incidentally, a control program for switch-control is stored in a storage domain 33000 though not shown. At a start up of the switch, the control program in the storage domain 33000, the volume virtualization program 33200, the management agent 23100 and the table are loaded onto the controller 31000 so that the processing can be executed as a switch having a volume virtualization function.

Figure 5:
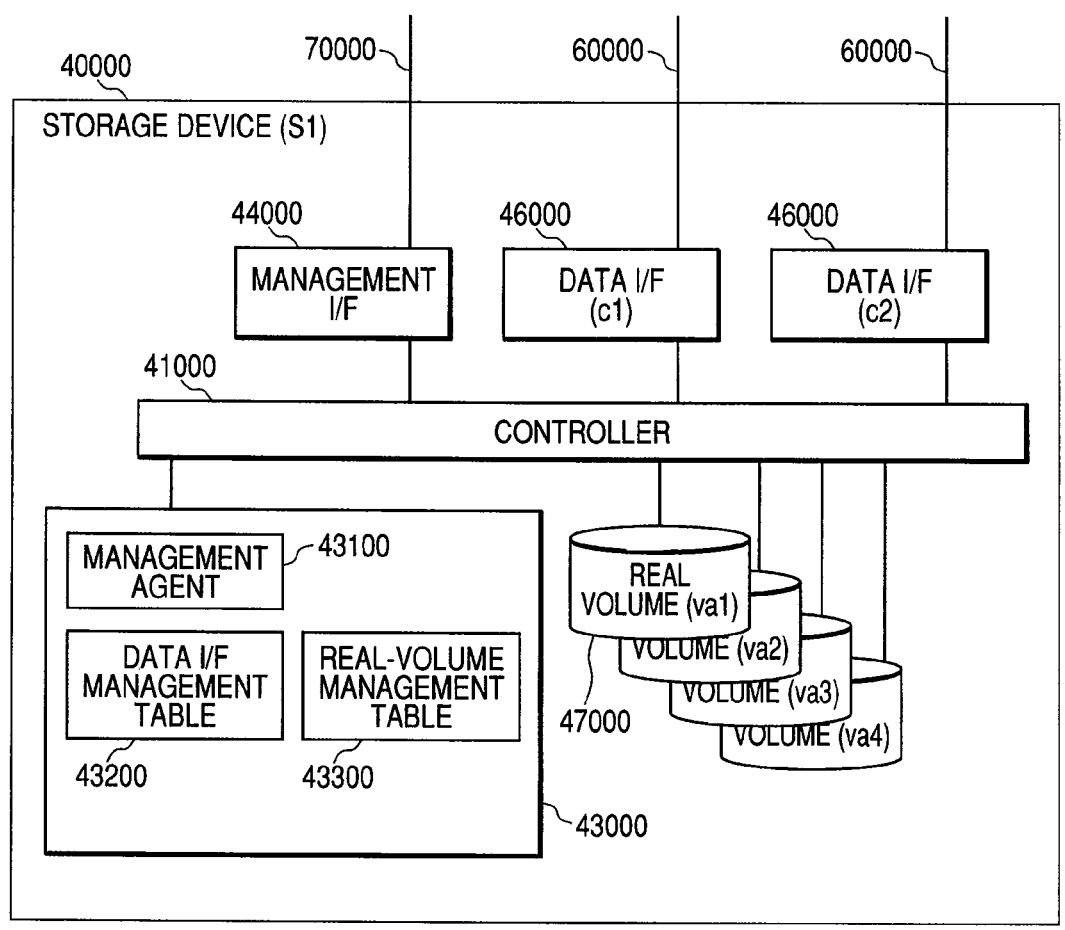
FIG. 5 is a diagram showing a configuration example of a storage device.

FIG. 5 shows a detailed configuration example of the storage device S1. The storage device 40000 has a controller 41000 for internally controlling the storage device, a nonvolatile storage domain 43000 such as a hard disk, a management I/F 44000 to be connected to the management network 70000, one or more data I/Fs 46000 to be connected to the fiber channel 60000, and one or more real volumes 47000 as storage domains to be provided to the host computer and virtualization switch. Those are to be mutually connected through the controller 41000. The storage domain 43000 is stored with a management agent 43100 as a program to communicate with the SAN manager 13100 and exchange the management information of the storage device S1 therewith, a data I/F management table 43200 for holding the management information about the data I/F of the storage device, and a real-volume management table 43300 for holding the management information about a real volume 47000 of the storage device S1. Note that, although the storage device S1 in this embodiment has the two data I/Fs and four real volumes, the data I/Fs and the real volumes are any in the number. The data I/F and the real volumes respectively have identifiers (data I/F IDs and volume IDs) unique in the device wherein, in this embodiment, data I/F ID values are assumed c1, c2 and volume ID values are va1, va2, va3, va4. Note that a control program for controlling the storage device is stored in the storage domain 43000 through not shown. At a start up of the storage device, the control program in the storage domain 43000, the management agent 43100 and the table are loaded onto the controller 4100 so that the processing can be executed for the storage device.

The storage device S2 has a similar configuration to the storage device S1. Note that the storage device S2, in this embodiment, also has two data I/Fs and four real volumes. The storage device S2 is assumed having data I/F ID values of d1, d2 and volume ID values of vb1, vb2, vb3, vb4.

Figure 8:
FIG. 8 is a figure showing an example of a device detecting list held by the management computer.

FIG. 8 shows an example of a device detecting list 13500 held by the management computer 10000. In FIG. 8, a subject-of-detection ID column is registered with numbers desirably assigned in the management computer, a device type column is with types of in-SAN devices, a device information column is with device vendors, device names, etc., an IP address information column is with device addresses on the management network 70000, and a virtualization function column is with whether or not each device has a volume virtualization function. Based on the list, the SAN manager 13100 specifies a management agent for the device and communicates with the relevant management agent. Incidentally, those pieces of information may be previously registered from the management computer 10000 by the SAN administrator. Meanwhile, the information of the device may be acquired from a name service or the like on the fiber channel or the management network without an input given by the SAN administrator.

Figure 9A:
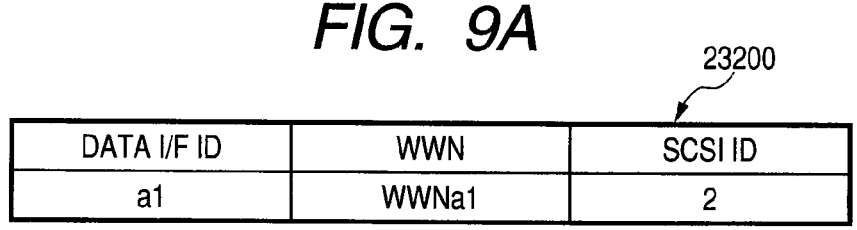
FIGS. 9A and 9B are figures showing an example of a data I/F management table held by the host computer.
Figure 9B:
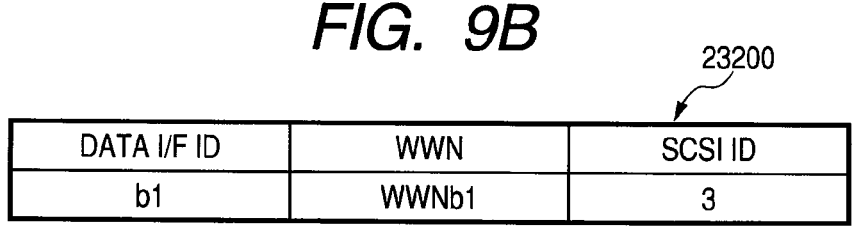

FIGS. 9A and 9B show an example of the data I/F management table held by each of the host computers 20000 wherein FIG. 9A is a table in the host computer 1-11 while FIG. 9B is a table in the host computer 1-12. Those hold the respective pieces of information about data I/F, the IDs of which are a1 and b1, respectively. In the FIG. 9 data I/F ID column, there are registered data I/F ID values held by the respective host computers. In a WWN (World Wide Name) column, there is registered a WWN of the relevant data IF while, in a SCSI ID column, there is registered an identifier of a SCSI target device (SCSI ID number) to which the data I/F is connected. Here, WWN means an identifier to unambiguously identify the data I/F over the fiber channel 60000.

Figure 10A:
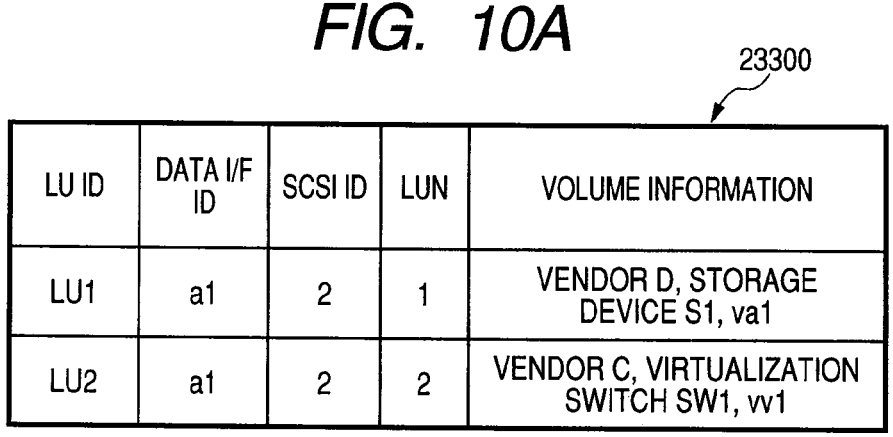
FIGS. 10A and 10B are figures showing an example of a volume management table held by the host computer.
Figure 10B:
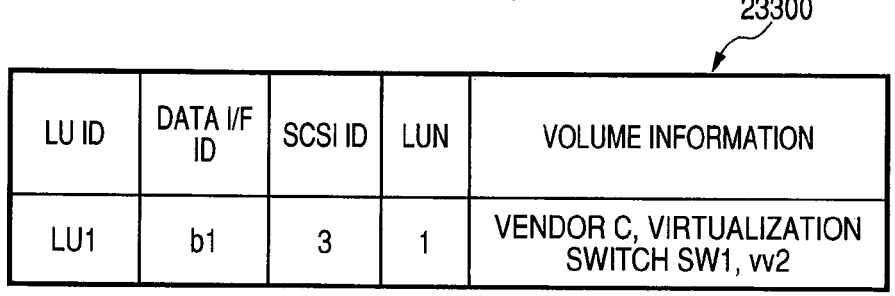

FIGS. 10A and 10B show an example of the volume management table held by the host computer 20000, wherein FIG. 10A is a table in the host computer H1 while FIG. 10B is a table in the host computer H2. The host computer H1 is provided with two volumes while the host computer H2 is with one volume. The host computer holds the information of a volume provided to itself, in its volume management table. The volume manage table has an LU ID column registered with an identifier that is desirably assigned to the volume provided to itself in each of the host computers. A data I/F column is registered with an identifier of on-host-computer data I/F for use in accessing the volume. A SCSI ID column is registered with a SCSI ID number of a SCSI target device to which the data I/F is connected. An LUN column is registered with a SCSI logical unit number for accessing the volume of the SCSI target device. A volume information column is registered with a vendor name and device name, providing a volume to the host computer, to be acquired by means of a SCSI INQUIRY command, and an identifier of the volume.

FIG. 11 shows an example of the FC connection management table 33300 held by the virtualization switch 30000. The FC connection management table holds the information about the destinations of connections of the data I/Fs s1-s6 of the virtualization switch 30000. The FC connection management table has a data I/F ID column registered with ID values of the data I/Fs of the virtualization switch 30000. A switch-side WWW column is registered with a WWN of the data I/F while a destination-of-connection WWN column is registered with a WWN of the data I/F of the host computer or storage device to which the relevant data I/F is connected.

FIG. 12 shows an example of the data I/F management table 33400 held by the virtualization switch 30000. In FIG. 12, the virtualization switch 30000 at its data I/F s1, s2 is providing a virtual volume wherein s1, s2 are recognized as virtual data I/F vs1 and vs2 of from the host computers. In a data I/F ID column of the data I/F management table, registered is an ID value of the data I/F of the virtualization switch 30000. A virtual data I/F ID column is registered with an identifier value that is recognized as an identifier of the relevant data I/F by the host computers. A SCSI ID column is registered with a SCSI ID number assigned to the virtual data I/F.

Figure 13:
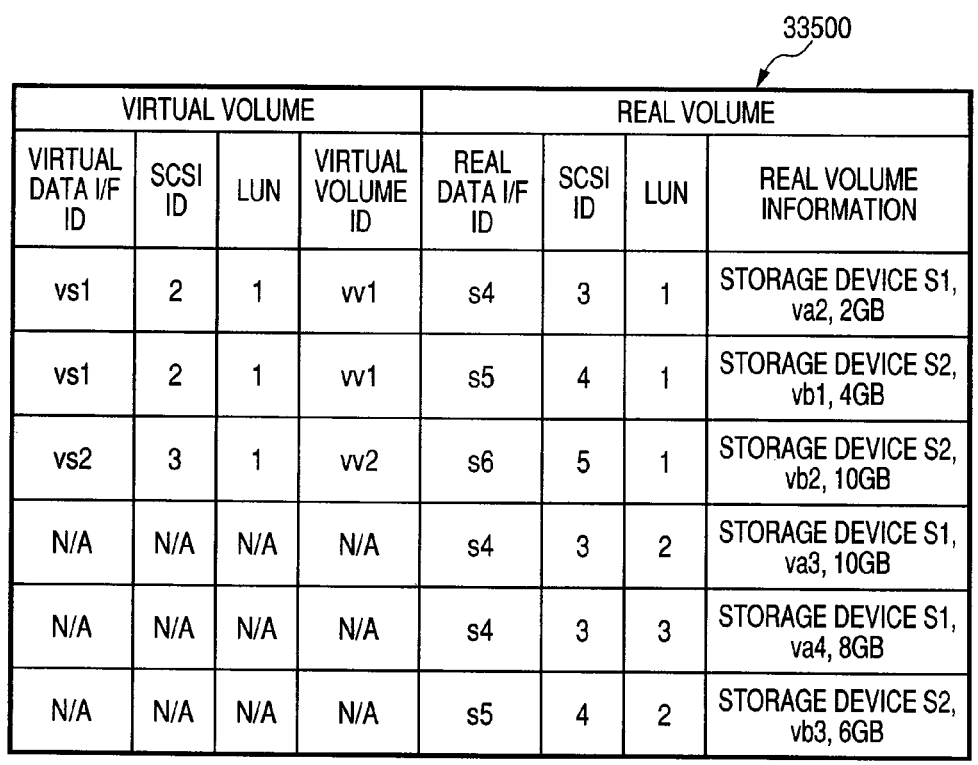
FIG. 13 is a figure showing an example of a virtual-volume management table held by the virtualization device.

FIG. 13 shows an example of the virtual volume management table 33500 held by the virtualization switch 30000. First, explained is the content of the virtual volume column. In a virtual data IF ID column, registered is an identifier value of virtual data I/F held by the virtualization switch 30000 (identifier value registered in the FIG. 12 virtual data I/F ID column). In a SCSI ID column, registered is a SCSI ID number assigned to the virtual data I/F. In an LUN column, registered is a SCSI logical unit number for accessing the virtual volume provided to the host computer through the virtual data I/F. In a virtual volume ID column, registered is an identifier desirably assigned to the virtual volume provided to the host computer through the virtual data I/F. In this embodiment, the virtualization switch 30000 provides a virtual volume vv1 through its virtual data I/F vs1 and a virtual volume vv2 through its virtual data I/F vs2. Here, the reason why two entries concerning the virtual data I/F vs1 are present in the virtual volume column is because the virtual volume vv1 provided from the virtual data I/F vs1 is constituted by two real volumes va2 and vb1. Incidentally, in the case the allocation of a virtual volume to the host computer is not decided, "N/A (Not Applicable)" representative of a value absence is assumed stored in the virtual volume column.

Now description is made on the real volume column content of the virtual volume management table 33500. In a real data I/F ID column, registered is a data IF identifier of the virtualization switch 30000 that is to be used in accessing a real volume constituting a virtual volume designated by an identifier registered in a virtual volume ID column. In a SCSI ID column, registered is a SCSI ID number of a SCSI target device to which the real data I/F is connected. In an LUN column, registered is a SCSI logical unit number for accessing the volume to be provided from the storage device through the real data I/F. In a real volume information column, registered is a name of the storage device providing the real volume accessed through the real data I/F, and an identifier and storage capacity of the real volume which can be acquired by means of a SCSI command. Incidentally, the real volumes va3, va4 accessible from the data I/F s4 and the real volume vb3 accessible from the data I/F s6 are recognized by the virtualization switch 30000. Those, in the future, are allowed to constitute a virtual volume to be provided to the host computer, but currently not being provided as a virtual volume to the host computer. Accordingly, the information about the real volume va3, va4, vb3 is registered only in the real volume column without registered in the virtual volume column. Meanwhile, because the real volume va1 accessible from the data I/F s3 is to be provided to the host computer without virtualized in the virtualization switch 30000, the information about va1 is not registered in the virtual volume management table 33500.

FIGS. 14A and 14B show an example of the data I/F management table held by the storage device, wherein FIG. 14A is a table held by the storage device S1 while FIG. 14B is a table held by the storage device S2. The data I/F management table has a data I/F ID column registered with an identifier value of the data I/F held by the storage device. In a WWN column, registered is a WWN of the data I/F.

FIGS. 15A and 15B show an example of the real volume management table held by the storage device, wherein FIG. 15A is a table held by the storage device S1 while FIG. 15B is a table held by the storage device S2. The real volume management table has a real volume ID column registered with an ID value of the real volume held by the storage device. In a path presence/absence column, registered is a presence/absence of a path to be used in an access of another device to the real volume. In a data I/F column, registered is an identifier value of the data I/F of the storage device that is to be used in accessing the volume. In a SCSI ID column, registered is a SCSI ID number assigned to the data I/F. In a SCSI LUN column, registered is a SCSI logical unit number for accessing the real volume. Incidentally, in the case no real volume is allocated to the host computer or virtualization switch, "absence" is given in the path presence/absence column of real volume, and "N/A (Not Applicable)" representative of a value absence is stored in the data I/F ID column, SCSI ID column and SCSI LUN column.

Virtual-and-Real Volume Configuration Management Process

Description is now made on the virtual-and-real volume configuration management process to be executed by the SAN manager 13100 on the management computer 10000. The steps in the below are assumed to be executed by the SAN manager 13100 unless otherwise described.

FIG. 16 shows a flowchart 1700 outlining a real-topology and virtual-topology display process to be executed by the SAN manager 13100. The SAN manager 13100 detects in-SAN devices on the basis of the device detecting list 13500 and communicates with the management agents of the devices, to copy the respective pieces of information, shown in FIGS. 9 to 15, held by the devices (step 1710).

Then, the SAN manager 13100 stores the copied information in a real-topology repository 13400 (step 1720).

Thereafter, a virtual-volume mapping management table 13300, referred later, is produced on the basis of the information stored at the step 1720 (step 1730).

Furthermore, a real-volume mapping management table 13200, referred later, is produced on the basis of the information in the real-topology repository 13400 and the virtual-volume mapping management table 13300 (step 1740).

Finally, real and virtual topologies are outputted based on the content of the virtual-volume mapping management table 13300 and real-volume mapping management table 13200 (step 1750), thus ending the process.

The real-topology and virtual-topology display process is as per the above.

Incidentally, the real and virtual topologies may be displayed on the same screen.

Figure 17B:
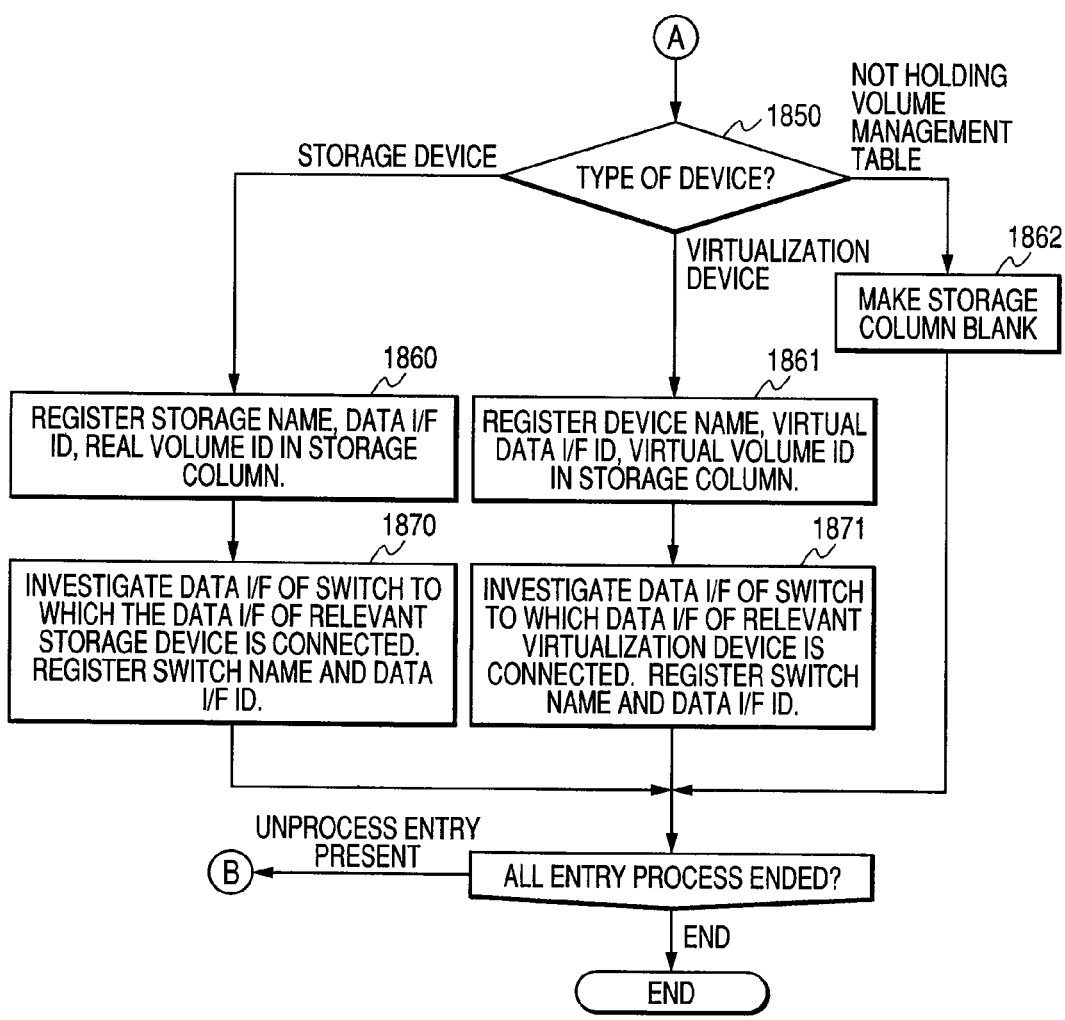

FIGS. 17A and 17B show a flowchart representing a detailed process of the virtual-volume mapping management table producing step 1730 to be executed by the SAN manager 13100. Meanwhile, there is shown in FIG. 7 an example of the virtual-volume mapping management table 13300 produced by the process shown in FIG. 17.

The SAN manager 13100 executes the following process on every entry of the volume management table, as to all the volume management tables 23300 received from the host computers and stored in the real-topology repository 13400 (step 1810).

First, the SAN manager produces a new entry in the virtual-volume mapping management table and registers a newly assigned virtual mapping ID 13301. Furthermore, the SAN manager registers a source host computer name 13302 of the volume management table 23300 now under processing, and the data IF ID 13304 and LU ID 13303 stored in the volume management table (step 1820).

Then, the SAN manager investigates the data I/F of a switch to which the data I/F 13304 registered is to be connected, and registers a switch name 13305 and data IF ID 13306. Specifically, the SAN manager first retrieves a data I/F management table 23200 received from the host computer and stored in the real topology depository 13400 by use, as a key, of the data IF ID 13304 of host computer registered in the virtual-volume mapping management table 13300, thus examining a WWN of the relevant data IF ID. Furthermore, the SAN manager retrieves an FC-connection switch table 333000 received from the virtualization switch 30000 and stored in the real depository 13400 by use of the WWN as a key, and retrieves which data IF of which switch the relevant host computer is being connected so that a result thereof can be registered as a destination-of-connection switch name 13305 and destination-of-connection switch data I/F ID 13306 (step 1830).

Owing to the above process, the information about the host computer is registered in the left half (host computer column) of the virtual-volume mapping management table 13300.

Then, the SAN manager performs a process for registering information in the left half (storage column) of the virtual-volume mapping management table 13300.

The SAN manager examines whether or not the volume registered in the volume management table is provided by the virtualization switch 30000, from the vendor name and device name registered as volume information in the volume management table 23300. Specifically, the SAN manager retrieves a device detecting list 13500 by use of the device name as a key, and checks the relevant device for a presence/absence of a virtualization function. In the case it has a virtualization function, decision is as provision from the virtualization switch 30000 (step 1840).

Incidentally, in the present embodiment, in the case the volume is provided from the switch A, the relevant volume is decided provided from the virtualization switch 30000. Depending upon the result of step 1840, the process branches as in the following (step 1850).

In the case the volume is provided from the other device than the virtualization switch 30000, the SAN manager registers the device name and volume ID registered in the volume information column of the volume management table 23300, as a storage name 13309 and volume ID 13311 in the storage column of the virtual-volume mapping management table 13300. Furthermore, the SAN manager retrieves the real-volume management table received from the storage device by use of the registered volume ID 13311 as a key, and investigates the ID of the data I/F for use in accessing the real volume thereby registering a result thereof as a storage data I/F ID 13310 (step 1860).

The SAN manager investigates the data I/F of a switch to which the registered storage data IF 13310 is to be connected, and registers a name and data I/F ID of the switch. Specifically, the SAN manager first retrieves the data I/F management table received from the storage device by use of the storage data I/F ID 13310 as a key, and investigates the WWN of the storage data I/F. Further, it retrieves the FC-connection switch table 33300 received from the virtualization switch 30000 by use of the WWN as a key and examines to which data I/F of which switch the relevant storage data I/F is connected. Then, the SAN manager registers an investigation result as a destination-of-connection switch name 13307 and destination-of-connection switch data I/F ID 13308 (step 1870).

At step 1850, in the case decided that the volume is provided from the virtualization device, the SAN manager performs the following process. First, the SAN manager registers the device name and volume ID registered in the volume information column of the volume management table 23300, as a storage name 13309 and volume ID 13311 in the virtual-volume mapping management table 13300. Furthermore, the SAN manager retrieves the virtual-volume management table 33500 received from the virtualization switch 30000 by use of the registered volume ID 13311 as a key, and investigates a virtual data I/F ID of the virtualization switch 30000 for use in accessing the virtual volume, thus registering a result thereof as a storage data I/F ID 13310 (step 1861).

Then, investigation is made for a switch data I/F corresponding to the virtual data I/F of the virtualization switch 30000, to register a switch name and data I/F ID. Specifically, the SAN manager retrieves the data I/F management table 33400 received from the virtualization switch 30000 by use of the storage data I/F ID 13310 as a key, and investigates a switch data I/F ID corresponding to the relevant virtual data I/F, thus registering a result thereof as a destination-of-connection switch name 13307 and destination-of-connection switch data I/F ID 13308 (step 1871).

In the case the volume management table 23300 is not stored in the real topology repository 13400 because the device is unregistered in the device detecting list 13500 and in the case the device is not provided with a management I/F, device type is exceptionally impossible to decide at the step 1850. Where there is no information registered in the volume information column of the volume management table 23300 in this manner, the storage column is rendered blank (step 1862).

When the SAN manager has executed the above step on all the entries in the volume management table received from the host computers and stored in the real topology repository 13400, the process of step 1730 completes.

The virtual-volume mapping management table producing step 1730 is as per the above.

Figure 18:
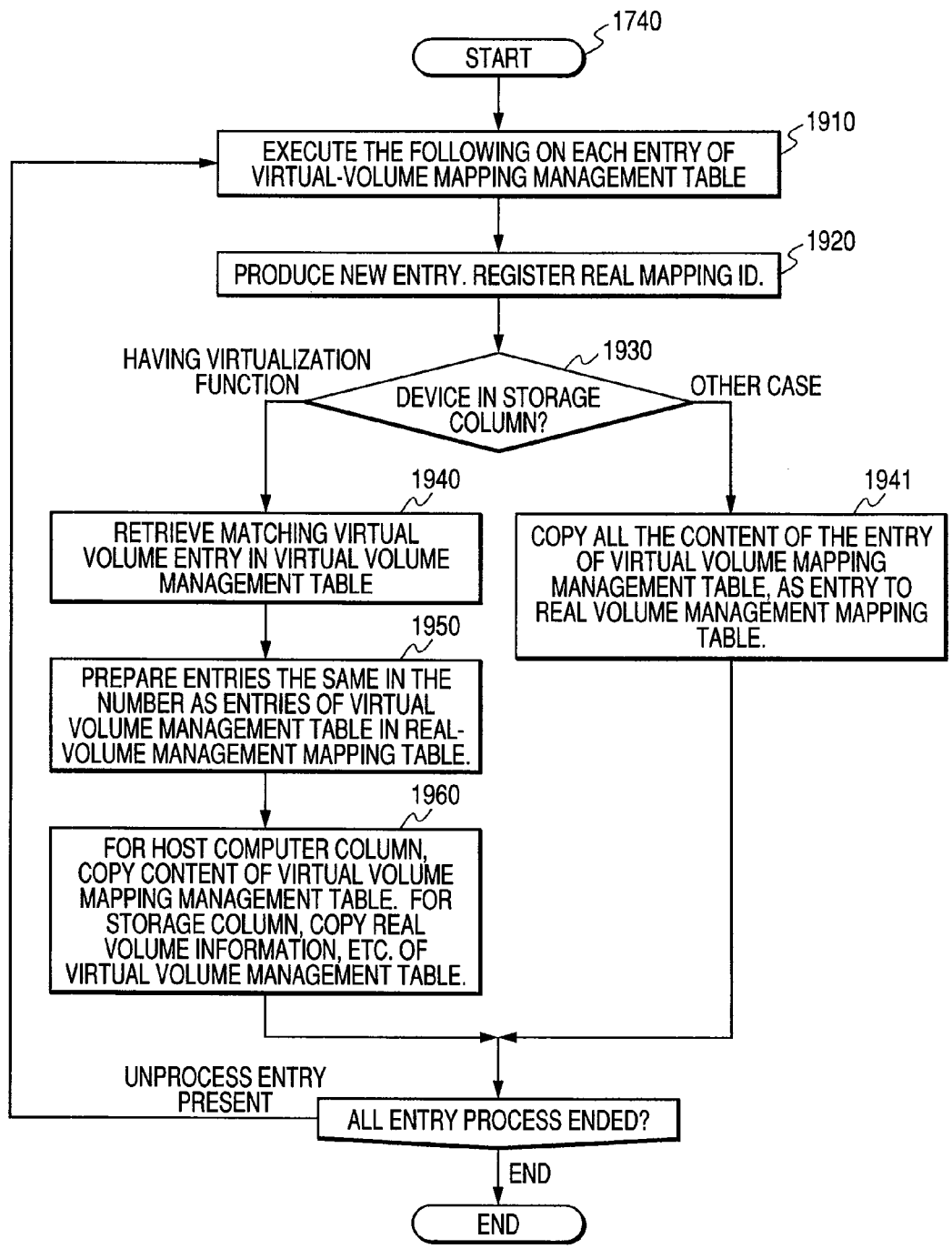
FIG. 18 is a flowchart showing a detailed process content example of a real-volume mapping management table producing step to be executed by the management computer.

FIG. 18 shows a detailed process flow of the real-volume mapping management table producing step 1740 to be executed by the SAN manager 13100. Meanwhile, FIG. 6 shows an example of the real-volume mapping management table produced by the process shown in FIG. 18.

The SAN manager 13100 executes the following process on all the entries of the virtual-volume mapping management table 13300 produced at step 1730 (step 1910).

First, the SAN manager produces a new entry and registers a newly assigned real mapping ID 13201 (step 1920). Then, based on the storage names of the entries in the virtual-volume mapping management table 13300, the SAN manager decides whether or not the device represented by the storage name has a virtualization function. Specifically, the device detecting list 13500 is looked up by use of the storage name 13309 as a key, to check for a presence/absence of virtualization function in the relevant device (step 1930).

In the case of having a virtualization function, the SAN manager performs the following steps. The SAN manager retrieves the virtual-volume management table 33500 received from the device represented by the storage name 13309 by use, as a key, of the volume ID 13311 in the entries of the virtual-volume mapping management table, and extracts an entry of virtual volume ID matched to the volume ID 13311 (step 1940).

Then, the SAN manager prepares the entries the same in the number as the entries obtained by the retrieval, in the real-volume management mapping table (step 1950).

Then, the SAN manager copies, for the prepared entry, the content (13202 to 13306) in the host computer column of the entry being currently processed of the virtual-volume mapping management table 13300, to the host computer column (13202 to 13206). To the switch data I/F ID column 13208 of the storage column, copied is the real data I/F ID content of the real-volume information column of the entry in the virtual-volume management table 33500 extracted at the step 1940. Meanwhile, to the storage name entry 13209 and volume ID entry 13211 of the storage column, copied is the storage name and volume ID registered as real-volume information in the real-volume information column of the relevant entry in the virtual-volume management table 33500. Meanwhile, to the corresponding virtual mapping ID column 13212, registered is the virtual mapping ID 13301 content of the virtual-volume mapping management table 13300. To the switch name column 13207 of the storage column, copied is the switch name 13307 content of the storage column of the virtual-volume mapping management table (step 1960).

Furthermore, the SAN manager retrieves the real-volume management table 43300 received from the storage device by use, as a key, of the volume ID registered in the volume ID 13211 of the storage column of the real-volume mapping management table 13212 to thereby retrieve the data IF ID to which the relevant volume is to be connected, and registers it in the storage data I/F ID 13210 of the storage column of the virtual-volume mapping management table.

In the case decided not having a virtualization function at the step 1930, the SAN manager copies the entry now under processing (13302 to 13311) of the virtual-volume mapping management table 13300 to the entry (13202 to 13211) of the real-volume mapping management table 13200, to thereby register the virtual mapping ID 13301 content of the virtual-volume mapping management table 13300 to the corresponding virtual mapping ID 13212 of the real-volume mapping management table 13200.

By virtue of the above process, the entries 13201 to 13212 of the real-volume mapping management table 13200 are registered.

When the above steps have been executed on all the entries of the virtual-volume mapping management table 13300 by the SAN manager, the process shown at the step 1740 completes.

The real-volume mapping management table producing step 1740 is as per the above.

Figure 19:
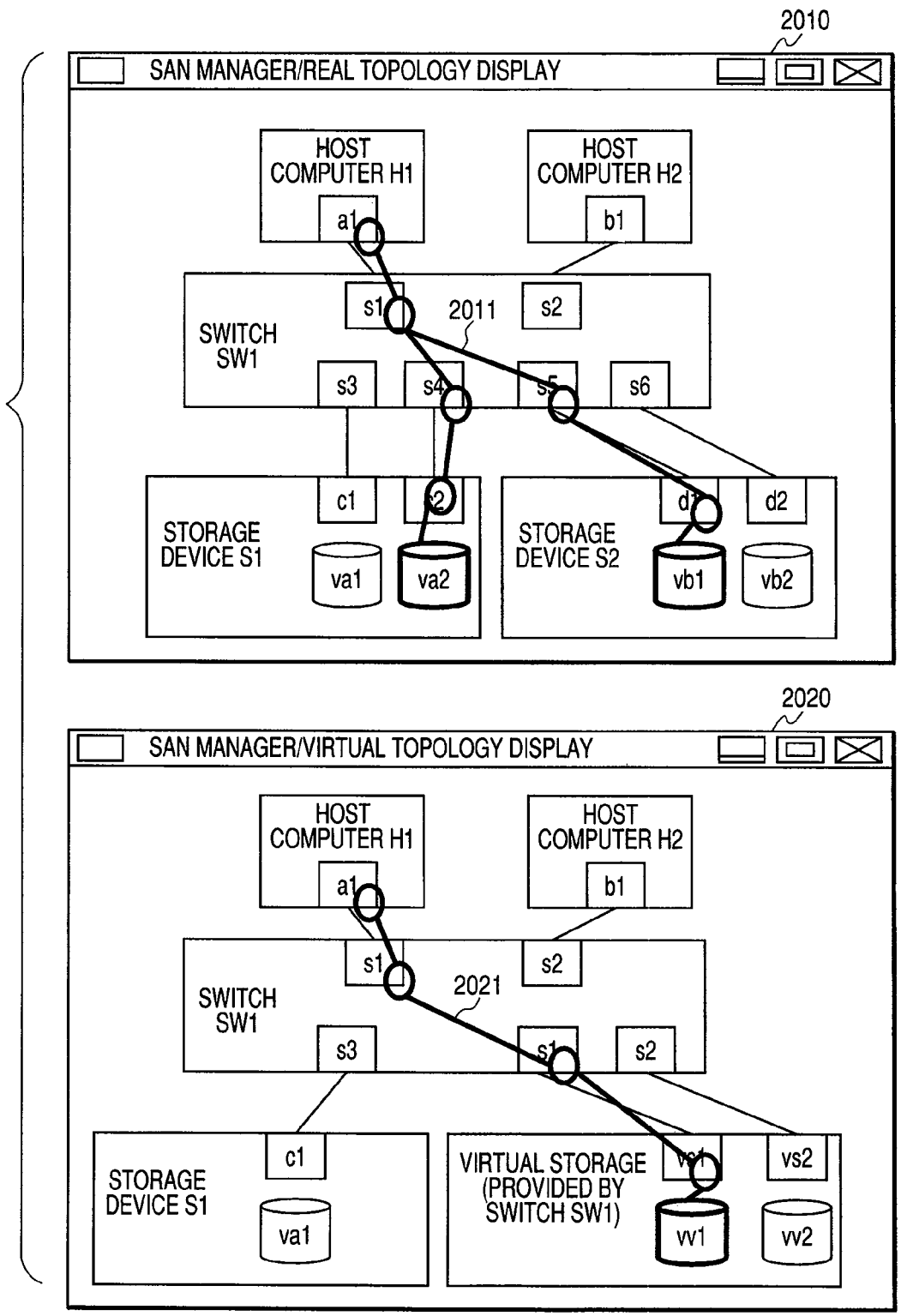
FIG. 19 is a figure showing an example of real topology display and virtual topology display outputted by the management computer.

FIG. 19 shows an example of real-topology and virtual-topology display which the SAN manager 13100 has outputted onto the output section 15000, based on the mapping table shown in FIGS. 6 and 7. A real topology display 2010 is an output example representing the connection relationship between the host computers, the switches and the storages, depending upon the content of the real-volume mapping management table 13200. A virtual topology display 2020 is an output example representing the connection relationship between the host computers, the switches and the storages (including virtual storages) depending upon the content of the virtual-volume mapping management table 13300.

Consider the case that the SAN administrator gives an instruction to the input section of the management computer to designate a virtual mapping 2021 of from virtual volume vv1 to host computer H1, on the virtual topology display 2020, for example.

The virtual mapping 2021 is displayed based on the data registered on the line where the virtual mapping ID 13301 is given vm2 in the virtual-volume mapping management table 13300 shown in FIG. 7. When such a virtual mapping 2021 is designated by the SAN administrator, the SAN manager retrieves the real-volume mapping management table 13200 shown in FIG. 6 by use, as a key, of the virtual mapping ID vm2 corresponding to the virtual mapping 2021. Then, the SAN manager displays a real mapping in the real topology display 2010, depending upon the data registered for all the lines where the corresponding mapping ID 1312 is given vm2, in the real-volume mapping management table 13200. The real mapping displayed as a result thereof is the real mapping 2011 shown in FIG. 19.

Meanwhile, consider the case that the SAN administrator gives an instruction to the input section of the management computer to designate a real mapping of from real volume va2 to host computer H1, on the real topology display 2010, for example.

The virtual mapping of from real volume va2 to host computer H1 is displayed based on the data registered for the line where the real mapping ID 13201 is given pm2 in the real-volume mapping management table 13200 shown in FIG. 6. When such a real mapping is designated by the SAN administrator, the SAN manager retrieves the virtual-volume mapping management table 13300 shown in FIG. 7 by use, as a key, of the virtual mapping ID 13212 value vm2 stored in the real mapping entry. Then, the SAN manager displays a real mapping 2021 in the virtual topology display 2020, depending upon the data registered for all the lines where the corresponding mapping ID 1312 is given vm2 in the virtual-volume mapping management table 13300. Meanwhile, the SAN manager also retrieves the real-volume mapping management table 13200 shown in FIG. 6 by use, as a key, of the value vm2 of virtual mapping ID 13212, thus retrieving the other lines where the virtual mapping ID 13212 has a value vm2. In case there is a matched one, the matched real mapping is displayed in the real topology display 2010. The virtual mapping displayed as a result thereof is the virtual mapping 2021 shown in FIG. 19.

Incidentally, though not shown in detail, there can be considered the following three methods as other ways to output a result in the embodiment.

The first method is a method that, by giving an instruction to the input section of the management computer by the SAN administrator, configuration information, such as a real-volume mapping table, a virtual-volume mapping table and a corresponding relationship between a real volume and a virtual volume, is outputted in a format readable by the SAN administrator, e.g. in a text form.

The second method is a method that, by giving a command input at the input section of the management computer by the SAN administrator, configuration information like the above is outputted as an output result of the input command.

The third method is a method that another SAN-management software, etc. executes an application program interface (hereinafter, abbreviated as API) disclosed in order for the SAN manager to output the configuration information, to give an output as an API return value.

As a result of those, the SAN administrator is allowed to easily know a relationship between a real volume and a virtual volume through a mutual topology display as a start point.

By virtue of the configuration management technique of virtual and real volumes shown in the embodiment, the SAN administrator is allowed to easily know the relationship between host computer and virtual volume and the relationship between virtual and real volumes even where the SAN is in a complicated configuration.

Description is now made on modifications to the embodiment. The present modification demonstrates a failure influential range detecting function which is to detect an influential range of a storage system failure upon real and virtual volumes by use of the corresponding relationship between real and virtual volumes on a storage network, in a SAN having a switch-and-virtualization device.

For the failure monitor function based on the existing SAN management software, it is a frequent practice to use an SMP protocol trap message, defined under RFC1157 "A Simple Network Management Protocol (SNMP)" prepared by IETF (Internet Engineering Task Force). However, because the volume allocated to the host computer is virtualized by the virtual storage technique, there is a difficulty in specifying a failure point on a virtual-volume level.

For this reason, in this modification, the management computer holds an event dictionary for construing the content of a failure notification message received from the devices on the SAN, in addition to the configuration shown in FIG. 2. The SAN manager, received a failure notification issued from the device, is to detect an influence of the failure upon the I/O access to a real volume, based on the SAN configuration information acquired from the event dictionary or the management agent and stored in the real topology depository. Furthermore, the SAN manager is to look up virtual-volume mapping information and detect an influence of the failure upon the I/O access to a virtual volume. The SAN manager outputs the detection result of those by an association with virtual-volume and real-volume mapping information, thereby relieving the SAN manager of the burden imposed in specifying a failure and taking a measure.

SAN Configuration

Description is made on the configuration of a SAN and devices on the SAN in the present modification, only on the point different from the foregoing embodiment.

Figure 20:
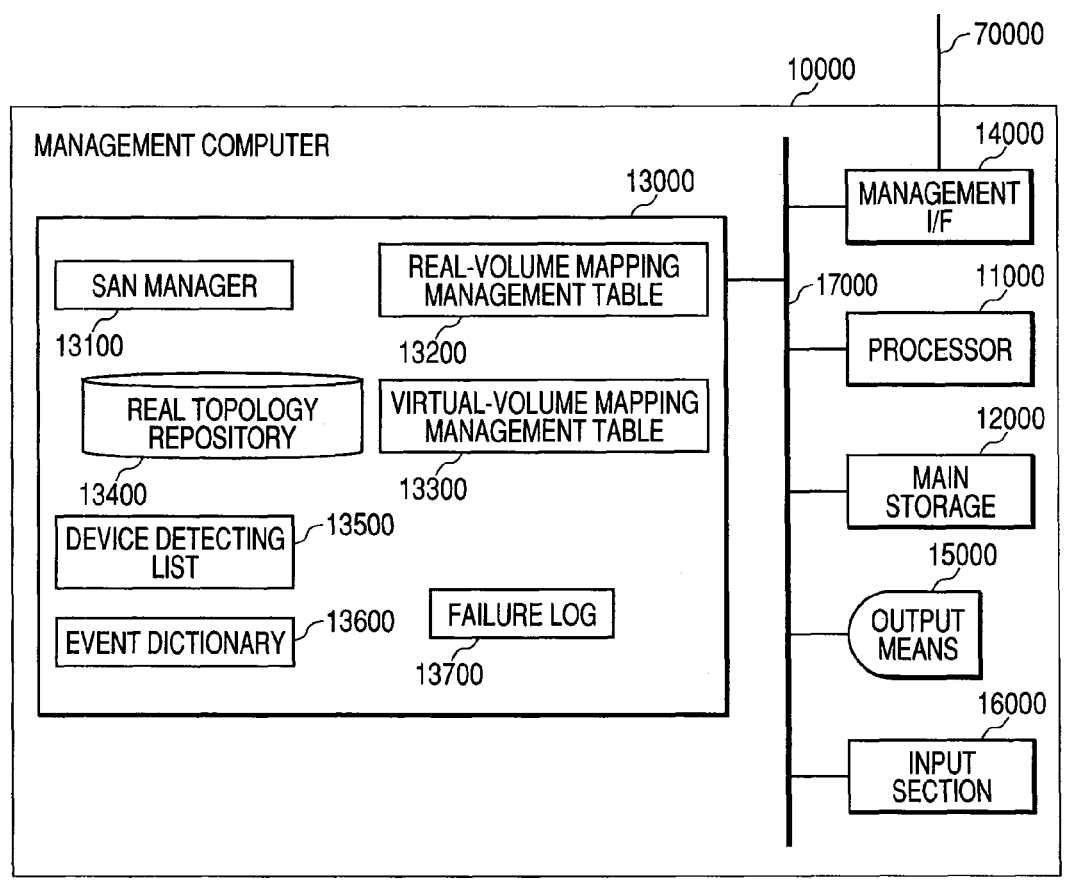
FIG. 20 is a diagram showing a configuration example of the management computer.

FIG. 20 shows a configuration example of a management computer 10000 in the present modification. In this modification, the management computer 10000 has, in the storage domain 13000, one or more event dictionaries 13600 for construing the content of a failure notification message received from the device on the SAN, and a failure log 13700 for recording event contents.

Figure 26A:
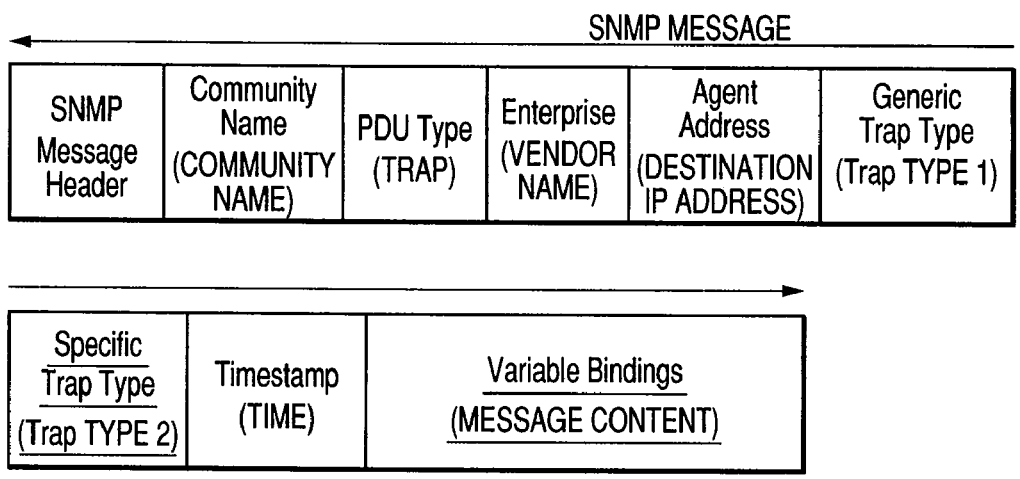
FIGS. 26A and 26B are figures showing a structural example of a SNMP Trap message.
Figure 26B:
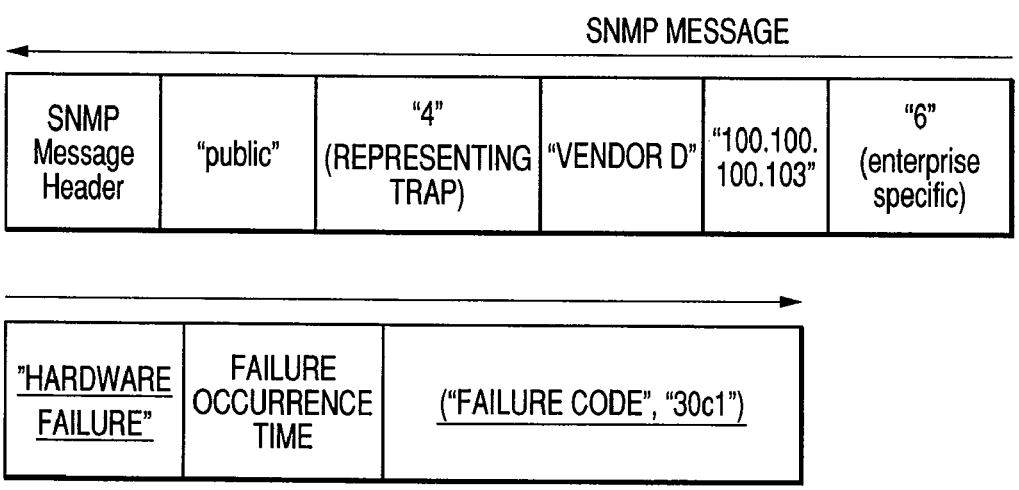

FIGS. 26A and 26B show a format of a SNMP Trap message the SAN manager on the management computer 10000 is to receive from the devices on the SAN, and an example of an SNMP Trap message. Here, the SNMP message refers to a failure notification message to be sent by the management agent of the in-SAN device to the management computer 10000. FIG. 26A illustrates a SNMP Trap message format. The SNMP message is structured with the fields of a message header, a community name the message is to be sent, a PDU (Protocol Data Unit) Type representative of a message type, Enterprise representative of a vendor name of destination device, Agent Address representative of a destination IP address, Generic Trap Type and Specific Trap Type representative of a Trap message type, Time Stamp representative of a message transmission time, and a Variable Bindings storing a message content. When the PDU Type field has a value "4", the relevant message is identified as an SNMP Trap message. Meanwhile, when the Genetic Trap Type field has a value "6", the relevant SNMP Trap message is identified as a Trap message based on the definition unique to a source device vendor. There is a need to construe a Trap message depending upon the content of the Specific trap field and Variable Binding field (the underlined in the figure).

FIG. 26B shows an example of an SNMP Trap message which the storage device S1 40000 is to forward in order to notify a hardware failure in its own device, in the present modification. The message shown in FIG. 26B is to be recognized as an SNMP Trap message because its PDU Type is "4", and as a Trap message based on the definition unique to the source vendor because its Generic Trap Type is "6". Furthermore, this modification is assumed under the vendor's definition that failure codes are stored to represent a failure type in the Specific Trap Type and a failure occurrence point in the Variable Bindings. Accordingly, the SNMP Trap message shown in FIG. 26B represents that a hardware failure is occurring at a point identified by a failure code 30c1.

Figure 21:
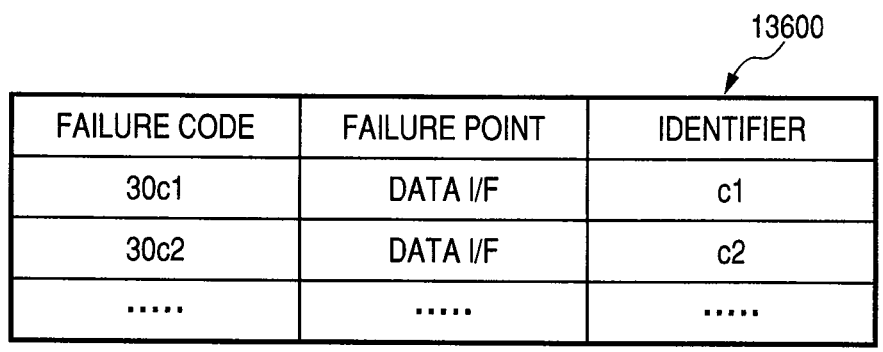
FIG. 21 is a figure showing an example of an event dictionary concerning storage held by the management computer.

FIG. 21 shows an example of a SNMP Trap message conversion list concerned with storage device S1 which the management computer 10000 possess in the event dictionary 13600. This list is a listing of in what point a failure is represented by the failure code in the Variable Bindings field of the SNMP Trap message issued by the storage device S1, being registered with a failure occurrence point corresponding to the failure code and an identifier of the relevant failure occurrence point.

Figure 22:
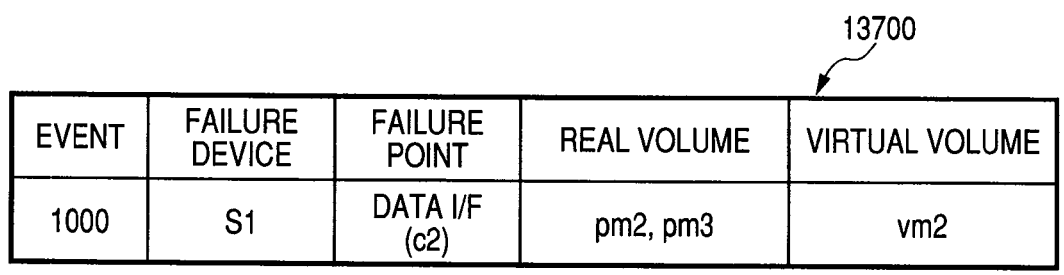
FIG. 22 is a figure showing an example of a failure log held by the management computer.

FIG. 22 shows a failure log 13700 possessed by the management computer 10000. The failure log is registered with an event ID assigned upon receiving a failure notification message by the SAN manager, a source device name of the failure notification message, an in-device point of trouble occurrence, an ID of the real mapping including the point, and an ID of the virtual mapping including the point.

Figure 23:
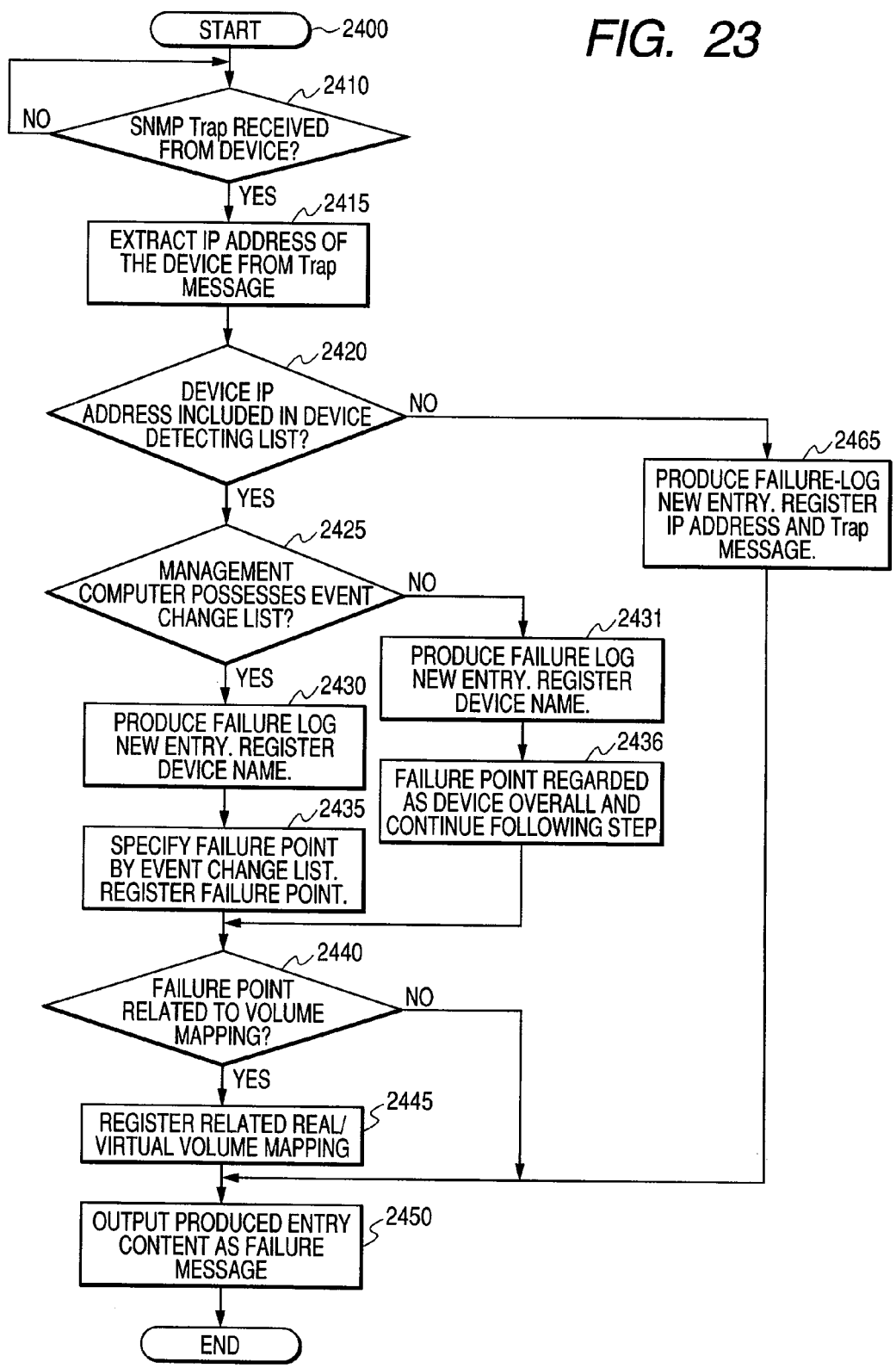
FIG. 23 is a flowchart showing an example of a failure monitoring process to be executed by the management computer.

Failure Influential Range Detecting Process Upon Real and Virtual Volumes in Storage System Failure FIG. 23 shows a flowchart 2400 of a failure influential range detecting process to be executed by the SAN manager 13100 on the management computer 10000. The steps in the below are assumed to be executed by the SAN manager 13100 unless otherwise described.

The SAN manager 13100 waits until an SNMP Trap message is received from a certain device (step 2410).

After receiving a message, the SAN manager extracts an IP address of message-issued device from the Agent Address field of the message (step 2415) and retrieves the device detecting list 13500 stored in the real topology repository 13400 by use of the extracted IP address as a key (step 2420).

In the case there is no IP address in the device detecting list 13500, the SAN manager is not allowed to analyze a Trap message content because the Trap message is from an unregistered device. Accordingly, the SAN manager produces a new entry in the failure log 13700 and allocates an event ID thereon, to output an IP address as a failure device and a Trap message itself as a failure point (step 2465), thus ending the process.

At step 2420, in the case the IP address as extracted is present in the device detecting list 13500 and hence the device issued the Trap message can be specified, the SAN manager confirms whether the management computer 10000 has an event dictionary for the relevant device (step 2425).

In the case detected as a presence of an event dictionary, the SAN manager produces a new entry in the failure log 13700 and allocates an event ID thereon, thus registering a device name (step 2430).

Subsequently, the SUN manager retrieves the event dictionary by use, as a key, of the Variable Bindings field of the Trap message, and specifies a failure point, thus registering the failure point and its identifier in the failure log 13700 (step 2430).

In the case there is provided no event dictionary at the step 2425, the SAN manager produces a new entry in the failure log 13700 and allocates an event ID thereon, thus registering a device name (step 2431).

Meanwhile, the SAN manager regards the failure point as the device entirety and hence registers the device entirety as a failure point in the failure log 13700, thus continuing the subsequent step (step 2436).

After registering the failure point in the failure log 13700, the SAN manager examines whether the registered point has a relation to a real volume (step 2440).

Specifically, the SAN manager retrieves whether there is a matching entry in the real-volume mapping management table 13200, by use, as a key, of a failure device name and a failure point or its identifier. In case there is a matching entry, the SAN manager extracts a real mapping ID 13201 and virtual mapping ID 13212 from the entry, and copies those respectively as a real volume and a virtual volume to the entry under production of the failure log 13700 (step 2445).

Finally, the SAN manager outputs the entry content of the produced failure log, as a failure message (step 2450).

After processing the above, the flowchart 2400 is ended.

FIG. 22 shows a failure log produced as a result of executing the process shown in FIG. 23 by the SAN manager received a SNMP Trap message, when SNMP Trap message is issued, including a failure code 30c2 representative of a failure on the data I/F c2, from the storage A.

The data I/F c2 of the storage A, in the real-volume management table 13200, is corresponded to the virtual mapping ID vm2 while the virtual mapping ID vm2, in the real-volume management table 13200, is corresponded to the real mapping ID pm2 and real mapping ID pm3. Thus, the failure log 13700 has such a content as shown in FIG. 22.

Figure 24:
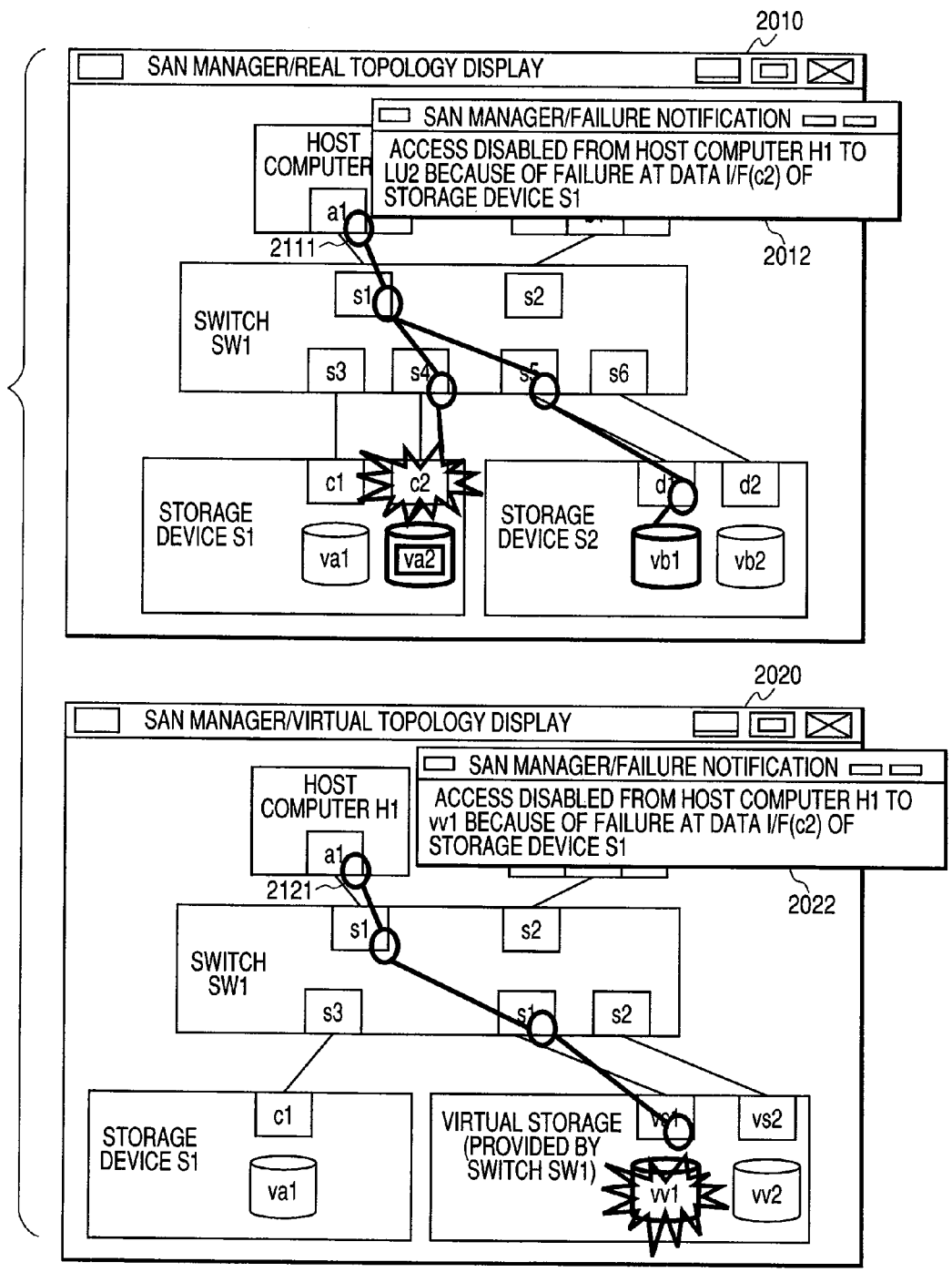
FIG. 24 is a figure showing an example of failure notification display outputted by the management computer.

FIG. 24 shows an example of a failure notification message which the SAN manager is to output to the output section 15000 with reflecting the content of the failure log shown in FIG. 22 in the real topology display and virtual topology display shown in FIG. 19.

The output example based on the content of the real-volume mapping management table 13200 is the real topology display 2010. In the real topology display, a real mapping represented by a real mapping ID registered in the failure log 13700 is displayed as a real mapping 2111 to undergo the influence of failure. Furthermore, displayed is an LU ID 13203 registered in the real-volume mapping management table 13200 correspondingly to the failure device name registered in the failure log 13700, the failure point and the real mapping ID registered in the failure log (in-real-topology-display failure notification message 2012).

Furthermore, the SAN manager displays a virtual mapping represented by the virtual mapping ID registered in the failure log 13700, as a virtual mapping 2121 to undergo the influence of failure, in the virtual topology display 2020 outputted based on the content of the virtual-volume mapping management table 13300. Meanwhile, displayed also is a volume ID 13311 registered in the virtual mapping management table 13300 correspondingly to the failure device name registered in the failure log 13700, the failure point and the real mapping ID registered in the failure log (in-virtual-topology-display failure notification message 2012).

Incidentally, the following six methods can be considered as other ways to output a result in the present modification, though not shown in detail.

The first method is a method to output the failure log held in the management computer in a format the SAN manager can read, e.g. in a text form, by giving an instruction at the input section of the management computer by the SAN manager.

The second method is a method to output the failure log as an output result of the input command by giving a command-input at the input section of the management computer by the SAN manager.

The third method is that other SAN management software, etc. executes the API disclosed in order to output the configuration information by the SAN manager, thereby making an output as an API return value.

The fourth method is a method that the management computer outputs a failure log in compliance with a log output protocol, e.g. syslog protocol.

The fifth method is a method that the management computer outputs, as a SNMP Trap, a failure log to another SAN management program established beforehand by the SAN administrator.

The sixth method is a method that the management computer notifies a failure log to a management-operator's mail/cellular phone/pager established beforehand by the SAN administrator.

By using the failure management function for detecting an influential range of a storage system failure upon real and virtual volumes shown in this modification, the SAN administrator is allowed to easily know what affection the hardware failure of the device exerts to a real and virtual volumes.

By virtue of the virtual-volume management function of the virtualization device, the SAN administrator is allowed to allocate a virtual volume on the host computer without being conscious with the real volume of a multiplicity of storage devices different in kind. Nevertheless, where allocating a virtual volume on the host computer in consideration of performance and reliability for example, the SAN administrator, in a certain case, desires to allocate the virtual volume consciously of the connection relationship between the real volume constituting a virtual volume and the host computer and its real volume. Meanwhile, on the SAN requiring such high availability and reliability as 24-hour-based operation without shutdown all the year round, a configuration for fail-over, i.e. normal and standby systems, is provided in preparation for emergency. In such an environment, there is a need of a system design conscious of a physical configuration not to share resource between the normal and standby systems. Accordingly, when producing a virtual or real volume in a virtualization environment, there is a need of a function to check by which physical resource the volume is to be provided.

Therefore, the following modification (hereinafter, "modification 2") shows a volume allocating function to be provided by the SAN manager, on the SAN having a switch-and-virtualization device. Specifically, described is an art that, when the SAN administrator produces a virtual volume by use of the SAN manager, the SAN manager provides a related piece of virtual-volume mapping information or real-volume mapping information thereby assisting the SAN administrator in producing a virtual volume. In this modification, the management computer checks the SAN administrator's virtual-volume producing request, on the basis of the virtual-volume or real-volume mapping information. The management computer is configured such that, when the volume, being requested to produce, shares resource with the volume already allocated, the fact is outputted and notified to the SAN administrator.

SAN Configuration

The SAN and the devices on the SAN, in this modification 1, may be configured similarly to the embodiment or the modification, and hence explanation is omitted.

Volume Allocation Process

Figure 25:
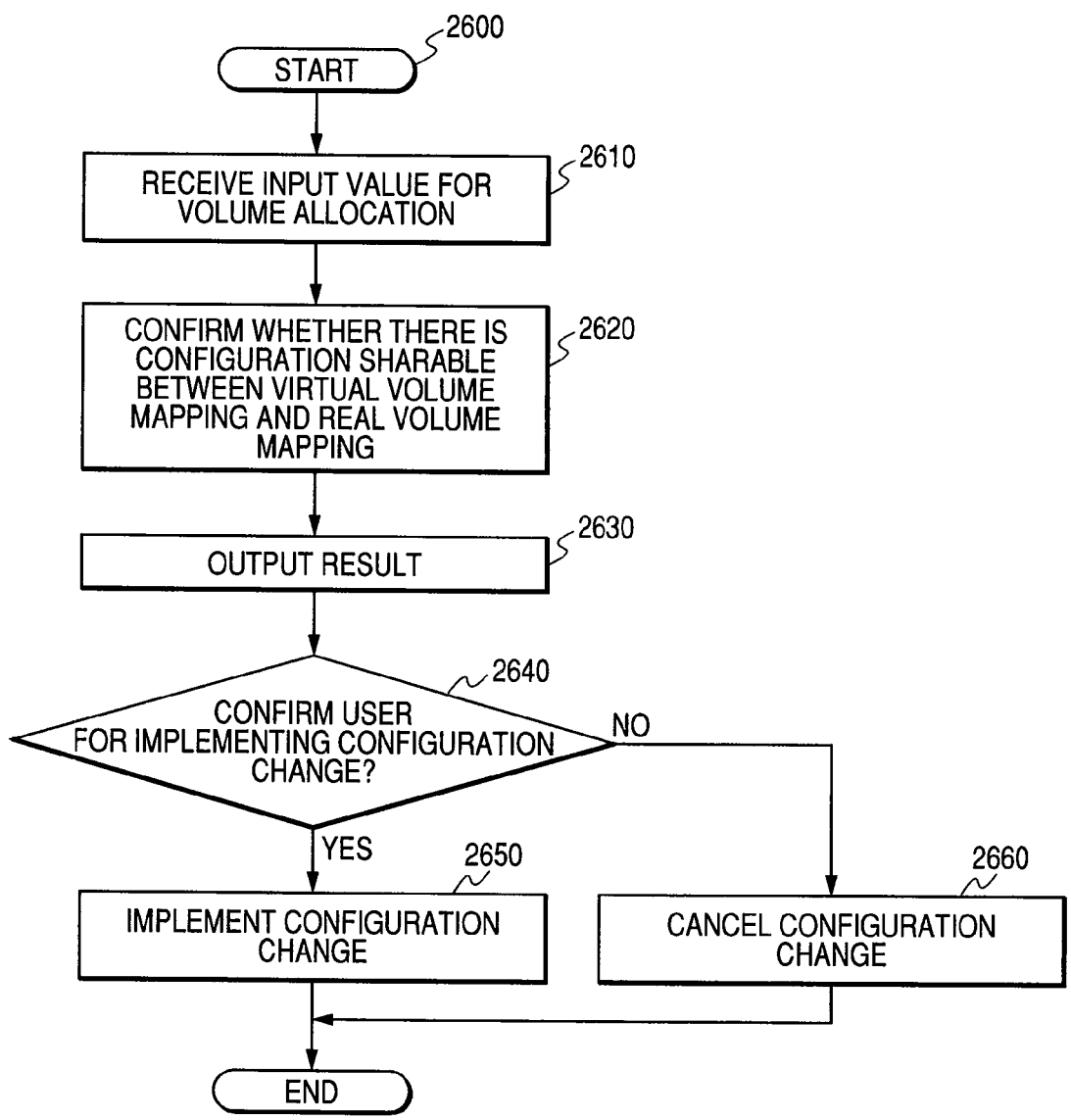
FIG. 25 is a flowchart showing an example of a volume-configuration-change checking process to be executed by the management computer.

FIG. 25 shows a volume allocation processing flowchart 2600 to be executed by the SAN manager 13100 on the management computer 10000. The steps in the below are assumed to be executed by the SAN manager 13100 unless otherwise described. The SAN manager 13100 accepts an input value for volume allocation from the SAN administrator (step 2610). Here, the input value means virtual-volume attributes (host computer destined for allocation, capacitance, required performance, etc.) which the SUN manager intends to produce. Meanwhile, although the virtual-volume management table 14130 copied in the real-topology repository 13400 is already recognized with a virtualization switch 30000, it also registered with the information of a real volume not yet used as a virtual volume (hereinafter, unused real volume). Accordingly, it can be considered to input one or more unused volumes for producing a virtual volume and directly designate the unused volume instead of inputting a capacity or performance by the SAN administrator.

Using the provided input value as a key, the SAN manager 13100 retrieves the real-volume mapping management table 13200 and virtual-volume mapping management table 13300 (step 2620). Specifically, the SAN manager 13100 retrieves the real-volume mapping management table and virtual-volume mapping management table by use, as a key, of the host computer destined for allocation accepted from the san administrator, and extracts the information of a virtual volume already allocated to the allocated host computer and of a real volume corresponding to the virtual volume. Meanwhile, in the case not designated with an unused volume constituting the virtual volume as an input value, the SAN manager extracts the information of one or more unused volumes matched to the condition represented by the input value such as a capacity by retrieving the virtual-volume management table 33500.

Based on a retrieval result, the SAN manager outputs a list of unused volumes constituting a virtual volume to be allocated and the information of the virtual volume already allocated to the host computer destined for allocation and of the real volume corresponding to the virtual volume (step 2630).

On this occasion, in the case resource is shared between the unused volume to be allocated to the host computer and the virtual volume already allocated to the relevant host computer and the real volume corresponding to the virtual volume (e.g. there is a real volume held by the same storage device), the fact thereof is outputted. This allows the SAN administrator to allocate the virtual volume to the host computer such that resource is not shared between the normal and standby systems (e.g. not to use the storage domain of the same storage device). Namely, in the case outputted is a massage that resource is shared by the unused volume to be allocated to the host computer and the volume allocated to the relevant host computer, it is satisfactory to input the fact, not to implement a configuration change, to the management computer.

Then, the SAN manager accepts a result of a SAN administrator's decision of whether to implement a configuration change according to the output information (step 2640). In case the change is allowed, the change is implemented (step 2650). If not so, the change is canceled (step 2660). Following the above, the flowchart 2600 is ended. Incidentally, in the case resource is shared between the unused volume to be allocated to the host computer and the volume already allocated to the relevant host computer, the SAN management computer may take a control not to implement a configuration change.

By the volume allocation process shown in this modification, the SAN administrator is allowed to easily produce a virtual volume consciously of a real volume even in an operation status of the virtual-volume management function.

The embodiment, the modification thereof and the modification 1 were assumed based on the configuration with a virtualization switch. In another modification (hereinafter, "modification 2"), the storage device is assumed based on a virtualization storage device having a volume virtualization program, in which configuration the configuration management function, failure management function and volume allocation function can be also realized as is shown.

SAN Configuration

Description is made on the SAN configuration in modification 2. This embodiment has a configuration nearly similar to the foregoing modification but different in that a switch SW2 is a switch not having a volume-virtualization function and in that a storage device S3 is a virtualization storage device having a volume virtualization function. Hence, different points only are shown in FIGS. 27 to 31, to omit the other explanations.

Figure 27:
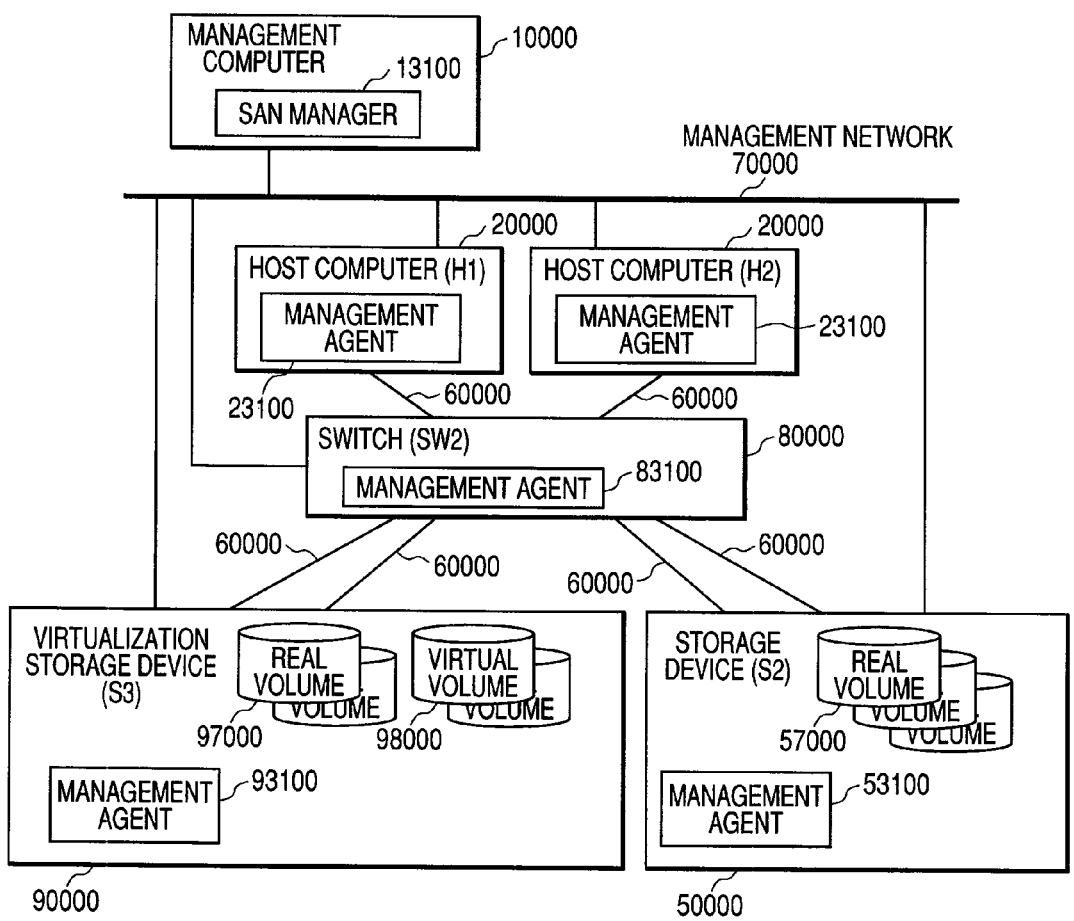
FIG. 27 is a diagram showing a configuration example of a storage network system having a virtualization storage device.
Figure 28:
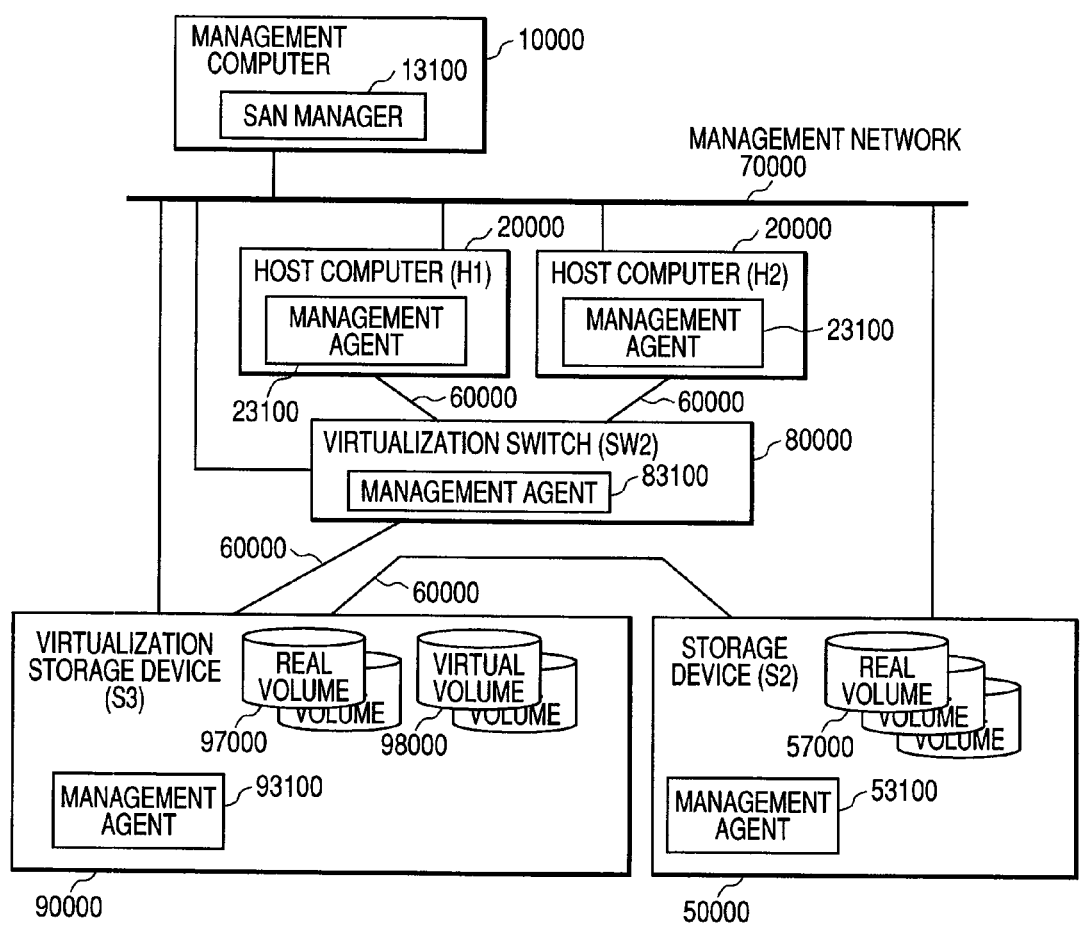
FIG. 28 is a diagram showing a configuration example of a storage network system having a virtualization storage device.
Figure 29:
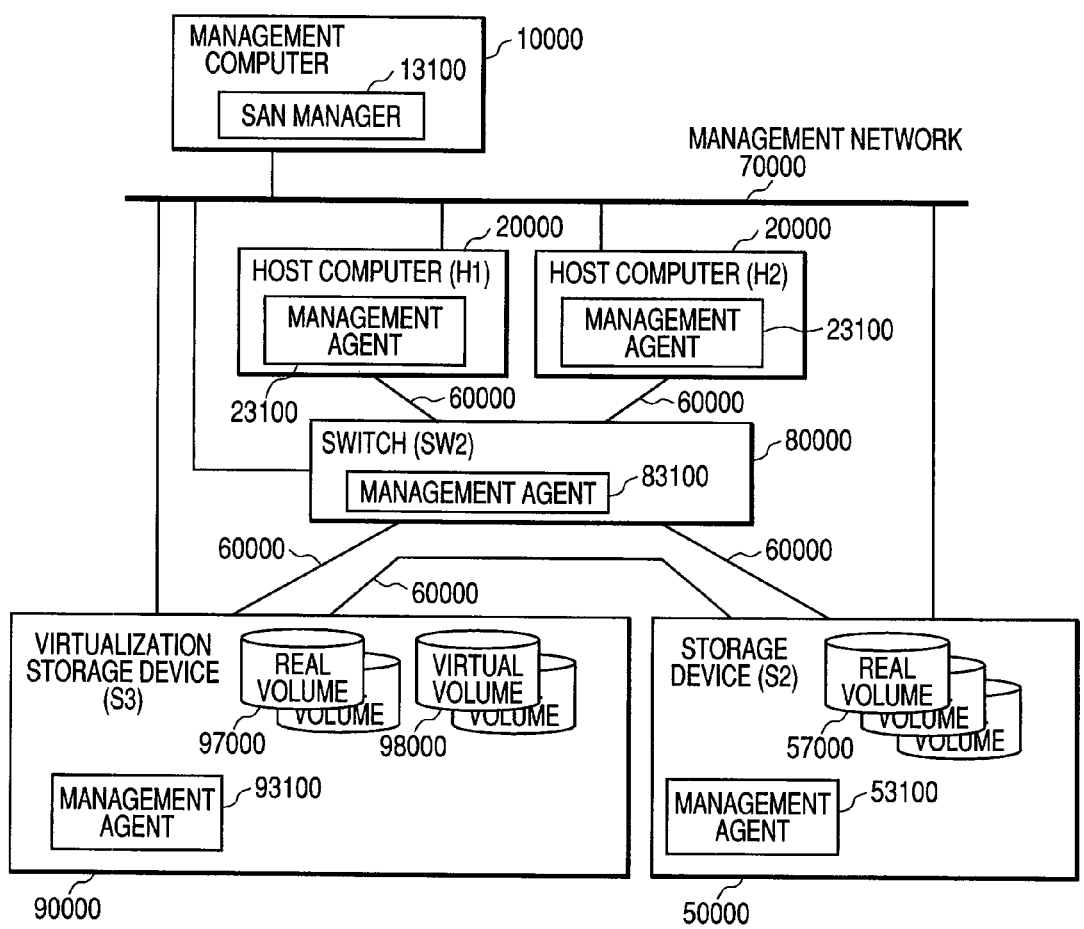
FIG. 29 is a diagram showing a configuration example of a storage network system having a virtualization storage device.

FIG. 27 shows a SAN configuration example in the present modification. On the SAN in this embodiment, mutual connection is assumed to be provided between two host computers (H1, H2) 20000, one switch (SW2) 80000, one virtualization storage device (S3) 90000 and one storage device (S2) 50000, through a fiber channel 60000. In this connection form, the virtualization storage device S3 90000 is to recognize a real volume 57000 of the storage device S2 50000 through the switch 30000. By applying a volume virtualization function, it is provided as a virtualization volume by the virtualization storage device S3 9000 to the host. Incidentally, as for the connection form between the virtualization storage device S3 90000 and the storage device S2 50000, the virtualization storage device S3 90000 and the storage device S2 50000 may be directly connected by a fiber channel 60000, as in the configuration shown in FIG. 28 for example. Besides, direct connection and via-switch connection may be both used as in the configuration example shown in FIG. 29.

The management computer 10000, the host computer 20000 and the storage device S2 50000 are similar in configuration to those of embodiment 2, and hence omitted to explain.

Figure 30:
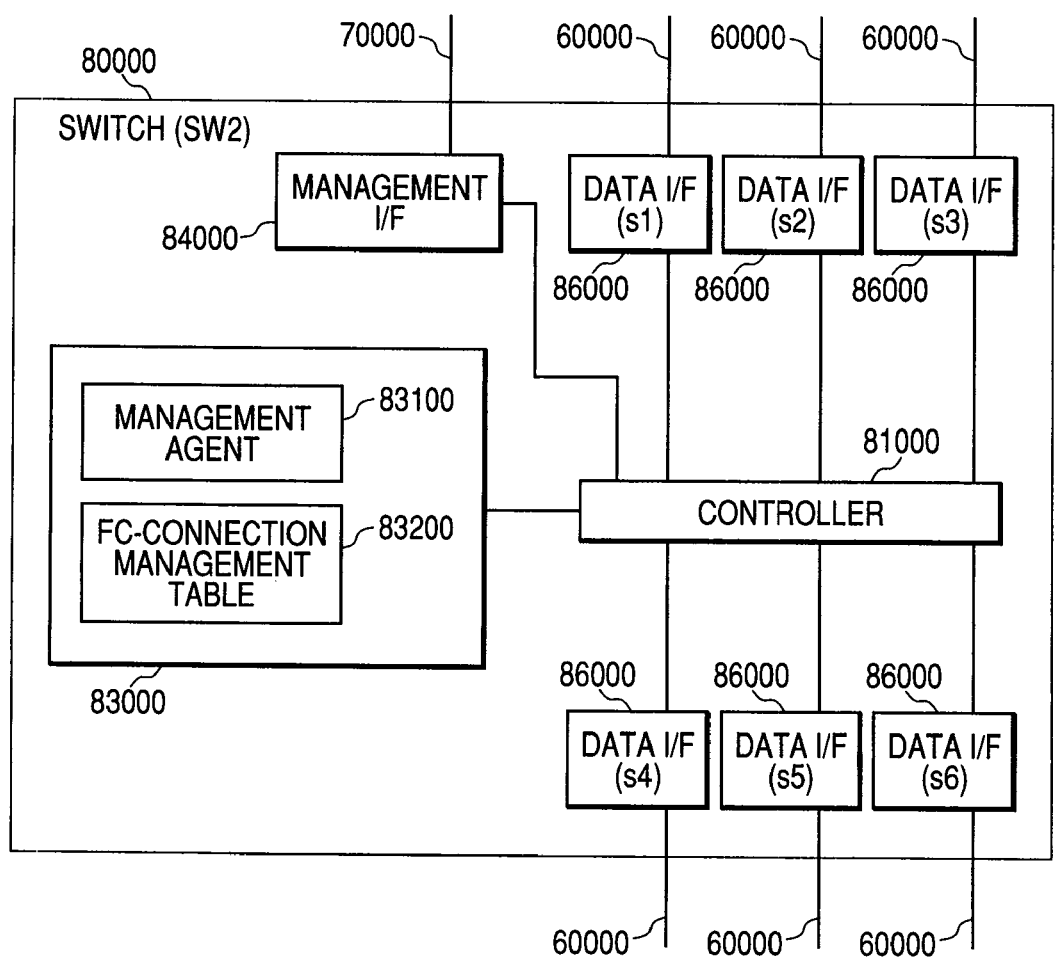
FIG. 30 is a diagram showing a configuration example of a switch.

FIG. 30 shows a configuration example of the switch 80000 in this modification. The difference between the switch 80000 and the virtualization-and-switch 30000 in embodiment 2 lies in that there are stored, on a nonvolatile storage domain 83000 such as a hard disk, only a management agent 83100 as a program to communicate with the SAN manager 13100 and exchange the management information about the switch SW2 therewith, and an FC-connection management table 83200 as information representative of a connection relationship between the switch and the servers and storage devices through the fiber channel 60000. In other words, there are not stored a volume virtualization program 33200 and a virtual-volume management table 33500.

Figure 31:
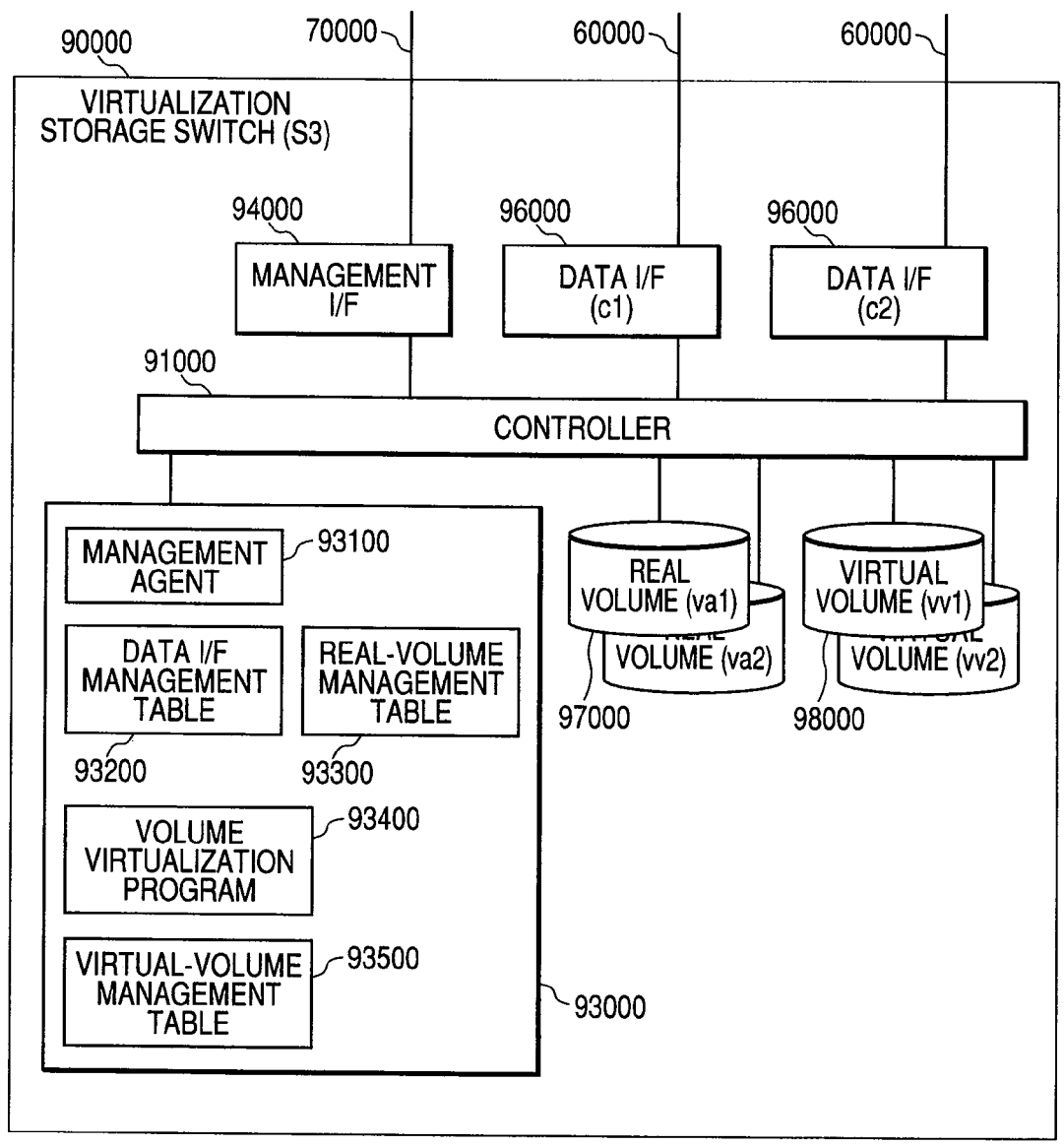
FIG. 31 is a diagram showing a configuration example of a virtualization storage device.

FIG. 31 shows a detailed configuration example of the virtualization storage device S3 as a virtualization-and-storage device in this modification. The difference of the virtualization storage device S3 90000 from the storage device S1 40000 in the modification lies in that having one or more virtual volumes 88000 as a storage domain for providing a real volume held by another storage device to the server through virtualization by means of a virtual volume function and in that storing, in the non-volatile storage domain 83000 such as a hard disk, a volume virtualization program 83400 for realizing the volume virtualization function and a virtual-volume management table 83500 holding virtual-volume management information to be provided to the servers by the relevant storage device. Incidentally, although in this modification the virtualization storage device S3 has two data I/Fs, two real volumes and two virtual volumes, the data I/F, real volume and virtual volume may be any in the number. The data I/F, the real volume and the virtual volume each have an identifier unique within the device (data I/F ID, real volume ID, virtual volume ID). In this embodiment, the data I/F ID is assumed a value c1, c2, the volume ID is assumed a value va1, va2 and the virtual volume ID is assumed a value vv1, vv2.

Now description is made on the management information provided in the device in this modification, only on the points different from the foregoing modification.

FIG. 34 shows an example of a device detecting list 13500 held by the management computer 10000. The device detecting list 13500 is not different in table structure from FIG. 8. The difference in the modification lies in that the switch SW2 does not have a virtualization function and the virtualization storage device S3 has a virtualization function.

Figure 35A:
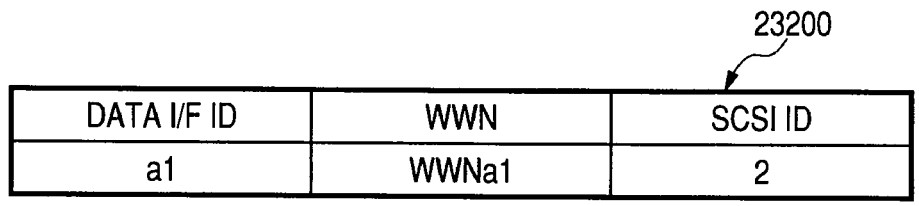
FIGS. 35A and 35B are figures showing an example of a data I/F management table held by the host computer.
Figure 35B:
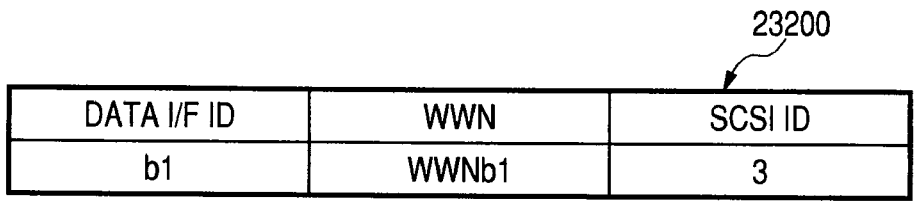

FIGS. 35A and 35B show an example of a data I/F management table held by each of the host computers 20000. This is not different in table structure and content from FIG. 9.

Figure 36:
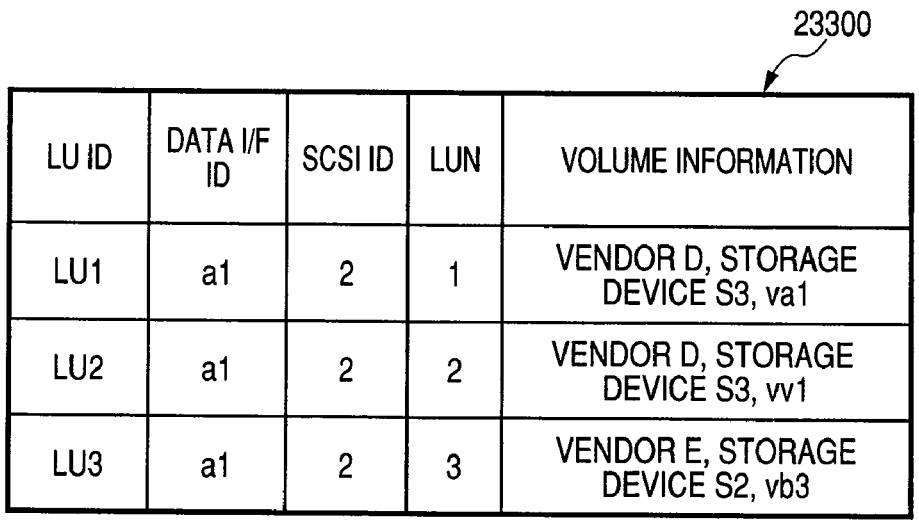
FIG. 36 is a figure showing an example of a volume management table held by the host computer.

FIG. 36 shows an example of a volume management table held by each of the host computer. The volume management table is not different in table structure from FIG. 10. The difference in this embodiment lies in that the host computer H1 is provided with three volumes while the host computer H2 is not provided with a volume at all.

FIG. 37 shows an example of an FC-connection management table 83300 held by the switch. The FC-connection management table is also not different in table structure and content from FIG. 11.

FIG. 38A shows an example of a data I/F management table 93200 held by the virtualization storage device S3 while FIG. 38B shows an example of a data I/F management table 53200 held by the storage device S2. The data I/F management table is also not different in table structure and content from FIG. 14.

Figure 39A:
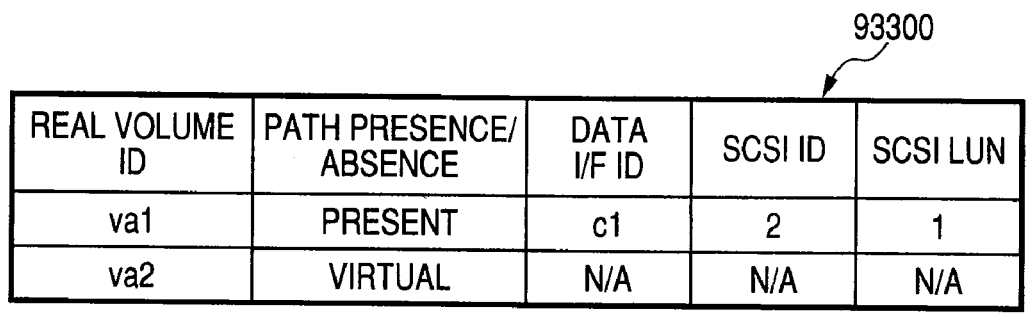
FIGS. 39A and 39B are figures showing an example of a real-volume management table held by the storage device.
Figure 39B:
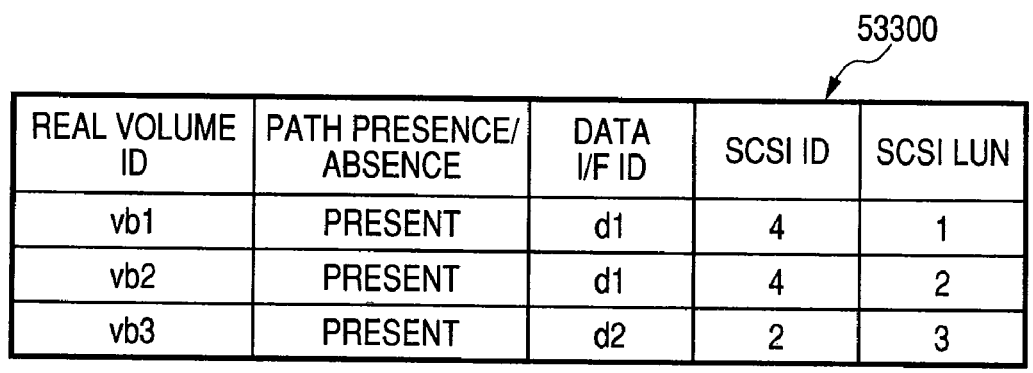

FIG. 39A shows an example of a real-volume management table 93300 held by the virtualization storage device S3 while FIG. 38B shows an example of a real-volume management table 53300 held by the storage device S2. The real-volume management table is not different in table structure from FIG. 15. The difference in content lies in that the volumes possessed by the virtualization storage device S3 and storage device S2 are different and in that the volume va2 possessed by the virtualization storage device S3 has a value "virtual" stored in the path presence/absence column in order to show that it is to be provided as a virtual volume by the volume virtualization function. When the value "virtual" is stored in the path presence/absence column, "N/A (Not Applicable)" representative of a value absence is stored in the columns of data I/F ID, SCSI ID and SCSI LUN.

Figure 40:
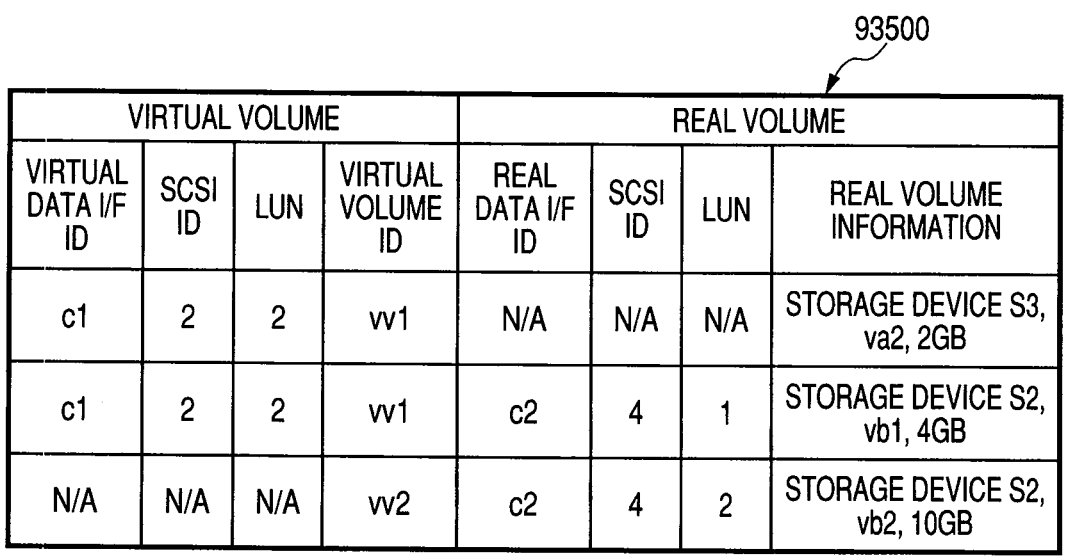
FIG. 40 is a figure showing an example of a virtual-volume management table held by the virtualization device.

FIG. 40 shows an example of a virtual-volume management table 93500 held by the virtualization storage device S3. The virtual-volume management table is not different in table structure from FIG. 13. The difference in content lies in a difference in the virtual volume provided by the virtualization storage device S3. Incidentally, in this modification, the virtual volume vv1 is constituted by two real volumes va2 and vb1. Meanwhile, the virtual volume vv2 is constituted by one real volume vb2, whose volume is not yet allocated to the host. Hence, "N/A (Not Applicable)" representative of a value absence is stored in the columns of data I/F ID, SCSI ID and SCSI LUN.

Configuration Management Function

Description is now made on the real-and-virtual volume configuration management process to be executed by the SAN manager 13100 on the management computer 10000 in this modification 2.

In the real-and-virtual topology display process flowchart 1700 described in the embodiment, there are no steps to be undergone by the existence of the volume virtualization function in the storage device. Accordingly, the real-and-virtual topology display process flowchart 1700 in this modification is the same as the above embodiment. Explanation is omitted.

In the detailed process flow of the virtual topology mapping management table producing step 1730 described in the embodiment, there are steps to be undergone by the existence of the volume virtualization function in the storage device, as described later. Accordingly, description is made on the detailed process flow 1730 of the virtual topology mapping table producing step 1730 in this modification, as to the difference from the embodiment.

Figure 41A:
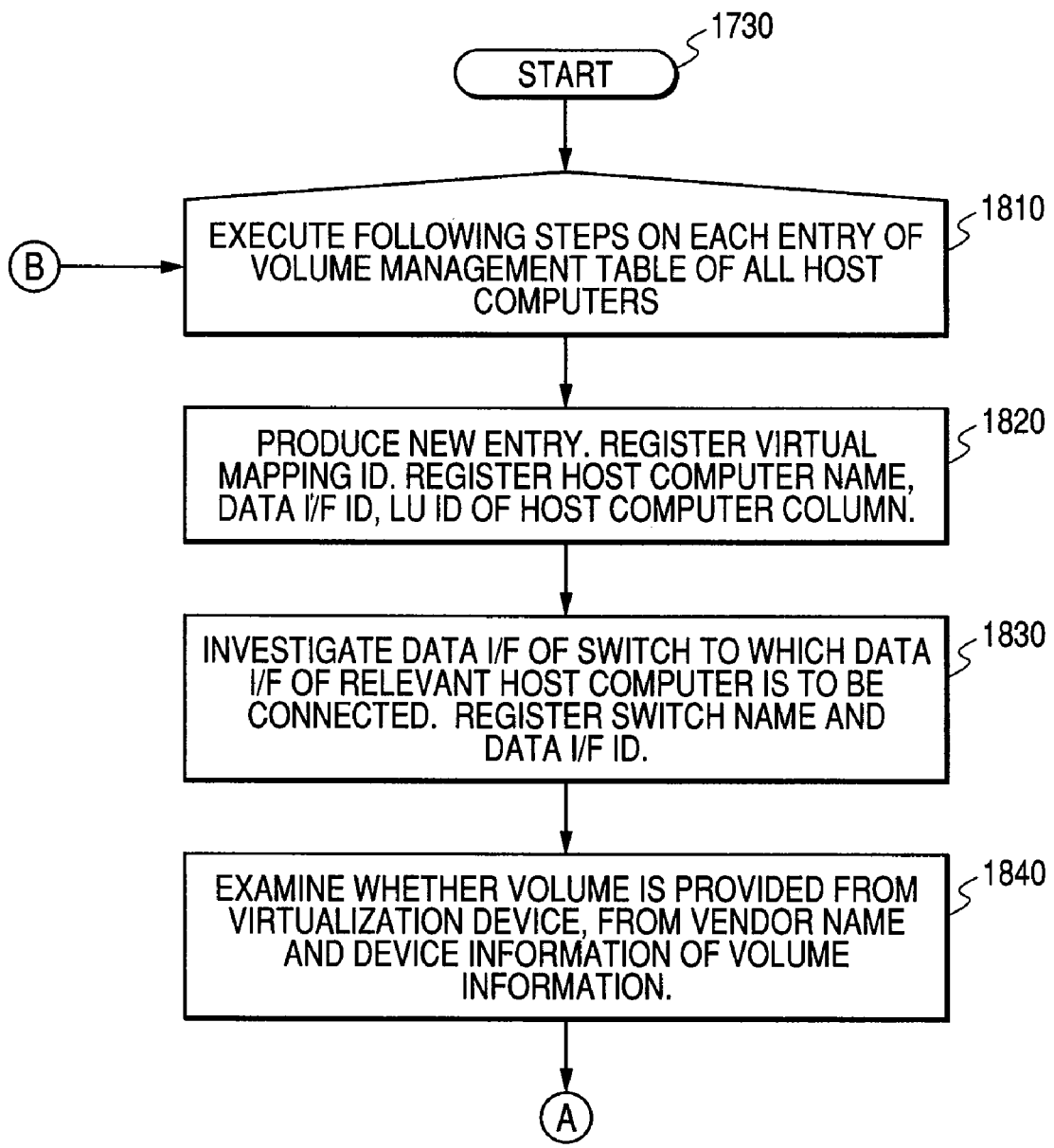
FIGS. 41A and 41B are flowcharts showing a detailed process content example of a virtual-volume mapping management table producing step to be executed by the management computer.
Figure 41B:
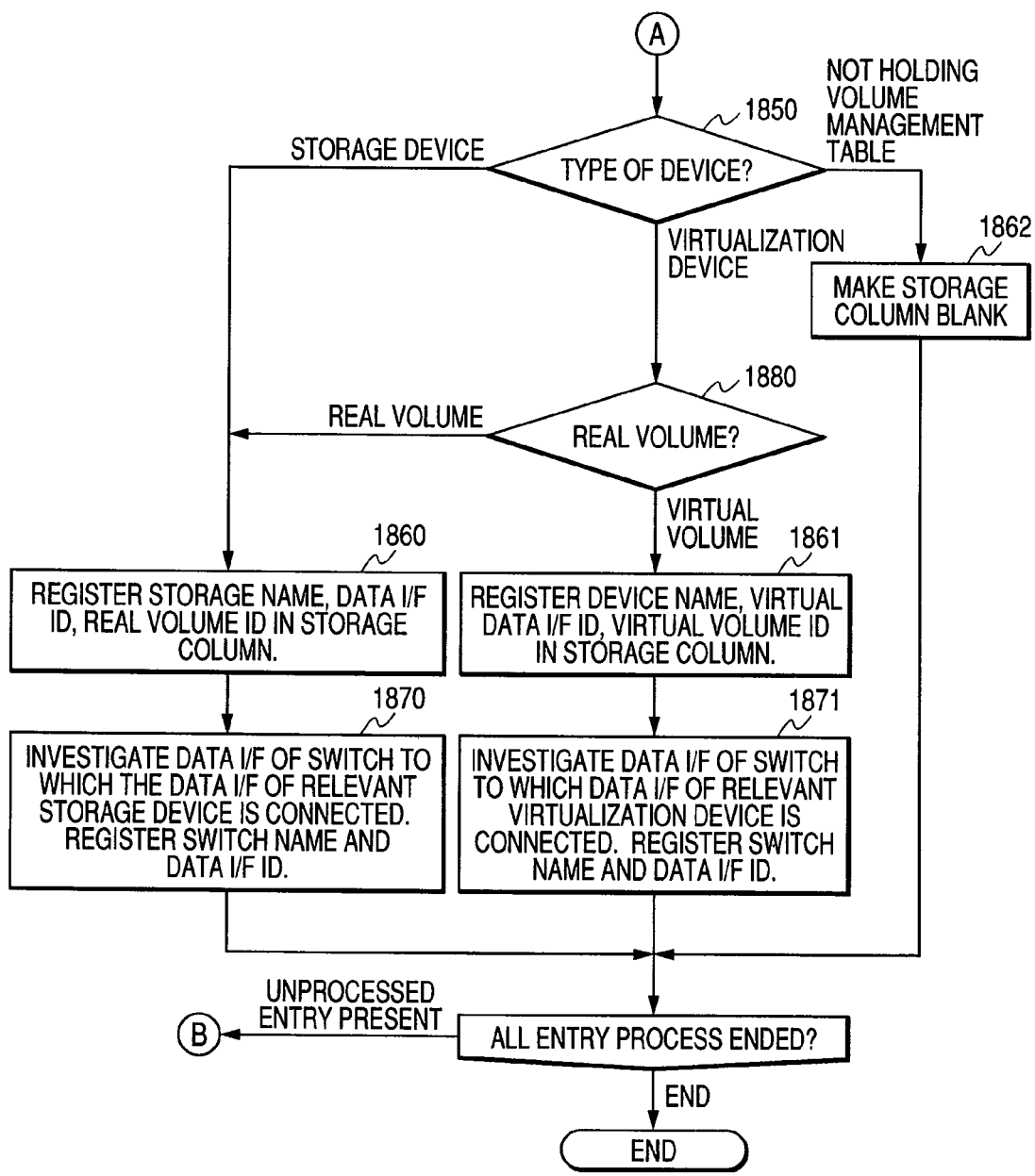

FIG. 41 shows a flowchart representing a detailed process of the virtual-volume mapping management table producing step 1730 to be executed by the SAN manager 13100.

The steps 1810 to 1850 are similar to those in the FIG. 17 flowchart, and hence omitted to explain.

At step 1850, the flow, in the case decided that the volume is provided from the other storage device than the virtualization device, is similar to that in FIG. 17 flowchart, and hence omitted to explain.

Meanwhile, explanation is omitted for the flows for the case the volume management table 23300 is not stored in the real topology repository 13400 because the device is unregistered in the device detecting list 13500, and for the case the device does not have a management I/F, because they are similar to those in FIG. 17 flowchart.

At step 1850, in the case decided the volume is provided from the virtualization device, the SAN manager executes the following process. First, the SAN manager decides whether the relevant volume is a real volume of a virtualization device or a virtual volume (step 1880). Specifically, it is satisfactory to examine whether the volume ID of the relevant volume exists in a real volume management table of a virtualization storage device or in a virtual volume management table.

At step 1880, when the relevant volume is decided as a real volume, the process jumps over to step 1860 in order to handle the relevant volume as a real volume in the subsequent process.

At step 1880, when the relevant volume is decided as a virtual volume, the process jumps over to step 1861 in order to handle the relevant volume as a virtual volume in the subsequent process.

The flow of the step 1861 and subsequent is similar to that of the FIG. 17 flowchart, and hence omitted to explain.

The virtual-volume mapping management table producing step 1730, to be executed by the SAN manager 13100, is as per the above. Incidentally, the present flow may be operated as a virtual-volume mapping management table producing step 1730 in embodiment 1.

In the detailed process flow 1740 of the real-volume mapping management table producing step 1740 described in the embodiment, there are no steps to be undergone by the existence of the volume virtualization function in the storage device. Accordingly, the detailed process flow 1740 of the real-volume mapping management table producing step 1740 described in the embodiment is similar to that of the flowchart 1740 shown in FIG. 18, and hence omitted to explain.

FIG. 32 shows a real-volume mapping management table while FIG. 33 shows a virtual-volume mapping management table, those of which are to be produced as a result of a virtual-volume and real-volume configuration management process executed by the SAN manager in this modification. Here, the entry, whose virtual mapping ID is vm1 in the virtual-volume mapping management table, has been decided and produced as a real volume due to the addition of the virtual-volume mapping management table producing step 1880 shown in FIGS. 41A and 41B described in the present embodiment. Meanwhile, the entry, whose virtual mapping ID is vm2 in the virtual-volume mapping management table, has been decided and produced as a virtual volume due to the addition of the foregoing step 1880. In this manner, by the addition of the step 1880, the SAN manager is allowed to produce a virtual-volume mapping management table even where the virtualization device is in a configuration having a real volume.

Figure 42:
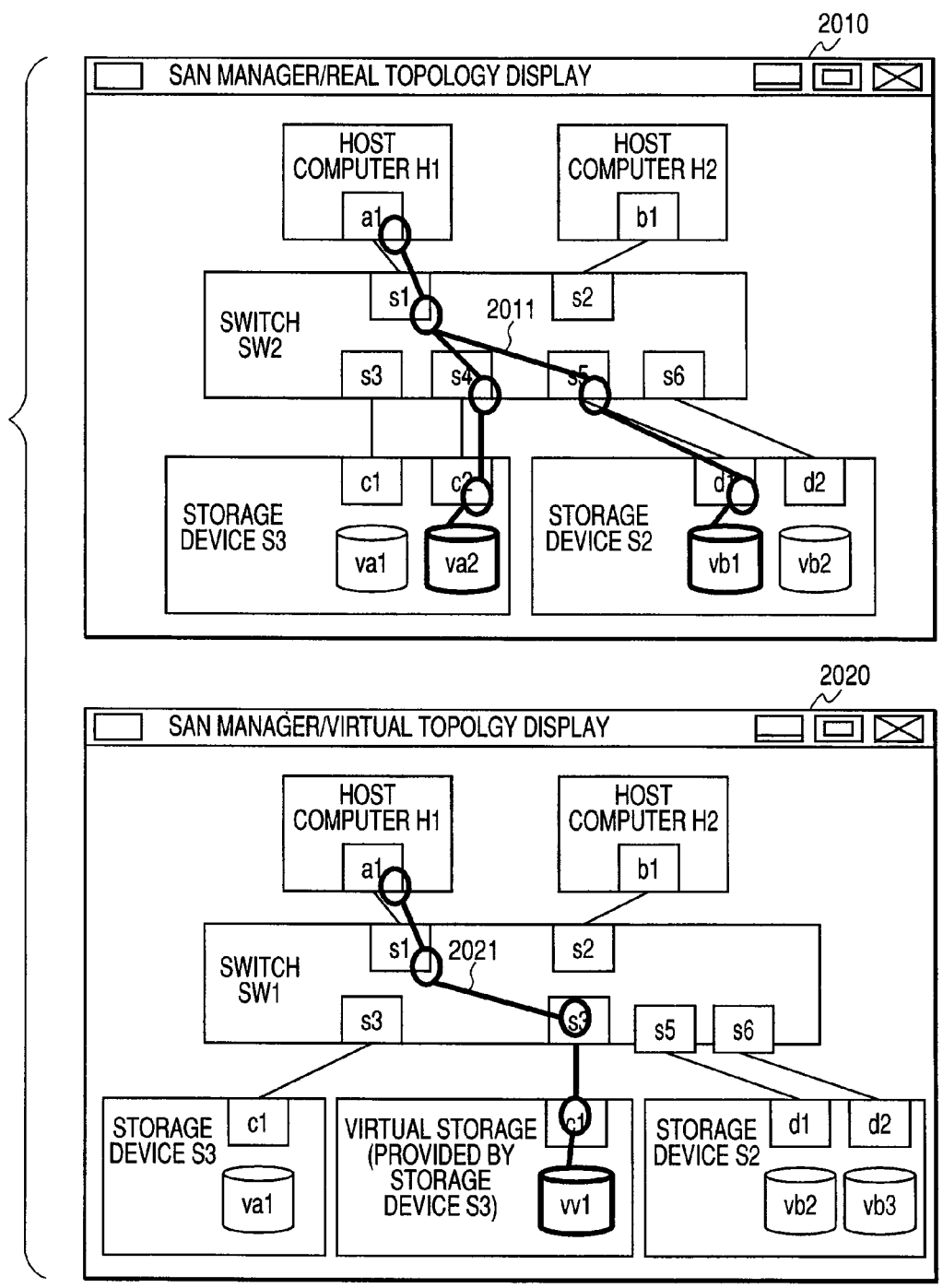
FIG. 42 is a figure showing an example of real topology display and virtual topology display outputted by the management computer.

FIG. 42 shows an example of a real topology display and virtual topology display which the SAN manager 13100 has outputted onto the output section 15000 depending upon the mapping table shown in FIGS. 32 and 33. As for virtual topology display 2020, virtual mapping 2021, real topology display 2010 and real mapping 2011, display is possible by using the method described in the embodiment. Thus, explanation is omitted.

Incidentally, other three methods of outputting a result described in the embodiment are also applicable to this modification though the detail thereof is not shown.

Failure Influential Range Detecting Function

In the failure influential range detecting process flowchart 2400 shown in the modification, there are no steps to be undergone by the existence of the volume virtualization function in the storage device. Accordingly, the failure influential range detecting process flowchart, to be executed by the SAN manager 13100 on the management computer 10000 in this modification, is similar to the flowchart 2400 in the embodiment. Explanation is omitted.

Figure 43:
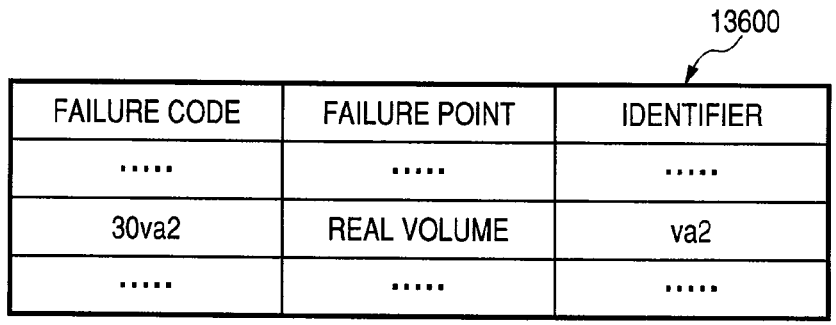
FIG. 43 is a figure showing an example of an event dictionary concerning storage held by the management computer.

For example, consider the case that there is provided an event dictionary related to the virtualization storage device S3 as shown in FIG. 43 while an SNMP Trap message containing a failure code 30va2 representative of a real volume vat failure has been issued from the virtualization storage device S3.

Figure 44:
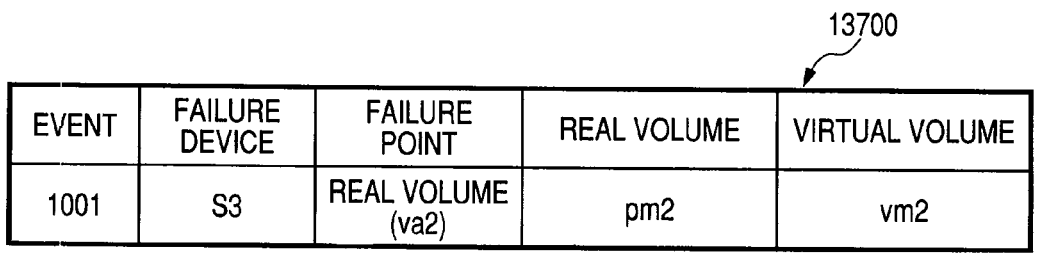
FIG. 44 is a figure showing an example of a failure log held by the management computer.

The SAN manager received the SNMP Trap message is allowed to generate a failure log as shown in the event ID 1001 in FIG. 44 by executing the failure influential range detecting process flowchart 2400.

Figure 45:
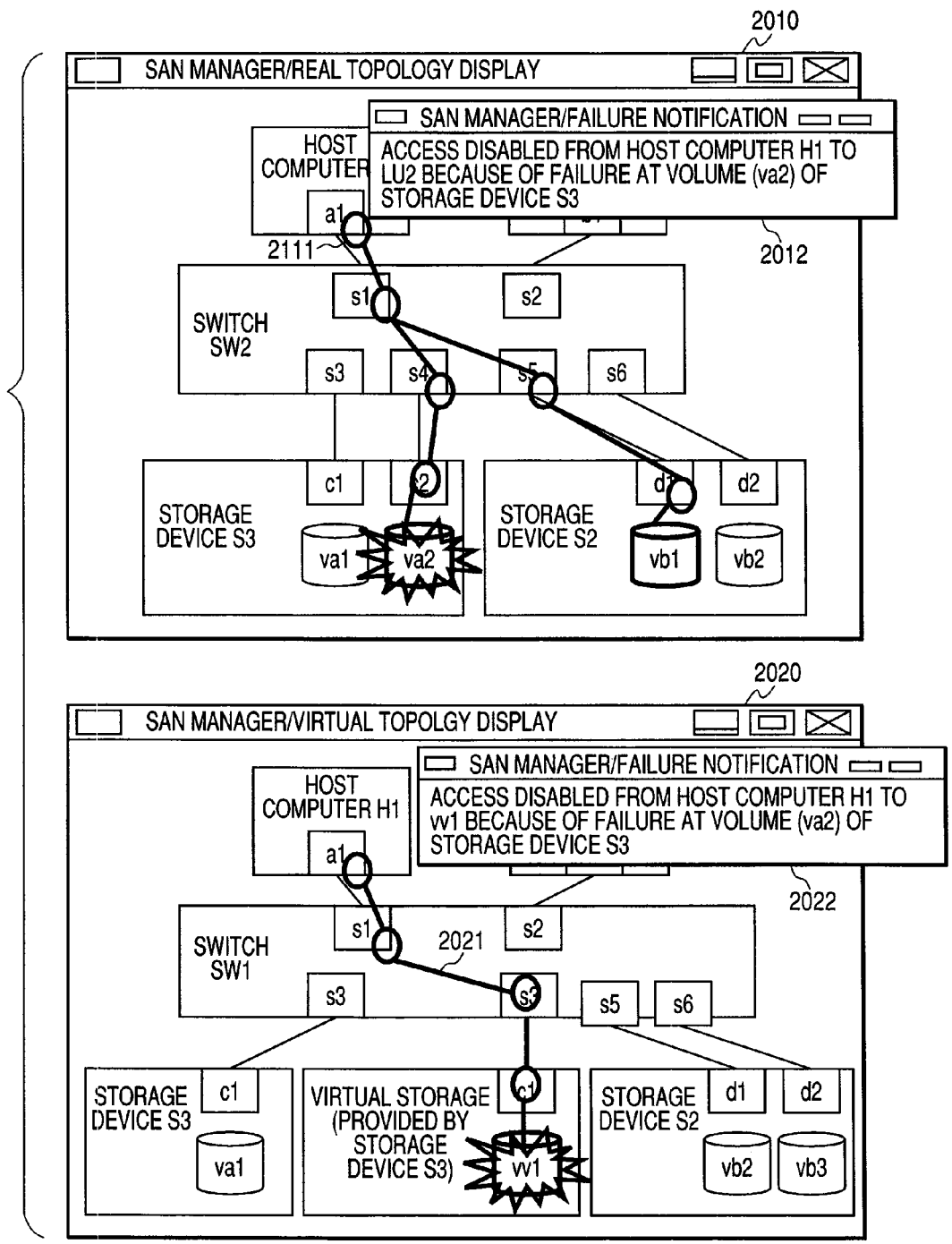
FIG. 45 is a figure showing an example of failure notification display outputted by the management computer.

Meanwhile, in case using the failure log, the SAN manager is allowed to display an in-real-topology-display failure notification message 2012 and in-virtual-topology-display failure notification message 2022 as shown in FIG. 45 by the same method as the method described in the modification.

Incidentally, other six methods of outputting a result described in the embodiment are also applicable to this modification though the detail thereof is not shown.

Volume Allocation Function

In the volume allocation process flowchart 2600 described in modification 2, there are no steps to be undergone by the existence of the volume virtualization function in the storage device. Accordingly, the volume allocation process flowchart 2600 in this modification is the same as that of modification 2.

In also the configuration that the storage device is a virtualization storage device having a volume virtualization program, realized is the configuration management function, failure management function and volume allocation function.

In the following modification 3, description is made on a failure associating function and failure-significance-degree changing function for relieving the SAN administrator of a management burden on the SAN having a storage-and-virtualization device.

The failure associating function is concretely a function that the SAN manager, received a failure notification issued by a plurality of devices, analyzes whether it is a failure message related to the relevant failure message among the failure messages received in a constant period before receiving the failure message, on the basis of the SAN configuration information acquired from the event dictionary or the management agents and stored in the real topology repository and examine the relationship among the failure messages.

Meanwhile, the failure-significance-degree changing function is concretely a function that consistent severity is defined for the failure messages on a plurality of devices to be received by the SAN manager thus allowing the SAN manager to inform a failure by a method according to the definition.

SAN Configuration

The SAN configuration in this modification is similar to the SAN configuration shown in FIG. 27. However, because the table held by the management computer 10000 is partly different, description is made only on the different points.

Figure 46:
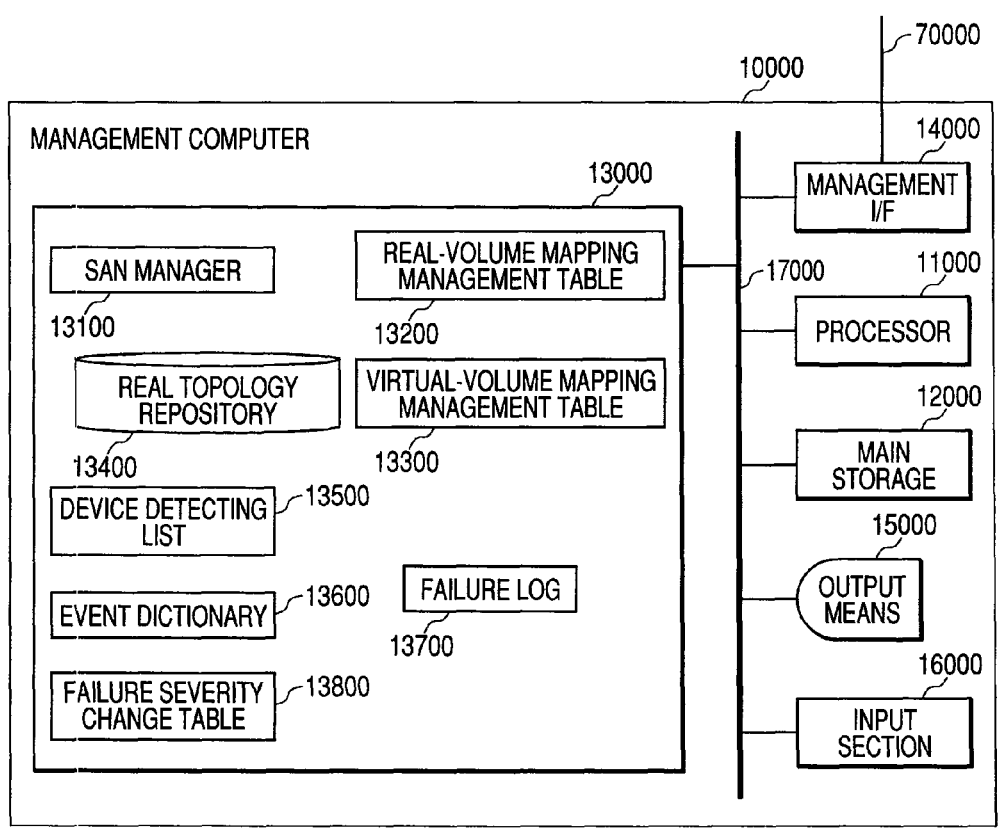
FIG. 46 is a diagram showing a configuration example of the management computer.

FIG. 46 shows a detailed configuration of a management computer 10000 in this modification. The difference from the modification 2 management computer 10000 lies in that the event dictionary 13600 is different in table structure, in that the failure log 13700 is different in table structure and in that a failure severity-change table 13800 is provided. The others than that are similar to the detailed configuration of the modification 2 management computer 10000, and hence omitted to explain.

FIGS. 47A to 47D show an example of the event dictionary 13600 possessed by the SAN management server 10000. FIG. 47A shows an event dictionary on the virtualization storage device S3, FIG. 47B an event dictionary on the storage device S2, FIG. 47C an event dictionary on the host computer H1 and FIG. 47D an event dictionary on the switch SW2. Those dictionaries are for use in analyzing the SNMP Trap message issued from the device during a failure occurrence, which are detailed later. The failure code column is registered with a failure code in the Variable Bindings field of the SNMP message, the failure point column is with a failure occurrence point corresponding to the failure code, the identifier column is with an identifier for specifying a failure occurrence point, the cause column is with a cause of message issuance, the severity column is with a Trap severity in the Specific Trap Type field of a SNMP message.

FIG. 48 shows a failure log 13700 possessed by the SAN management server 10000. The failure log is registered with an event ID allocated when the SAN manager receives a failure notification message, a time of failure occurrence, a source device name of a failure notification message, a failure code in a failure notification message, an ID of a real mapping including the relevant point, an ID of a virtual mapping including the relevant point, and a relation with another failure event.

Figure 49:
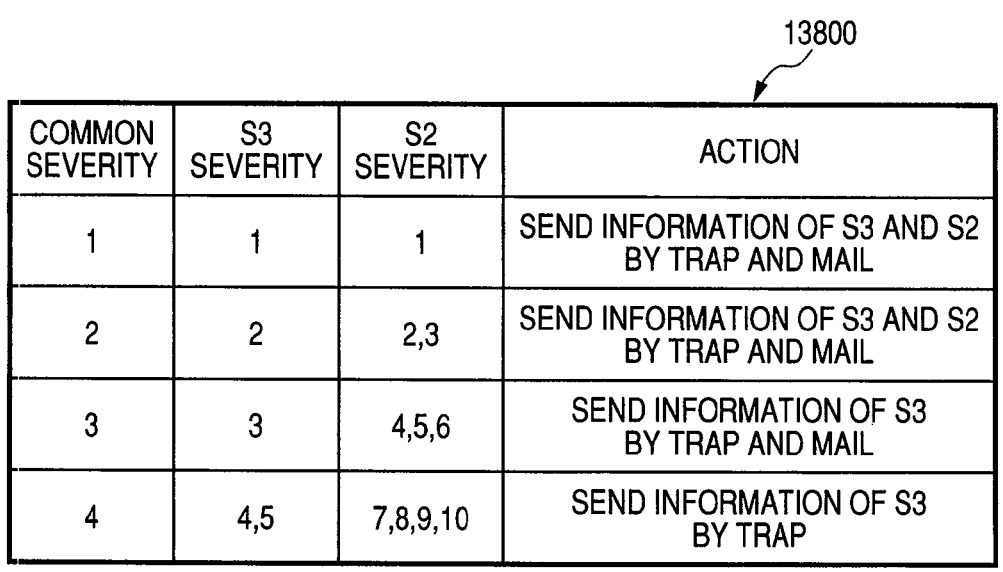
FIG. 49 is a figure showing a failure severity change table held by the management computer.

FIG. 49 shows an example of a failure severity-change table possessed by the SAN management server 10000. This conversion table defines a common severity with respect to the failure messages on a plurality of devices to be received by the SAN manager and an operation the SAN manager is to perform in accordance with the common severity, in a failure notification process including a severity-change function for the SAN manager, referred later. This table is assumed to be defined by the SAN administrator during architecting a SAN environment.

The failure severity-change table is registered with a common severity with respect to failure messages on a plurality of devices, severities of the respective devices corresponding to the common severity, and an operation the SAN manager is to carry out in accordance with the common Severity.

In the FIG. 49 case for example, when the virtualization storage device S3 has a severity "3" and when the storage device S2 has a severity "4", "5" or "6", the common severity is regarded as "3" on the SAN environment. As a result, the SAN manager sends only the failure message information about the virtualization storage device S3 as a SNMP Tap, and sends it by mail to the SAN administrator.

Incidentally, the severity-change table is defined based on the configuration information about the SAN. In the severity-change table shown in FIG. 49, the severity 3 on the virtualization storage device S3 and the severity 4-5 on the storage device S2 are associated as a common severity 3. As for a failure notification message on the common severity 3, definition is made to send only the failure information about the virtualization storage device S3 as a SNMP Trap, and send it by mail to the SAN administrator. This is because the virtualization storage device S3 provides, by virtualization, the real volume held by the storage device S2 to the host computer so that the input/output request exchanged with the storage device S2 can be exchanged with the host computer through the virtualization storage device S3. Accordingly, definition is made such that the severity on the virtualization storage device S3 and the severity on the storage device S2 are associated to output only the failure information about the virtualization storage device S3 for virtualization of the real volume of the virtualization storage device S3 and storage device S2.

Failure Associating Function

Figure 50A:
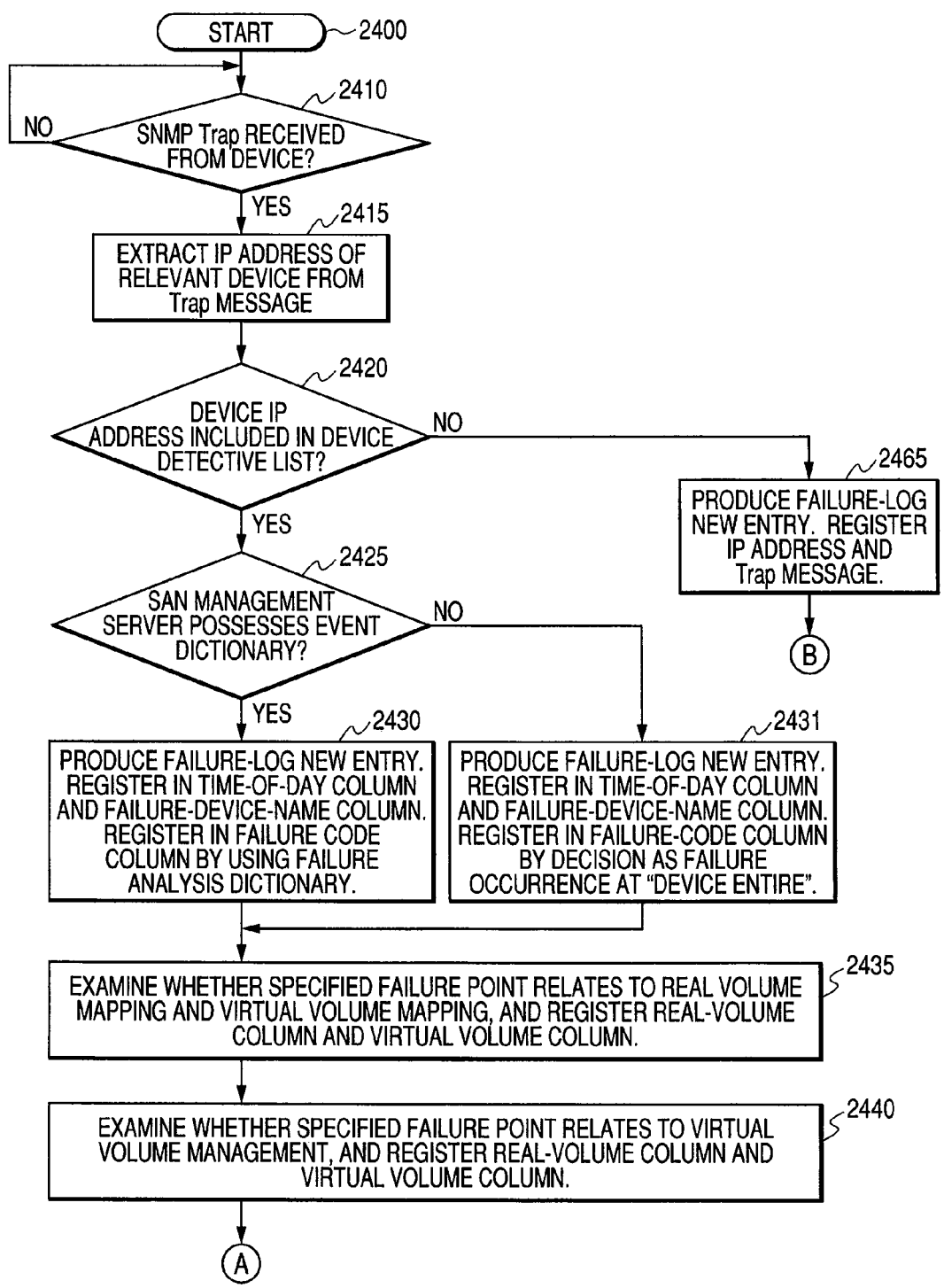
FIGS. 50A to 50B are flowcharts showing an example of a detailed process content of a failure associating process to be executed by the management computer.
Figure 50B:
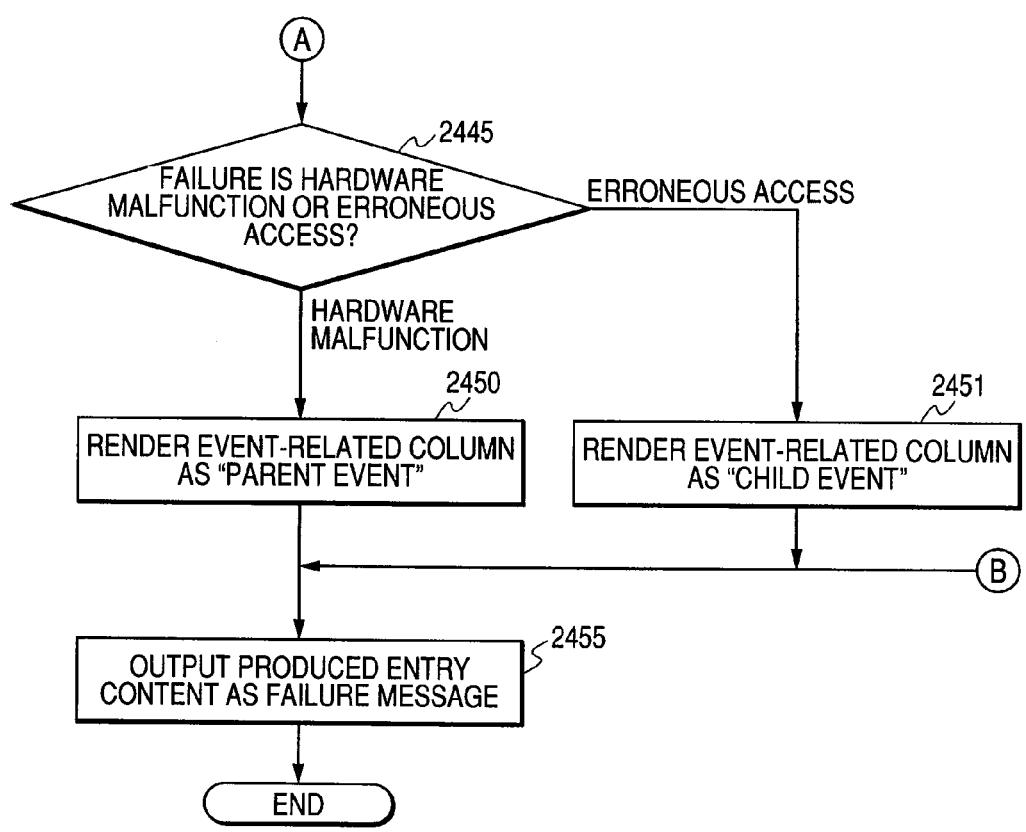

FIGS. 50A and 50B show a flowchart 2400 illustrating an example of a failure associating process to be executed by the SAN manager 13100. The steps in the below are assumed to be executed by the SAN manager 13100 unless otherwise described.

The SAN manager 13100 waits until a SNMP Trap message is received from a certain device (step 2410).

After receiving the message, the SAN manager extracts an IP address of message-issued device out of the Agent Address field of the message (step 2415) and retrieves the device detecting list 13500 stored in the real-topology repository 13400 by use of the extracted IP address as a key (step 2420).

In the case there is no IP address in the device detecting list 13500, the SAN manager cannot analyze the content of the Trap message because the Trap message is from a unregistered device. Accordingly, the SAN manager produces a new entry in the failure log 13700 and allocates an event ID thereon, to output an IP address as a failure device and a Trap message itself as a failure point (step 2465). The process jumps to step 2455, referred later.

At step 2420, in the case the extracted IP address exists in the device detecting list 13500 and the device issued the Trap message can be specified, the SAN manager confirms whether there is provided an event dictionary as to the relevant device (step 2425).

In the case there is provided an event dictionary at the step 2425, the SAN manager produces a new entry in the failure log 13700 and allocates an event ID thereon, and extracts a failure occurrence time from the Time stamp field of the message and registers it in the time column, further registering a device name. Furthermore, the event dictionary is retrieved by use, as a key, the Variable Bindings field of the Trap message. In case there is registered a failure code, the relevant failure code is registered in the failure code column (step 2430).

In the case decided that there is not provided an event dictionary at the step 2425, the SAN manager produces a new entry in the failure log 13700 and allocates an event ID thereon, and extracts a failure occurrence time from the Timestamp field of the message and registers it in the time column, further registering the device name. Furthermore, the SAN manager regards the failure point as the device entirety and registers it as "device entirety" in the failure code column, continuing the following steps (step 2431).

After ending the step 2430 or step 2431, the SUN manager examines whether the failure point represented by the registered failure code has a relation to a real-volume mapping or virtual-volume mapping (step 2435). Specifically, a failure point and its identifier is retrieved through the entries of the event dictionary of a registered failure device name by use of the failure code as a key. Then, the real-volume mapping management table 13200 is retrieved whether there is a matching entry by use, as a key, of the failure device name and the failure point or failure point identifier. In case there is a matching entry, the SAN manager extracts a real mapping ID 13201 and virtual mapping ID 13212 from the entry, and registers it in a real-volume column and virtual-volume column of an entry under production of the failure log 13700.

Thereafter, the SAN manager examines whether the specified failure point has a relation to virtual-volume management (step 2440). Specifically, the virtual-volume management table 43500 is retrieved whether there is a matching entry by use, as a key, of the failure device name retrieved at the step 2435 and the failure point or failure point identifier. In case there is a matching entry, the SAN manager extracts a virtual volume ID from the entry. Furthermore, by using the extracted virtual-volume ID as a key, the real-volume mapping management table 13200 is retrieved whether there is a matching entry, to extract a real mapping ID 13201 and virtual mapping ID 13212 into registration in an actual volume column and real volume column of an entry under production of the failure log 13700.

After registering the relationship between a real volume mapping and a virtual volume mapping in the entry under production of the failure log at steps 2435 and 2440, the SAN manager examines a relation of the relevant entry under production with another failure log entry. First, the SAN manager examines whether the entry under production is due to a hardware malfunction or an erroneous access to other point (step 2445). Specifically, the cause is retrieved through the entries of the event dictionary of a registered failure device name by use of the failure code as a key.

In the case the cause examined at the step 2445 is a hardware malfunction, the event under production is decided as a "parent event" possibly to trigger other failures and registered as a "parent event" in the event-related column (step 2450).

In the case the cause investigated at the step 2445 is due to an erroneous access to other point, the event under production is decided as a "child event" possibly occurred by the other cause of other failure event and registered as a "child event" in the event-related column (step 2451).

Finally, the SAN manager outputs the entry content of the produced failure log as a failure message (step 2455). By the above, the flowchart 2400 is ended.

The failure associating process flowchart is as per the above.

Here, description is made on the concrete example of a failure associating process on the SAN manager 10000 illustrated by the flowchart 2400.

Figure 51:
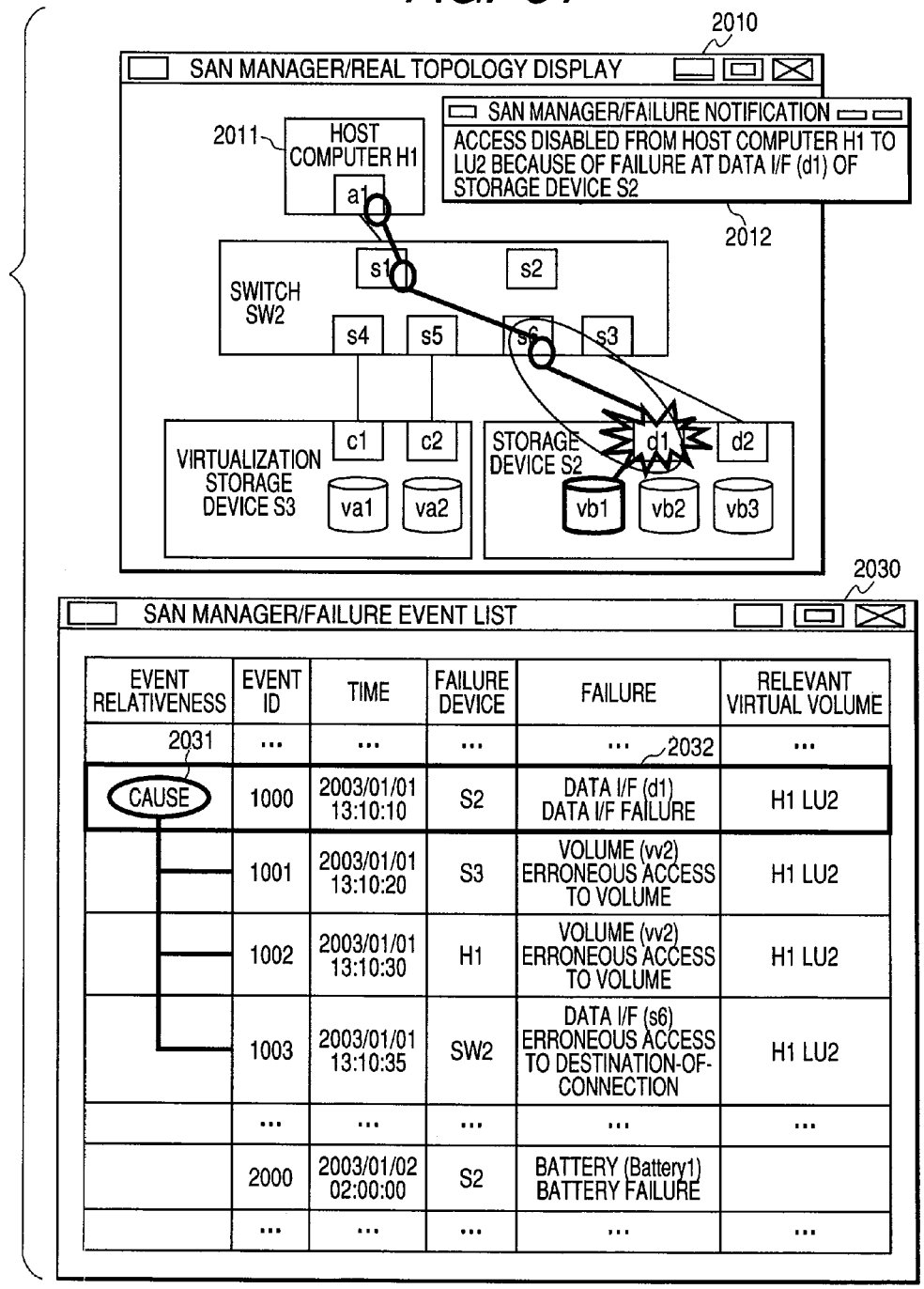
FIG. 51 is a figure showing an example of failure-association result display outputted by the management computer.

FIG. 51 is a figure showing an example as to in what way the failure log entry described in FIG. 48 is outputted by the failure associating process shown by the flowchart 2400. Here, event IDs 1000, 1001, 1002, 1003 are four failure messages occurred by a hardware malfunction at the data I/F ID d1 of the storage device S2. Accordingly, description is made below as to in what way the four failure messages are to be analyzed and associated together.

When receiving a failure message of event ID 1000, the SAN manager at step 2430 analyzes it as a hardware malfunction at the data IF ID d1 of the storage device S2. Furthermore, at step 2435, it can be known related to a real-volume mapping pm2 and virtual-volume mapping vm2. Furthermore, from step 2445, the hardware malfunction is known as a "parent event".

Then, when receiving a failure message of event ID 1001, the SAN manager at step 2430 analyzes that an erroneous access is caused upon expanding the virtual-volume vv1 I/O of the virtualization storage device S3 in a real volume vb1. Furthermore, at step 2435, it can be known related to a real-volume mapping pm2 and virtual-volume mapping vm2. Furthermore, from step 2445, the erroneous access is known as a "child event". Likewise, the failure message of event ID 1002 and the failure message of event ID 1003 are known as "child events".

In outputting a failure message at step 2455, the SAN manager examines the real volume column, virtual volume column and event-related column of the failure messages issued within a constant time, and specify the presence/absence of relation to failure messages and any one of "parent event" and "child event" when related. Here, the "constant time" is a time the SAN administrator previously designated and constituting a unit of failure association. The event IDs 1000, 1001, 1002, 1003, in FIG. 17, are each associated with the real volume mapping pm2 and virtual volume mapping vm2, and wherein the event ID 1000 can be seen as a parent event. Accordingly, in the failure-event list window 2030 in FIG. 23, it is possible to show an association, e.g. a symbol 2031, in the event-related column, for example.

Meanwhile, when the SAN administrator designates a certain particular failure event, e.g. event designation 2032, the SAN manager 10000 may illustrate a real topology mapping corresponding to the designated event, e.g. real topology mapping display 2011, in a real-topology display window 2010. Furthermore, the designated event may be displayed in a manner easy to understand, just like a failure notification window 2012.

Meanwhile, although not shown in detail, the following six methods can be considered as other ways to output a result in the present modification.

The first method is a method to output the failure log, held in the management computer, in a format the SAN manager can read, e.g. in a text form, by giving an instruction at the input section of the management computer by the SAN manager.

The second method is a method to output the failure log as an output result of the input command by giving a command-input at the input section of the management computer by the SAN manager.

The third method is a method that other SAN management software, etc. execute the API to be disclosed in order to output the configuration information by the SAN manager, thereby making an output as an API return value.

The fourth method is a method that the management computer outputs a failure log in compliance with a log output protocol, e.g. syslog protocol.

The fifth method is a method that the management computer outputs, as a SNMP Trap, a failure log to another SAN management program established beforehand by the SAN administrator.

The sixth method is a method that the management computer notifies a failure log by an administrator's mail/cellular phone/pager established beforehand by the SAN administrator.

According to the above, the SAN manager, when receiving a failure message from a plurality of devices constituting the SAN, can automate the analysis of the failure message and the association thereof with other failure messages by the failure associating process, thus relieving the SAN administrator of a burden in failure segmentation.

Failure-Significance-Degree Conversion Function

The failure-significance-degree conversion function by the SAN manager is shown in the following. In this function, the SAN manager, when receiving a failure message, makes a notification to the higher-order management program or administrator according to a common severity converted, of the severities of a plurality of storage devices connected to the virtualization device, by means of a conversion table as to failure severity defined beforehand by the SAN administrator.

FIG. 52 shows a failure-significance-degree conversion process flowchart 2500 to be executed by the SAN manager 13100. The steps in the below are assumed to be executed by the SAN manager 13100 unless otherwise described.

The SAN manager 13100 waits until a SNMP Trap message is received from a certain device (step 2510).

Receiving a message, the SAN manager extracts an IP address of message-issued device out of the Agent Address field of the message (step 2515).

Based on the extracted IP address, the SAN manager examines whether or not the message-issued device has a relation to the common severity (step 2520). Specifically, the message-issued device is first specified by examining whether or not the extracted IP address is present in the device detecting list 13500. Then, it is examined whether or not the severity column concerning the specified device is present in the failure severity-change table 13800.

In the case decided, at step 2520, that the message-issued device does not have a relation to the common severity, the SAN manager transfers the Trap message as it is to the higher-order management software without applying the severity-change function (step 2526). Here, as the transfer method, there can be considered a method to issue a SNMP Trap to the higher-order management software, a method to send a message on a protocol unique to the higher-order management software, and so on.

In the case decided, at the step 2520, that the message-issued device has a relation to the common severity, the severity of message-issued device is extracted from a Specific Trap Type field of the SNMP Trap message (step 2525).

Based on a message-issued device name and extracted severity, a failure severity-change table 13800 is examined to specify a common severity and action (step 2530).

Finally, the action specified at the step 2530 is performed (step 2535).

Following the above, the flowchart 2500 is ended.

The failure-significance-degree conversion process flowchart is as per the above.

Here, description is made on a concrete example of the failure notification by the SAN manager 10000 shown in the flowchart 2500. Consider the case that an event of event ID 2000 is received out of the failure log entries described in FIG. 17.

The failure message of event ID 2000, at step 2515, is decided that the storage device B is the device-issued and hence decided, at step 2520, that it is a case related to a common severity definition.

Because the severity in the Trap message is "4" at step 2525, the action "Trap-send and mail-send the information of virtualization storage device S3" described in the failure severity-change table 13800. Thus, the failure message of event ID 2000 is not notified to the higher management software and the SAN administrator.

Thus, by making a notification including a severity-change function, the SAN manager is allowed to define a consistent severity on the failure messages the SAN manager is to receive from a plurality of storage devices, and provide a SAN manager's failure notification function in accordance with the definition.

Incidentally, as for the failure associating function and failure-significance-degree change function to be performed by the SAN manager, the storage device S3 is assumed in a configuration of a virtualization device. However, in the process flow of the failure associating function and failure-significance-degree change function, there are no processes dependent upon the device having a volume virtualization function. Accordingly, the failure associating function and failure-significance-degree change function can be realized also in the configuration that the switch is a virtualization device as described in the embodiment 2, by applying the same flowchart.

More specifically, the SAN manager collects failure information from the virtualization-device switches, the usual switches and storage devices in plurality, and associates the failure information as noted before, thus making a display similarly to FIG. 51. Device configuration displayed is in a configuration as in the embodiment 2, for example.

According to the foregoing embodiments and modifications, in a SAN having a virtualization device, when the device a SAN manager is executed receives failure messages from a plurality of devices constituting the SAN, the SAN manager automates the analysis of the failure message and the association with other message, thus relieving the SAN administrator of a burden in failure segmentation.

Meanwhile, by defining a consistent severity on the failure messages the SAN manager is to receive from a plurality of storage devices, the SAN manager is allowed to notify the failure by a method according the definition. The San administrator or the higher-order system management software is to receive only necessary-and-sufficient information, making it possible to speedup the measure against failure after the notification.

The invention allows the SAN administrator to easily grasp the corresponding relationship between real and virtual volumes over a storage network.

Meanwhile, in the case a failure message is issued from the device connected to the SAN, assistance is possible for the failure segmentation by the SAN administrator.

Meanwhile, on the SAN, the SAN administrator or the higher-order system management software is allowed to receive a required piece of failure information among the failure messages issued from the devices existing on the SAN.

What is claimed:

1. A non-transitory computer readable medium storing a computer program for a management server for managing failure information in a system,
    wherein the system includes at least one storage device equipped with a real volume, a virtualization device coupled to said at least one storage device and providing a virtual volume using said real volume of said at least one storage device,
    the computer program causing the management server to:
    manage a virtual mapping relation including said virtual volume and a first port of said virtualization device on an access path from a computer to said virtual volume, and a real mapping relation including said real volume provided as said virtual volume and a second port of said storage device on a connection path from a computer to said real volume, and an association between said virtual mapping relation and said real mapping relation;
    receive a plurality of failure notifications from said at least one storage device and said virtualization device at which a failure is detected;
    detect a first failure notification, which notifies a failure of at least one element in said virtual mapping relation, from said plurality of failure notifications, and a second failure notification, which notifies a failure of at least one element in said real mapping relation, from said plurality of failure notifications;
    associate said first failure notification with said second failure notification based on said association between said virtual mapping relation and said real mapping relation; and
    output results of said associating step, in which said first failure notification and second failure notification are associated with a particular cause.

2. A non-transitory computer readable medium according to claim 1,
    wherein said detection includes a detecting of said first failure notification, which notifies of a failure of said virtual volume in said virtual mapping relation, and said second failure notification, which notifies of a failure of said second port in said real mapping relation.

3. A non-transitory computer readable medium according to claim 1,
    wherein said associating includes an associating of said first failure notification with said second failure notification when said first failure notification and said second failure notification are received by said management server within a predetermined time interval.

4. A non-transitory computer readable medium according to claim 1, the computer program causes the management server to:
    receive configuration information of said system from devices included in said system; and
    associate said virtual mapping relation with said real mapping relation based on said configuration information.

5. A non-transitory computer readable medium according to claim 1, wherein said failure message outputting includes an outputting of information indicating said certain cause with said first failure notification and second failure notification.

6. A non-transitory computer readable medium according to claim 1, the computer program causes the management server to:
    identify, out of said first failure notification and said second failure notification, a failure notification notifying a hardware malfunction as a failure notification notifying said particular cause ; and identify, out of said first failure notification and said second failure notification, a failure notification notifying an access error as a failure notification issued under influence of said particular cause.

7. A non-transitory computer readable medium according to claim 1, the computer program causes the management server to:

obtain a plurality of severity information indicating severity of failure information based on different standards, and contained in said plurality of failure notifications;

convert said severity information to converted severity information based on a common standard; and output failure information based on said converted severity information.

8. A non-transitory computer readable medium according to claim 1, wherein the virtualization device is a switch.

* * * * *